United States Patent
Cohen et al.

(10) Patent No.: US 11,797,847 B2
(45) Date of Patent: *Oct. 24, 2023

(54) SELECTING INSTANCES OF DETECTED OBJECTS IN IMAGES UTILIZING OBJECT DETECTION MODELS

(71) Applicant: Adobe Inc., San Jose, CA (US)

(72) Inventors: Scott Cohen, Sunnyvale, CA (US); Zhe Lin, Fremont, CA (US); Mingyang Ling, San Francisco, CA (US)

(73) Assignee: Adobe Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/387,195

(22) Filed: Jul. 28, 2021

(65) Prior Publication Data

US 2021/0358130 A1  Nov. 18, 2021

Related U.S. Application Data

(63) Continuation of application No. 16/518,880, filed on Jul. 22, 2019, now Pat. No. 11,107,219.

(51) Int. Cl.
  *G06N 3/00* (2023.01)
  *G06N 3/08* (2023.01)
  (Continued)

(52) U.S. Cl.
  CPC ........... *G06N 3/08* (2013.01); *G06F 16/3344* (2019.01); *G06F 18/214* (2023.01); *G06N 3/045* (2023.01);
  (Continued)

(58) Field of Classification Search
  CPC ... G06T 7/11; G06T 7/90; G06T 2207/30252; G06F 16/3344; G06F 16/583;
  (Continued)

(56) References Cited

U.S. PATENT DOCUMENTS

| 6,389,168 B2 | 5/2002 | Altunbasak et al. |
| 6,469,706 B1 | 10/2002 | Syeda-Nahmood |

(Continued)

FOREIGN PATENT DOCUMENTS

| CN | 103366178 A | 10/2013 |
| CN | 107563494 A | 1/2018 |

(Continued)

OTHER PUBLICATIONS

Ahmed et al, Semantic Object Selection, IEEE Conference on Computer Vision and Pattern Recognition (pp. 3150-3157) (Year: 2014).*

(Continued)

*Primary Examiner* — Nancy Bitar
*Assistant Examiner* — Xiao Liu
(74) *Attorney, Agent, or Firm* — Keller Preece PLLC

(57) ABSTRACT

The systems, methods, a non-transitory computer readable mediums relate to an object selection system that accurately detects and automatically selects user-requested objects (e.g., query objects) in a digital image. For example, the object selection system builds and utilizes an object selection pipeline to determine which object detection neural network to utilize to detect a query object based on analyzing the object class of the query object. In addition, the object selection system can add, update, or replace portions of the object selection pipeline to improve overall accuracy and efficiency of automatic object selection within an image.

20 Claims, 25 Drawing Sheets

(51) Int. Cl.

| | |
|---|---|
| *G06T 7/11* | (2017.01) |
| *G06T 7/90* | (2017.01) |
| *G06F 16/33* | (2019.01) |
| *G10L 15/22* | (2006.01) |
| *G06F 18/214* | (2023.01) |
| *G06N 3/045* | (2023.01) |
| *G06V 10/25* | (2022.01) |
| *G06V 10/764* | (2022.01) |
| *G06V 10/82* | (2022.01) |

(52) U.S. Cl.
CPC .............. *G06T 7/11* (2017.01); *G06T 7/90* (2017.01); *G06V 10/25* (2022.01); *G06V 10/764* (2022.01); *G06V 10/82* (2022.01); *G10L 15/22* (2013.01); *G06T 2207/30252* (2013.01); *G10L 2015/223* (2013.01)

(58) Field of Classification Search
CPC ... G06F 16/55; G06F 16/5866; G06K 9/6256; G06K 9/6268; G06N 3/0454; G06N 3/04; G06N 3/105; G06N 3/08; G06N 3/0445; G06V 10/50; G06V 10/56; G06V 10/25; G06V 10/764; G06V 10/82; G10L 15/22; G10L 2015/223; G10L 15/26
See application file for complete search history.

(56) References Cited

U.S. PATENT DOCUMENTS

| | | | |
|---|---|---|---|
| 8,107,726 B2 | 1/2012 | Xu et al. | |
| 8,385,688 B2 | 2/2013 | Gong et al. | |
| 8,818,024 B2 | 8/2014 | Chen et al. | |
| 8,879,855 B2 | 11/2014 | Angelova et al. | |
| 9,129,191 B2 | 9/2015 | Cohen et al. | |
| 9,171,230 B2 | 10/2015 | Jiang et al. | |
| 9,443,316 B1 | 9/2016 | Takeda et al. | |
| 9,495,764 B1 | 11/2016 | Boardman et al. | |
| 9,576,223 B2 | 2/2017 | Aupetit et al. | |
| 9,619,488 B2 | 4/2017 | Ambardekar et al. | |
| 9,690,778 B2 | 6/2017 | Masuko | |
| 9,720,934 B1 | 8/2017 | Dube et al. | |
| 9,746,981 B2 | 8/2017 | Zachut et al. | |
| 9,858,496 B2 | 1/2018 | Sun et al. | |
| 10,083,171 B1 | 9/2018 | Yang et al. | |
| 10,146,751 B1 | 12/2018 | Zhang | |
| 10,192,129 B2 | 1/2019 | Price et al. | |
| 10,204,289 B2 | 2/2019 | Duan et al. | |
| 10,216,766 B2 | 2/2019 | Lin et al. | |
| 10,410,096 B2 | 9/2019 | Dijkman et al. | |
| 10,496,880 B2 | 12/2019 | Ye | |
| 10,713,794 B1 | 7/2020 | He et al. | |
| 10,740,647 B2 | 8/2020 | Du et al. | |
| 10,867,216 B2* | 12/2020 | Skaff | G06V 20/00 |
| 10,893,283 B2 | 1/2021 | Chen et al. | |
| 11,010,605 B2 | 5/2021 | Nord et al. | |
| 11,055,566 B1 | 7/2021 | Pham et al. | |
| 11,107,219 B2* | 8/2021 | Cohen | G06T 7/11 |
| 11,176,384 B1 | 11/2021 | Yang et al. | |
| 11,182,408 B2 | 11/2021 | Wu et al. | |
| 11,188,783 B2* | 11/2021 | Cheri | G06V 20/00 |
| 11,417,097 B2 | 8/2022 | Lin et al. | |
| 11,487,975 B2* | 11/2022 | Kim | G06V 10/776 |
| 2003/0179213 A1 | 9/2003 | Liu | |
| 2003/0198380 A1 | 10/2003 | Shin et al. | |
| 2003/0233224 A1 | 12/2003 | Marchisio et al. | |
| 2008/0069444 A1 | 3/2008 | Wilensky | |
| 2008/0117209 A1 | 5/2008 | Razeto | |
| 2009/0281925 A1 | 11/2009 | Winter et al. | |
| 2009/0316988 A1 | 12/2009 | Xu et al. | |
| 2010/0158412 A1 | 6/2010 | Wang et al. | |
| 2010/0166321 A1 | 7/2010 | Sawant et al. | |
| 2010/0232643 A1 | 9/2010 | Chen et al. | |
| 2011/0026835 A1 | 2/2011 | Ptucha et al. | |
| 2011/0029553 A1 | 2/2011 | Bogart et al. | |
| 2011/0085739 A1 | 4/2011 | Zhang et al. | |
| 2011/0216973 A1 | 9/2011 | Mojsilovic | |
| 2013/0257886 A1 | 10/2013 | Kerofsky et al. | |
| 2014/0334722 A1 | 11/2014 | Bloore et al. | |
| 2015/0169142 A1 | 6/2015 | Longo et al. | |
| 2015/0170005 A1 | 6/2015 | Cohen et al. | |
| 2015/0213058 A1 | 7/2015 | Ambardekar et al. | |
| 2015/0228086 A1 | 8/2015 | Maurer et al. | |
| 2015/0305609 A1 | 10/2015 | Hoberman et al. | |
| 2015/0379006 A1 | 12/2015 | Dorner et al. | |
| 2016/0342863 A1 | 11/2016 | Kwon et al. | |
| 2017/0017696 A1 | 1/2017 | Alonso | |
| 2017/0083752 A1 | 3/2017 | Saberian et al. | |
| 2017/0140236 A1 | 5/2017 | Price et al. | |
| 2017/0206431 A1 | 7/2017 | Sun et al. | |
| 2017/0242913 A1 | 8/2017 | Tijssen et al. | |
| 2017/0255378 A1 | 9/2017 | Desai | |
| 2017/0277948 A1 | 9/2017 | Dhua et al. | |
| 2017/0287137 A1 | 10/2017 | Lin et al. | |
| 2017/0364771 A1 | 12/2017 | Pinheiro et al. | |
| 2018/0089203 A1 | 3/2018 | Soni et al. | |
| 2018/0108137 A1 | 4/2018 | Price et al. | |
| 2018/0121768 A1* | 5/2018 | Lin | G06F 18/24133 |
| 2018/0240243 A1 | 8/2018 | Kim et al. | |
| 2018/0260793 A1 | 9/2018 | Li et al. | |
| 2018/0267997 A1 | 9/2018 | Lin et al. | |
| 2018/0285686 A1 | 10/2018 | Pinheiro et al. | |
| 2019/0019318 A1 | 1/2019 | Cinnamon et al. | |
| 2019/0096125 A1* | 3/2019 | Schulter | G06T 7/50 |
| 2019/0108250 A1 | 4/2019 | Miller et al. | |
| 2019/0130229 A1 | 5/2019 | Lu et al. | |
| 2019/0252002 A1 | 8/2019 | Ding et al. | |
| 2019/0278800 A1 | 9/2019 | Fulton et al. | |
| 2019/0279074 A1 | 9/2019 | Lin et al. | |
| 2019/0354609 A1* | 11/2019 | Huang | G06F 16/532 |
| 2020/0020108 A1 | 1/2020 | Pao et al. | |
| 2020/0074185 A1 | 3/2020 | Rhodes et al. | |
| 2020/0175344 A1* | 6/2020 | Li | G06V 20/10 |
| 2020/0218931 A1* | 7/2020 | Karlinsky | G06N 3/047 |
| 2020/0242357 A1 | 7/2020 | Brouard et al. | |
| 2020/0250538 A1 | 8/2020 | Li et al. | |
| 2020/0294293 A1 | 9/2020 | Boenig, II et al. | |
| 2020/0302168 A1 | 9/2020 | Vo et al. | |
| 2020/0302230 A1 | 9/2020 | Chang et al. | |
| 2020/0334487 A1 | 10/2020 | Du et al. | |
| 2020/0334501 A1 | 10/2020 | Lin et al. | |
| 2020/0349362 A1 | 11/2020 | Maloney | |
| 2021/0027448 A1 | 1/2021 | Cohen et al. | |
| 2021/0027471 A1 | 1/2021 | Cohen et al. | |
| 2021/0027497 A1 | 1/2021 | Ding et al. | |
| 2021/0056713 A1 | 2/2021 | Rangesh et al. | |
| 2021/0117948 A1 | 4/2021 | Voss | |
| 2021/0192375 A1 | 6/2021 | Xia et al. | |
| 2021/0366128 A1 | 11/2021 | Kim et al. | |
| 2021/0397876 A1 | 12/2021 | Hemani et al. | |
| 2022/0084209 A1 | 3/2022 | Wang et al. | |
| 2022/0101531 A1 | 3/2022 | Zhang et al. | |
| 2022/0230321 A1 | 7/2022 | Zhao et al. | |

FOREIGN PATENT DOCUMENTS

| | | |
|---|---|---|
| CN | 112561920 A | 3/2021 |
| DE | 102019102484 A1 | 8/2020 |
| EP | 3 300 024 A1 | 3/2018 |
| WO | WO 2017/007626 A1 | 1/2017 |
| WO | WO 2017/198909 A1 | 11/2017 |
| WO | WO 2019/110583 A1 | 6/2019 |
| WO | WO 2020/101777 A1 | 5/2020 |
| WO | WO 2021/179205 A1 | 9/2021 |

OTHER PUBLICATIONS

Hu et al, Segmentation from Natural Language Expressions, Arxiv:1603.0618 (Year: 2016).*
Deng et al., You Only Look & Listen Once: Towards Fast and Accurate Visual Grounding, arXiv:1902.04213 (Year: 2019).*
U.S. Appl. No. 16/518,810, Aug. 10, 2022, Office Action.

(56) References Cited

OTHER PUBLICATIONS

U.S. Appl. No. 16/518,850, Jun. 1, 2022, Notice of Allowance.
U.S. Appl. No. 16/800,415, Jul. 20, 2022, Notice of Allowance.
Intention to Grant as received in United Kingdom Application 632005865.7 dated Mar. 23, 2022.
Intention to Grant as received in United Kingdom Application 6320043626 dated Apr. 8, 2022.
U.S. Appl. No. 16/518,810, Apr. 14, 2022, Office Action.
U.S. Appl. No. 16/800,415, Apr. 4, 2022, 1st Action Office Action.
Examination Report as received in Australian application 2020201988 dated Oct. 29, 2021.
U.S. Appl. No. 16/518,850, Nov. 4, 2021, Office Action.
J. Uijlings, K. van de Sande, T. Gevers, and A. Smeulders. Selective Search for Object Recognition, IJCV, 2013.
Joseph Redmon, Santosh Divvala, Ross Girshick, Ali Farhadi: You Only Look Once: Unified, Real-Time Object Detection, arXiv:1506.02640, May 6, 2016.
Bency, Archith John, et al. "Weakly supervised localization using deep feature maps." European Conference on Computer Vision. Springer, Cham, 2016, See Abstract and section 3.4.
Bolanos, Marc, and Petia Radeva. "Simultaneous food localization and recognition." 2016 23rd International Conference on Pattern Recognition (ICPR). IEEE, 2016 See Abstract, Figure 3 and the Methodology section.
Combined Search and Examination Report as received in United Kingdom Application GB1817588.5 dated Apr. 8, 2019.
Combined Search and Examination Report as received in United Kingdom Application GB2005714.7 dated Sep. 3, 2020.
Combined Search and Examination Report as received in United Kingdom Application GB2005704.8 dated Sep. 24, 2020.
Combined Search and Examination Report as received in United Kingdom Application GB2004362.6 dated Nov. 13, 2020.
Combined Search and Examination Report as received in UK Application GB2005865.7 dated Jan. 11, 2021.
Examination Report as received in Australian application 2018250370 dated Jun. 10, 2021.
Intention to Grant as received in United Kingdom Application GB1817588.5 dated Aug. 13, 2020.
Ning Xu et al., "Deep GrabCut for Object Selection," published Jul. 14, 2017.
S. Ren, K. He, R. Girshick, and J. Sun, Faster r-cnn: Towards real-time object detection with region proposal networks, NIPS, 2015.
Yi-Hsuan Tsai et al., "Sky is Not the Limit: Semantic-Aware Sky Replacement," ACM Transactions on Graphics (SIGGRAPH), 2016.
Yufei Wang et al., "Concept Mask: Large-Scale Segmentation from Semantic Concepts," The European Conference on Computer Vision (ECCV), Aug. 18, 2018.
Kirillov, Alexander & Girshick, Ross & He, Kaiming & Dollar, Piotr. (2019). Panoptic Feature Pyramid Networks. 6392-6401. 10.1109/CVPR.2019.00656.
Gouet, Valerie, and Nozha Boujemaa. "Object-based queries using color points of interest." Proceedings IEEE Workshop on Content-Based Access of Image and Video Libraries (CBAIVL 2001). IEEE, 2001. (Year: 2001).
Wang, Jiang, et al. "Learning fine-grained image similarity with deep ranking." Proceedings of the IEEE Conference on Computer Vision and Pattern Recognition. 2014. (Year: 2014).
Niblack, Carlton Wayne, et al. "QBIC project: querying images by content, using color, texture, and shape." Storage and retrieval for image and video databases. vol. 1908. International Society for Optics and Photonics, 1993. (Year: 1993).
Wan et al, Deep Learning for Content-Based Image Retrieval: Comprehensive Study, Published in MM '14: Proceedings of the ACM International Conference on Multimedia: Nov. 3-7, 2014, Orlando. pp. 157-166. http://doi.org/10.1145/2647868.2654948 (Year: 2014).

Carion, Nicolas et al. "End-to-End Object Detection with Transformers," arXiv preprint arXiv:2005.12872 (2020).
U-net architecture and use techniques and approaches found in Olaf Ronneberger et al., "U-Net: Convolutional Networks for Biomedical Image Segmentation," submitted on May 18, 2015, arXiv:1505.049597.
Wang et al. in Joint Object and Part Segmentation using Deep Learned Potentials, In Proc. International Conference on Computer Vision (ICCV), 2015.
J. Dong et al.; Towards Unified Human Parsing and Pose Estimation, in CVPR, pp. 843-850, 2014
U.S. Appl. No. 15/921,492, Sec. 27, 2019, Office Action.
U.S. Appl. No. 15/921,492, Apr. 2, 2020, Notice of Allowance.
U.S. Appl. No. 16/518,880, Dec. 23, 2020, Office Action.
U.S. Appl. No. 16/518,880, Apr. 7, 2021, Notice of Allowance.
U.S. Appl. No. 16/518,810, Jan. 8, 2021, Preinterview 1st Office Action.
U.S. Appl. No. 16/518,810, Apr. 16, 2021, 1st Action Office Action.
U.S. Appl. No. 16/518,810, Jul. 15, 2021, Office Action.
U.S. Appl. No. 16/518,795, Jan. 21, 2021, Preinterview 1st Office Action.
U.S. Appl. No. 16/518,795, May 6, 2021, Office Action.
U.S. Appl. No. 16/817,418, Mar. 22, 2021, Notice of Allowance.
U.S. Appl. No. 16/518,850, Apr. 6, 2021, Preinterview 1st Office Action.
U.S. Appl. No. 16/518,850, May 28, 2021, 1st Action Office Action.
U.S. Appl. No. 16/518,850, Jun. 18, 2021, Office Action.
Examination Report as received in Australian application 2020202601 dated Nov. 5, 2021.
Examination Report as received in United Kingdom application 632005865.7 dated Dec. 14, 2021.
U.S. Appl. No. 16/518,850, Jan. 25, 2022, Office Action.
Examination Report as received in United Kingdom application GB2005865.7 dated Sep. 14, 2021.
Examination Report as received in Australian application 2020202658 dated Aug. 23, 2021.
Examination Report as received in Australian application 2020202602 dated Sep. 14, 2021.
Intention to Grant as received in United Kingdom Application GB2005704.8 dated Sep. 30, 2021.
U.S. Appl. No. 16/518,795, Sep. 15, 2021, Notice of Allowance.
Examination Report as received in Australian application 2020202602 dated Oct. 18, 2021.
Intention to Grant as received in Australian application 2018250370 dated Oct. 21, 2021.
U.S. Appl. No. 16/518,810, Oct. 27, 2021, Office Action.
Examination Report as received in Australian application 2020202602 dated Nov. 22, 2021.
Notice of Grant as received in Australian Application 2020202658 dated Dec. 23, 2021.
Notice of Grant as received in United Kingdom application GB20057048 dated Nov. 16, 2021.
U.S. Appl. No. 16/518,795, Dec. 7, 2021, Notice of Allowance.
Notice of Grant as received in Australian application 2020201988 dated Mar. 17, 2022.
U.S. Appl. No. 16/919,383, Feb. 10, 2022, Notice of Allowance.
U.S. Appl. No. 16/800,415, Feb. 17, 2022, Preinterview 1st Office Action.
U.S. Appl. No. 16/518,810, Dec. 5, 2022, Notice of Allowance.
U.S. Appl. No. 17/151,111, Oct. 12, 2022, Notice of Allowance.
U.S. Appl. No. 17/158,527, Dec. 15, 2022, Office Action.
U.S. Appl. No. 17/331,161, Dec. 30, 2022, Office Action.
U.S. Appl. No. 17/331,161, Feb. 10, 2023, Notice of Allowance.
U.S. Appl. No. 17/929,206, Jan. 19, 2023, Office Action.
U.S. Appl. No. 17/158,527, dated Jun. 14, 2023, Office Action.
U.S. Appl. No. 17/929,206, dated Jun. 6, 2023, Office Action.

* cited by examiner

SELECTING INSTANCES OF DETECTED OBJECTS IN IMAGES UTILIZING OBJECT DETECTION MODELS

CROSS-REFERENCE TO RELATED APPLICATIONS

This application is a continuation of U.S. patent application Ser. No. 16/518,880, filed Jul. 22, 2019. The aforementioned application is hereby incorporated by reference in its entirety. This application is also related to U.S. patent application Ser. No. 16/518,795, filed Jul. 22, 2019, U.S. patent application Ser. No. 16/518,810, filed Jul. 22, 2019, and U.S. patent application Ser. No. 16/518,850, filed Jul. 22, 2019 all of which are incorporated by reference herein in their entirety.

BACKGROUND

Recent years have witnessed a significant increase in digital image editing. Indeed, advances in both hardware and software have increased the ability of individuals to capture, create, and edit digital images. For instance, the hardware on most modern computing devices (e.g., servers, desktops, laptops, tablets, and smartphones) enables digital image editing without significant lag time or processing delays. Similarly, improvements in software enable individuals to modify, combine, filter, or otherwise edit digital images. Examples of editing digital images include detecting an object, copying the object from one image into a new background, or removing an object from an image.

Notwithstanding these improvements in digital image editing, conventional systems have a number of problems in relation to flexibility, accuracy, and efficiency of operation in image editing systems, particularly with respect to detecting and selecting objects in digital images. As an example, many conventional systems have limited functionality in the types of objects they can detect in an image. To provide context, an object in an image can correspond to one or more object types or classes (e.g., foreground objects, background objects, conceptual objects), and object classes can include near limitless numbers of objects. Conventional systems are often limited to a small number of object classes. Further, conventional systems primarily detect only a small subset of objects within an object class. For instance, some conventional systems can detect only dogs in an image, but not other types or classes of objects.

Moreover, many conventional systems are limited to a single or small number of functions. For example, most conventional systems that perform object detection are not capable of performing additional functions. To illustrate, conventional systems that can detect small numbers of object classes largely cannot perform additional actions, such as selecting the detected object and/or generating an object mask for the detected object.

In additional, conventional systems are inaccurate. For instance, many conventional systems that provide object detection often identify the wrong objects or fail to identify any object. For example, many conventional systems do not identify objects that are background objects or conceptual objects (e.g., concept-based objects). Further, when a user desires a selection of a particular instance of an object, conventional systems often identify and group multiple instances of the object in a single selection as these systems cannot distinguish between instances of a detected object in an image.

Also, some conventional systems are inaccurate because they provide imprecise results. For instance, while a few conventional systems can select individual masks of an object, the boundaries of these masks are rough and imprecise. Indeed, these conventional systems often produce object masks that over include additional portions of the image or do not include the entire object. As a result, a user must manually correct the selection and/or manually select the desired object.

Furthermore, conventional systems are inefficient. For instance, conventional systems have significant shortfalls in relation to automatic object detection and selection. For example, many conventional systems that detect objects are end-to-end neural networks. When a fault occurs, or the desired result is not achieved, users or even creators of the system are unable to locate which component of the system is not working properly. Rather, the entire system must be retrained and adjusted until the desired result is achieved—a process that can take significant amounts of time and computing resources.

In addition, many conventional systems provide inefficient mouse input-based tools that further require users to manually select a desired object. These tools are often imprecise as well as difficult for many selection tasks. As a result, significant time and user interactions with different selection tools by the user waste substantial computing resources in detecting, displaying, selecting, and correcting object selections in digital images.

These, along with additional problems and issues exist in image editing systems with respect to detecting and selecting objects in digital images.

BRIEF SUMMARY

Embodiments of the present disclosure provide benefits and/or solve one or more of the foregoing or other problems in the art with systems, non-transitory computer-readable media, and methods for automatically selecting detected objects in a digital image based on natural language-based inputs. For instance, the disclosed systems can utilize an object selection pipeline made up of object detection neural networks and models to accurately detect and automatically select an object identified in a natural language user query. Further, the disclosed systems can add, update, or replace portions of the object selection pipeline to improve overall accuracy and efficiency of automatic object selection within an image.

To illustrate, the disclosed systems can identify a user selection query (e.g., text or voice input) that requests selection of a given object within an image. Based on analyzing the query, the disclosed systems can select an object detection neural network to utilize to detect the given object. For instance, the disclosed systems can select an object detection neural network from a specialist object detection neural network, a concept-based object detection neural network, a known-class object detection neural network, or an unknown-class object detection neural network. In addition, the disclosed systems can select the detected object by generating an object mask of the detected object utilizing an object mask neural network. Further, the disclosed systems can provide the selected object to the user within the image.

As described in detail below, the disclosed systems can automatically detect and select objects corresponding to any type of object class or object type. Indeed, the disclosed systems can automatically determine the object class of an object indicated in the user query and utilize the appropriate neural network(s) to accurately identify and isolate the object. Thus, the disclosed systems can identify specific objects, foreground objects, background objects, general objects, concept-based objects, as well as objects having an unknown class.

In some embodiments, the disclosed systems also can accurately detect specified instances of objects based on the user query. As an example, if there are multiple instance of a desired object in an image, the disclosed systems can identify and select each instance individually. Furthermore, if an image includes multiple instances of an object, the disclosed systems can identify a specified attribute from the user query and select the instance of the object that matches the specified attribute. In various embodiments, the disclosed systems can select instances of objects based on color, position, size, location, material, expression, shape, or other attributes.

While this summary refers to systems for simplicity, the summary also applies to certain disclosed methods and non-transitory computer-readable media. The following description sets forth additional features and advantages of one or more embodiments of the disclosed systems, computer media, and methods. In some cases, such features and advantages will be evident to a skilled artisan from the description or may be learned by the practice of the disclosed embodiments.

BRIEF DESCRIPTION OF THE DRAWINGS

The detailed description provides one or more embodiments with additional specificity and detail through the use of the accompanying drawings, as briefly described below.

DETAILED DESCRIPTION

Figure 1:
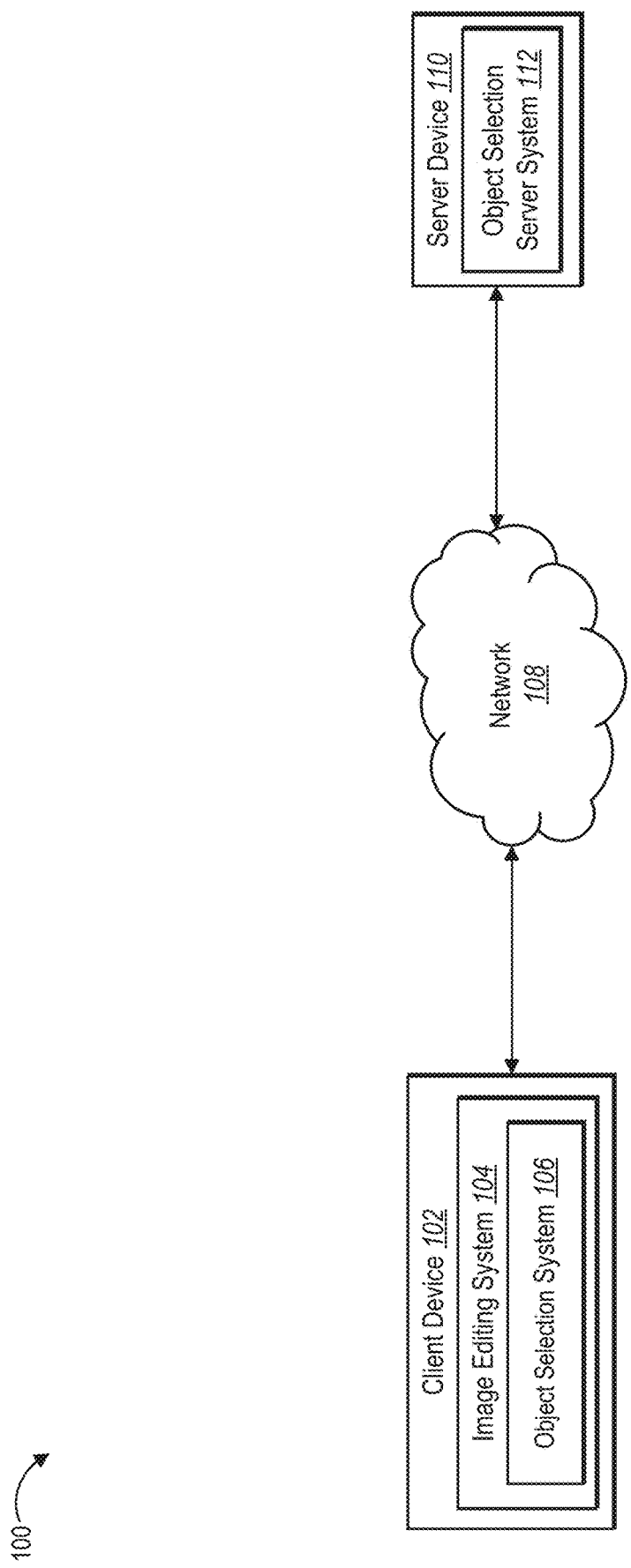
FIG. 1 illustrates a schematic diagram of an environment in which an object selection system operates in accordance with one or more embodiments.

This disclosure describes one or more embodiments of an object selection system that accurately detects and automatically selects user-requested objects (e.g., query objects) in a digital image. In particular, in one or more embodiments, the object selection system builds and utilizes an object selection pipeline to determine which object detection neural network to utilize to detect a query object based on analyzing the object class of the query object. In addition, the object selection system can add, update, or replace portions of the object selection pipeline to improve overall accuracy and efficiency of automatic object selection within an image.

To illustrate, in one or more embodiments, the object selection system identifies a user query that requests detection of an object (i.e., query object) within an image. Based on analyzing the user query, the object selection system can select which object detection neural network of a plurality of multiple object detection neural networks that is best suited to detect the query object. For instance, the object selection system can select an object detection neural network from a specialized-class object detection neural network, a concept-based object detection neural network, a known-class object detection neural network, or an unknown-class object detection neural network. In addition, the object selection system can generate an object mask of the detected query object utilizing an object mask neural network to select the detected query object. Further, the object selection system can provide the selected query object to the user within the image.

In some embodiments, the object selection system detects multiple instances of the query object within the image. If the user query does not specify a particular instance of the query object to be selected, the object selection system can return each instance of the detected query object separately selected. Otherwise, if the user query includes an indication of a particular instance, the object selection system can utilize one or more object attribute detection models to select and provide the specified instance of the query object to the user.

As mentioned above, the object selection system can detect objects corresponding to a variety of object types and classes. In this manner, a user can request that the object selection system find any type of object rather than an object belonging to a limited class. Indeed, in various embodiments, the object selection system employs an object selection pipeline that provides a framework for the object selection system to select the optimal object detection neural network for each query object requested by a user.

To illustrate, in one or more embodiments, the object selection system detects a query string from a user requesting to automatically select a given object within an image and/or edit the image with respect to the given object. In some embodiments, the object selection system parses the query string and/or utilizes natural language processing to determine various parts of speech, such as nouns and adjectives. For example, a noun in a query string corresponds to the query object the user is requesting the object selection system to automatically select in an image. Further, an adjective in the query string identifies which instances of the query objects to select when multiple query objects are included in the image.

The object selection system can analyze the query object in a query string to determine an object type or class. For example, in one or more embodiments, the object selection system can detect that the query object corresponds to a group of specialty objects, concept-based objects, known objects, or unknown objects. Based on the object type or class, the object selection system can determine which object detection neural network or model to utilize to optimally detect the query object.

To further illustrate, if the object selection system determines that the query object corresponds to a group of specialty objects, the object selection system can select an object detection approach that utilizes a specialist object detection neural network. In embodiments where the query object corresponds to a concept, the object selection system can select a concept-based object detection neural network. In addition, in embodiments where the query object corresponds to a known object, the object selection system can select an object detection neural network trained to detect known classes of objects. Further, in embodiments where the query object corresponds to an unknown object, the object selection system can select an unknown object class model (e.g., a regional object proposal neural networks and concept embedding neural networks) to detect the query object.

As mentioned above, in some embodiments, the object selection system utilizes a specialist object detection neural network. For example, the object selection system detects that the query object in the query string is an object for which the object selection system has trained a specialized object detection neural network. In general, specialist object detection neural networks are object detection neural networks trained to detect specific objects (e.g., the sky, waterfalls, or faces) with high precision and accuracy. By using the object selection pipeline with interchangeable components, the object selection system can add additional specialist object detection neural network as the need arises.

As also mentioned above, in various embodiments, the object selection system utilizes a concept-based object detection neural network. For example, the object selection system detects that the query object in the query string is a recognized concept. In general, a concept-based object detection neural network is trained to identify concepts corresponding to hundreds or thousands of semantic concepts. Examples of concepts include high-level class descriptions of objects that often encompass multiple object classes (e.g., clothing, senior, woman, holding, happy, or healthy). In general, concepts correspond to salient regions in an image (e.g., mountains, roads water, sand, hills). In some instances, concepts are referred to as background object classes background classes, or background objects.

Additionally, as mentioned above, in one or more embodiments, the object selection system utilizes an object detection neural network that detects objects having known object classes. For example, the object selection system detects that the query object in the query string belongs to a known object class. In general, a known object class detection neural network is trained to identify objects corresponding to various object classes. Examples of object classes includes dogs, cars, buildings, bottles, phones, and trees. In some embodiments, the object selection system identifies a query object by identifying other objects in the image utilizing a known object class detection neural network and filtering out the other objects that do not correspond to the query object.

Furthermore, as mentioned above, the object selection system can detect objects having unknown object classes. For example, the object selection system determines that the query object is not associated with a specialty object, an object concept, or a known object class. More specifically, in example embodiments, the object selection system utilizes a regional object proposal neural network and a concept embedding neural network to detect the query object. In this manner, the object selection system is able to detect any query object that a user may request be selected from an image.

In various embodiments, upon detecting the query object, the object selection system generates an approximate boundary (e.g., a bounding box) around the object within the image. In additional embodiments, the object selection system provides the detected query object to an object mask neural network. The object mask neural network, in various embodiments, generates an object mask of the detected object. Indeed, the object mask enables the object selection system to select the detected query object in the image.

In some embodiments, the object mask neural network generates multiple object masks for multiple instances of a detected query object. In these embodiments, the object selection system can provide multiple instances of the detected query object to the user. In additional embodiments, the object selection system can provide individual selections of each instance when multiple instances of the detected query object are detected.

As mentioned above, in addition to indicating a query object, in some embodiments, the query string includes one or more object attributes that specify a particular instance of the query object. For example, the query string indicates a size, color, position, location, material, emotion, or another attribute of the query object. In response to detecting an object attribute in the query string, the object selection system can further determine which instance of the query object to select. In particular, the object selection system can utilize an attribute detection model (e.g., a neural network or metric) to determine which instance of the detected query object to select and provide to the user in the image.

In one or more embodiments, the object selection system detects that the object attribute corresponds to a color. In these embodiments, the object selection system can select and utilize a color attribute detection neural network to identify the instance of the detected object query that matches the color specified in the query string. In some embodiments, the object selection system detects that the object attribute corresponds to a position. In these embodiments, the object selection system can select and utilize a position model to identify the instance of the detected object query that matches the specified position. Still in other embodiments, the object selection system can select and utilize another attribute detection neural network to select the particular instance specified in the query string.

In various embodiments, the object selection system facilitates multimodal user input to detect a query object or identify a particular instance of the query object. For example, the object selection system utilizes both a query string as well as mouse/touch input to identify a query object or a particular instance of the query object. In some embodiments, the mouse/touch input provides an indication or selection of the object or particular object instance requested by the user. In some embodiments, the object selection system can select an object in an image based only on mouse/touch input by a user (e.g., without "verbal" user input).

As previously mentioned, the object selection system provides numerous advantages benefits, and practical applications over conventional systems. For example, the object selection system can detect and select objects across a large scope of object types and classes. As mentioned above, the object selection system is not limited to a particular object class or a single object type but can detect specialty objects, foreground objects, background objects, concept-based objects, and even unknown objects. In this manner, the object selection system provides superior flexibility over conventional systems.

As another example and as mentioned above, the object selection system performs multiple functions with respect to object detection, isolation, and selection. Indeed, the object selection system can detect an object in an image requested by a user as well as generate an object mask that selects the detected object within the image. In additional embodiments, the object selection system can also determine that the user is requesting a particular instance of an object within the image and provide the particular requested instance. Accordingly, the object selection system provides increased flexibility and expanded functionality over conventional systems.

Moreover, the object selection system provides increase flexibility by detecting objects as well as particular instances of objects in an image based on multiple user inputs. For example, the object selection system utilizes both query strings (e.g., "verbal" cues) as well as mouse or touch input selections to detect requested objects. Similarly, as mentioned above, the object selection system can also select particular instances of requested objects based on an object attribute detected in a query string.

As a further example, the object selection system provides increased accuracy over conventional systems. For instance, the object selection system improves object detection accuracy by determining the object detection neural network that best corresponds to a query object from a group of different object detection neural networks. Indeed, by utilizing an object detection neural network that is tailored to the query object, the object selection system achieves improved accuracy in object detection as well as object selection.

In addition, the object selection system provides improved accuracy over conventional systems by separating the selection of multiple instances of a detected object rather than providing a single selection that includes all instances of the detected object. Further, the object selection system can detect a user requesting a particular instance (e.g., by detecting an object attribute in the query string), isolate the particular instance using multiple object detection models, and provide a selection of the particular instance of the object requested by the user.

Furthermore, the object selection system provides improved efficiency over conventional systems by utilizing the object selection pipeline. Indeed, unlike closed end-to-end conventional systems, when a fault occurs, the object selection system can pinpoint the faulty component in the object selection pipeline and repair the component. Further, the object selection system can add additional components to improve accuracy. For example, the object selection system can add additional specialist object detection neural networks to the object selection pipeline that correspond to frequently queried objects. Similarly, the object selection system can replace and/or upgrade components within the object selection pipeline with more efficient versions.

Additionally, the object selection system significantly reduces the number of actions that many conventional systems require of users to select an object within an image. Rather than the user using inefficient mouse input-based tools to manually select an object, the user "tells" (e.g., provides verbal cues in a query string) the object selection system which object to select and the object selection system automatically detects and selects the object. Indeed, the object selection system greatly simplifies the object selection process to one or two simple actions by the user.

Additional advantages and benefits of the object selection system will become apparent in view of the following description. Further, as illustrated by the foregoing discussion, the present disclosure utilizes a variety of terms to describe features and advantages of the object selection system. Before describing the object selection system with reference to figures below, additional detail is now provided regarding the meaning of such terms.

As used herein, the term "digital image" (or simply "image") refers to a digital graphics file that when rendered displays one or more objects. In particular, an image can include one or more objects associated with any suitable object type or object class. In various embodiments, an image editing system displays an image on a computing device, such as a client device. In additional embodiments, the image editing system enables a user to modify or change an image as well as generate new images. For example, the image editing system enables a user to copy an object selected in a first image over the background of a second image.

The term "object," as used herein, refers to a visual representation of a subject, concept, or sub-concept in an image. In particular, an object refers to a set of pixels in an image that combine to form a visual depiction of an item, article, partial item, component, or element. An object can correspond to a wide range of classes and concepts. For example, objects include specialty objects, conceptual objects, objects from known-classes, and unknown object classes (e.g., objects not used in training any of the object detection neural networks). In some embodiments, an object includes multiple instances of the object. For example, an image of a rose bush includes multiple instances of roses. In one or more embodiments, an object includes sub-objects, parts, or portions. For example, a person's face or leg can be objects that are part of another object (e.g., the person's body). As another example, a shirt is an object that can be part of another object (e.g., a person).

As mentioned above, the object selection system can accurately detect and automatically select an object within an image based on a query string. As used herein, the term "query string" refers to a text string of one or more words that indicates a target object. A query string can include a noun representing a query object. In general, the object selection system receives a query string when a user requests the object selection system to automatically select an object in an image. In some embodiments, the query string is submitted as a text string. In alternative embodiments, the object selection system detects alternative user input, such as voice data, and converts the alternative user input into text to obtain the query string.

As used herein, the term "object mask" or "segmentation mask" or "object segmentation" refers to an indication of a plurality of pixels portraying an object. For example, an object mask can include a segmentation boundary (e.g., a boundary line or curve indicating an edge of one or more objects) or a segmentation mask (e.g., a binary mask identifying pixels corresponding to an object). Generating an object mask is sometimes referred to as "selecting" a target object (i.e., identifying pixels that represent the target object).

As used herein, the term "approximate boundary" refers to an indication of an area including an object that is larger and/or less accurate than an object mask. In one or more embodiments, an approximate boundary can include at least a portion of a query object and portions of the image not comprising the query object. An approximate boundary can include any shape, such as a square, rectangle, circle, oval, or other outline surrounding an object. In one or more embodiments, an approximate boundary comprises a bounding box.

As just mentioned, a query string can include a query object. The term "query object" refers to the object in the query string that is being requested by the user for detection and selection. For example, the noun in the query string indicates the query object. In additional embodiments, the query string includes additional words, such as adjectives and adverbs that indicate attributes of the query object. As used herein, the term "object attribute" refer to a descriptive word further identifying the query object. Examples of object attributes include color, size, length, shape, position, location, pattern, composition, expression, emotion, rigidity, and/or flexibility.

The term "object selection pipeline" refers to a collection of components and actions utilized to detect and select a query object in an image. In various embodiments, the object selection system utilizes a subset of the components and actions in the object selection pipeline to detect and select a query object in an image, where output from one component is provided as input to another component. The components and actions can include neural networks, machine-learning models, heuristic models, and/or functions. Further, the components and actions in the object selection pipeline can be interchangeable, removable, replaceable, or upgradable, as described in further detail below.

As mentioned above, the object selection system can employ machine learning and various neural networks in various embodiments. The term "machine learning," as used herein, refers to the process of constructing and implementing algorithms that can learn from and make predictions on data. In general, machine learning may operate by building models from example inputs, such as image exposure training pairs within a training dataset of images, to make data-driven predictions or decisions. Machine learning can include neural networks (e.g., a natural language processing neural network, a specialized object detection neural network, a concept-based object detection neural network, a known object class detection neural network, an object proposal neural network, an unknown object class detection neural network, a region proposal neural network, a concept embedding neural network, an object mask neural network, an object classification neural network, and/or a selected object attribute detection neural network), data-based models (e.g., a natural language processing model, an unknown object class detection model, an object recognition model, a filtering model, and/or a selection object attribute model), or a combination of networks and models.

As used herein, the term "neural network" refers to a machine learning model that can be tuned (e.g., trained) based on inputs to approximate unknown functions. In particular, the term neural network can include a model of interconnected neurons that communicate and learn to approximate complex functions and generate outputs based on a plurality of inputs provided to the model. For instance, the term neural network includes an algorithm (or set of algorithms) that implements deep learning techniques that utilize a set of algorithms to model high-level abstractions in data using supervisory data to tune parameters of the neural network. Examples of neural networks include a convolutional neural network (CNN), Region-CNN (R-CNN), Faster R-CNN, Mask R-CNN, and single shot detect (SSD).

Referring now to the figures, FIG. 1 illustrates a schematic diagram of an environment 100 in which the object selection system 106 can operate in accordance with one or more embodiments. As shown in FIG. 1, the environment 100 includes a client device 102 and a server device 110 connected via a network 108. Additional detail regarding computing devices (e.g., the client device 102 and the server device 110) is provided below in connection with FIG. 23. In addition, FIG. 23 also provides additional detail regarding networks, such as the illustrated network 108.

Although FIG. 1 illustrates a particular number, type, and arrangement of components within the environment 100, various additional environment configurations are possible. For example, the environment 100 can include any number of client devices. As another example, the server device 110 can represent a set of connected server devices. As a further example, the client device 102 may communicate directly with the server device 110, bypassing the network 108 or utilizing a separate and/or additional network.

As shown, the environment 100 includes the client device 102. In various embodiments, the client device 102 is associated with a user (e.g., a user client device), such as the user that requests automatic selection of an object in an image. The client device 102 can include an image editing system 104 and an object selection system 106. In various embodiments, the image editing system 104 implements the object selection system 106. In alternative embodiments, the object selection system 106 is separate from the image editing system 104. While the image editing system 104 and the object selection system 106 is shown on the client device 102, in some embodiments, the image editing system 104 and the object selection system 106 are located remotely from the client device 102 (e.g., on the server device 110), as further explained below.

The image editing system 104, in general, facilitates the creation, modification, sharing, and/or deletion of digital images within applications. For instance, the image editing system 104 provides a variety of tools related to image creation and editing (e.g., photo-editing). For example, the image editing system 104 provides selection tools, color correction tools, and image manipulation tools. Moreover, the image editing system 104 can operate in connection with one or more applications to generate or modify images. For example, in one or more embodiments, the image editing system 104 operates in connection with digital design applications such as ADOBE® PHOTOSHOP®, ADOBE® ELEMENTS®, ADOBE® INDESIGN®, or other image editing applications.

In some embodiments, the image editing system 104 provides an intelligent image editing assistant that performs one or more automatic image editing operations for the user. For example, given an image of three men, a user requests that the image editing system "remove the man on the left." As part of fulfilling the request, the image editing system 104 utilizes the object selection system 106 to automatically select the man on the left. The image editing system 104 can then utilize additional system components (e.g., a hole filling neural network) to remove and replace the selected man on the left (e.g., the detected query object).

As mentioned above, the image editing system 104 includes the object selection system 106. As described in detail below, the object selection system 106 accurately detects and automatically selects objects in an image based on a user's request (e.g., a user-provided query string). The object selection system 106, in many embodiments, utilizes an object selection pipeline to determine which object detection neural networks to utilized based on the query object as well as which additional neural networks and/or models to utilize to select the particular requested query object.

As shown, the environment 100 also includes the server device 110. The server device 110 includes an object selection server system 112. For example, in one or more embodiments, the object selection server system 112 represents and/or provides similar functionality as described herein in connection with the object selection system. In some embodiments, the object selection server system 112 supports the object selection system 106 on the client device 102.

Indeed, in one or more embodiments, the server device 110 can include all, or a portion of, the object selection system 106. In particular, the object selection system 106 on the client device 102 can download an application from the server device 110 (e.g., an image editing application from the object selection server system 112) or a portion of a software application.

In some embodiments, the object selection server system 112 can include a web hosting application that allows the client device 102 to interact with content and services hosted on the server device 110. To illustrate, in one or more embodiments, the client device 102 accesses a web page supported by the server device 110 that automatically selects objects in images based on the user providing a query string via the client device 102. As another example, the client device 102 provides an image editing application that provides the image and the query string to the object selection server system 112 on the server device 110, which then detects the query object and provides an object mask of the detected query object back to the client device 102. Then, utilizing the object mask, the image editing application on the client device 102 selects the detected query object.

Figure 2:
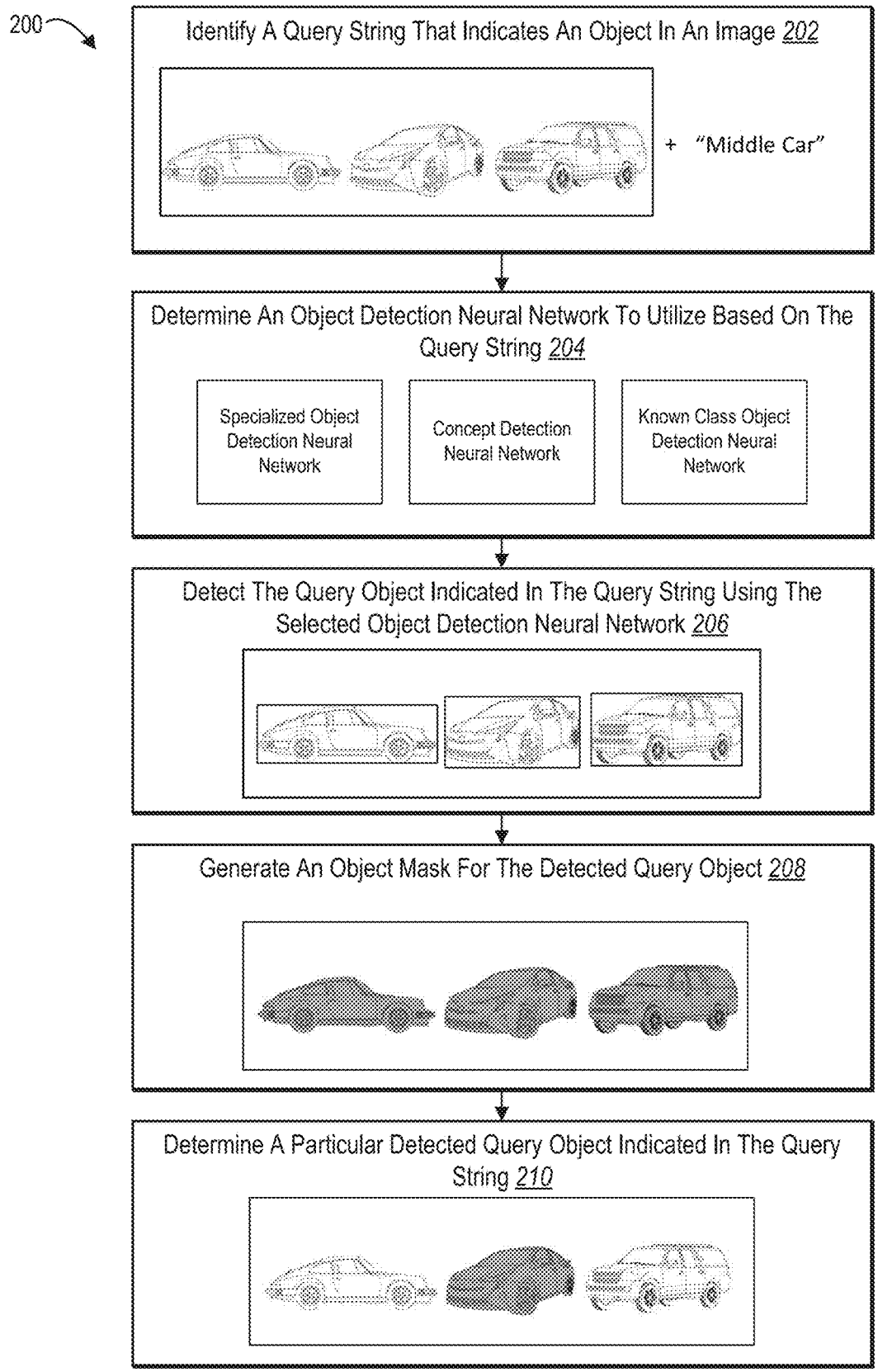
FIG. 2 illustrates a schematic diagram of automatically detecting and selecting a query object in an image in accordance with one or more embodiments.

As mentioned above, FIG. 1 shows an example environment 100 in which the object selection system 106 can operate. Turning to the next figure, FIG. 2 provides an overview of utilizing the object selection system to automatically select an object in an image. In particular, FIG. 2 illustrates a series of acts 200 of automatically detecting and selecting a query object in an image in accordance with one or more embodiments. In various embodiments, the object selection system 106 performs the series of acts 200.

As shown in FIG. 2, the object selection system 106 performs an act 202 of identifying a query string that indicates an object in an image. For example, a user utilizes an image editing program to edit an image. While editing the image, the user desires to select a particular object within the image. Accordingly, the object selection system 106 provides the user with a graphical interface that enables the user to enter a query string requesting automatic selection of the object. As shown in FIG. 2 in connection with the act 202, the user provides the query string of "middle car" to be selected from the image of three cars.

In response to receiving a query string, the object selection system 106 performs the act 204 of determining an object detection neural network to utilize based on the query string. For example, the object selection system 106 utilizes natural language processing to identify a query object from the query string. In additional embodiments, the object selection system 106 analyzes the query object to determine an object type or class. Based on the object type or class, the object selection system 106 can select the object detection neural network that will optimally detect the query object. For example, based on determining that the query object of "car" corresponds to a known object class, the object selection system 106 selects the known object class detection neural network. Notably, while FIG. 2 shows a specialized object detection neural network, a concept detection neural network, and a known object class detection neural network, the object selection system 106 can utilize other object detection neural networks.

As illustrated, the object selection system 106 performs the act 206 of detecting the query object indicated in the query string using the selected object detection neural network. For example, the object selection system 106 utilizes the known object class detection neural network to detect a car within the image. In additional embodiments, when multiple instances of the query object are included in the image, the object selection system 106 can detect each of the multiple instances. To illustrate, the act 206 shows the known object class detection neural network detecting each of the three cars in the image.

As shown in the act 208, the object selection system 106 generates an object mask for the detected query object. For example, the object selection system 106 provides the detected object to an object mask neural network, which generates an object mask (e.g., selection mask) for the object. In some embodiments, when multiple instances of the object are detected, the object mask neural network can generate a separate object mask for each instance, as shown in connection with the act 208.

As illustrated in FIG. 2, the object selection system 106 performs the act 210 of determining a particular detected query object indicated in the query string. As mentioned above, in some instances, the object selection system 106 determines object attributes from the query string. A query string often includes object attributes for a query object when multiple instances of the query object are included in the image. In this manner, the object attribute indicates a particular instance of the query object that the user is requesting be automatically selected.

When an object attribute is detected, the object selection system 106 can analyze the object attribute to determine whether to utilize a particular attribute detection model. As described below, in various embodiments, the object selection system 106 utilizes the selected attribute detection model to detect the particular instance of the query object based on the object attribute. For example, as shown in connection with the act 210, the object selection system 106 selects the middle car based on the object attribute of "middle."

Upon selecting one or more particular instances of the query object that satisfy the object attribute, the object selection system 106 can provide the one or more particular instances to the user as one or more selections. In alternative embodiments, when the query string does not indicate object attributes, the object selection system 106 can provide the one or more each instance of the detected query object as one or more selections within the image to the user.

As a note, the object selection system 106 can perform some of the acts 202-210 in the series of acts 200 in a variety of orders. For example, the object selection system 106 can determine a particular detected query object (e.g., the act 210) before generating one or more object masks (e.g., act 208). In some embodiments, the order utilized by the object selection system 106 is based on the object type or class of the query object and/or object attribute. For example, if the object attribute is a color or position, the object selection system 106 can perform the act 210 before the act 208.

Figure 3A:
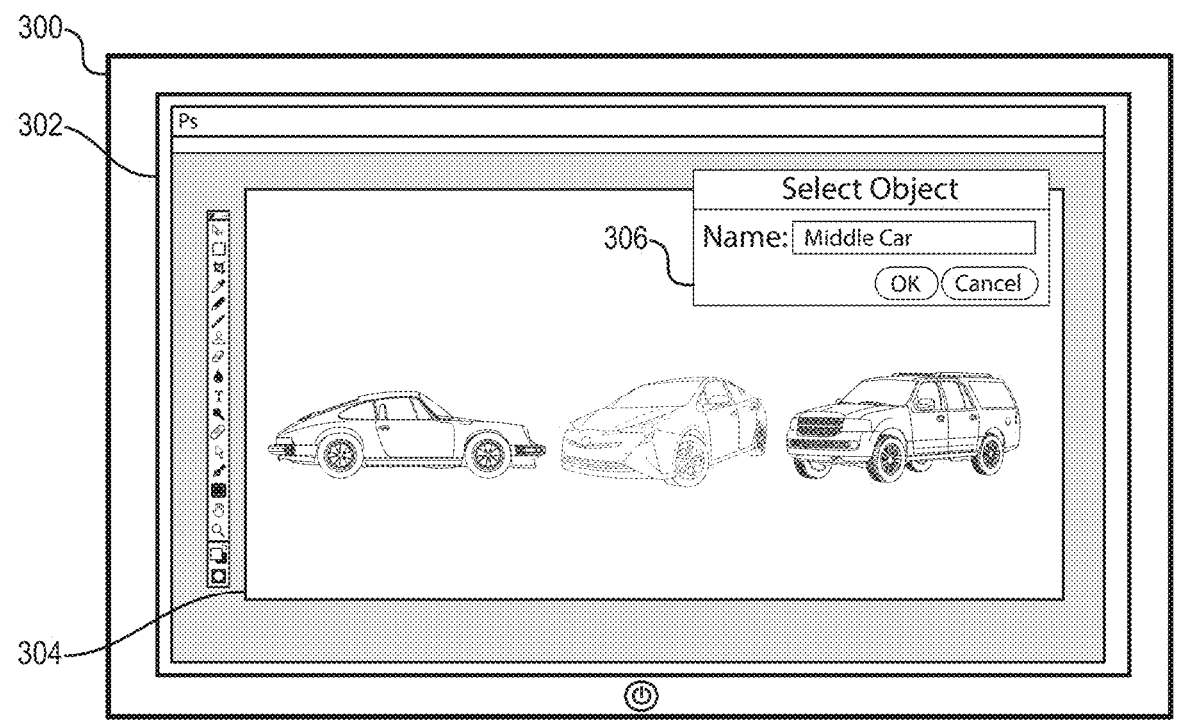
FIGS. 3A-3B illustrate a graphical user interface of automatically detecting and selecting a query object in an image in accordance with one or more embodiments.
Figure 3B:
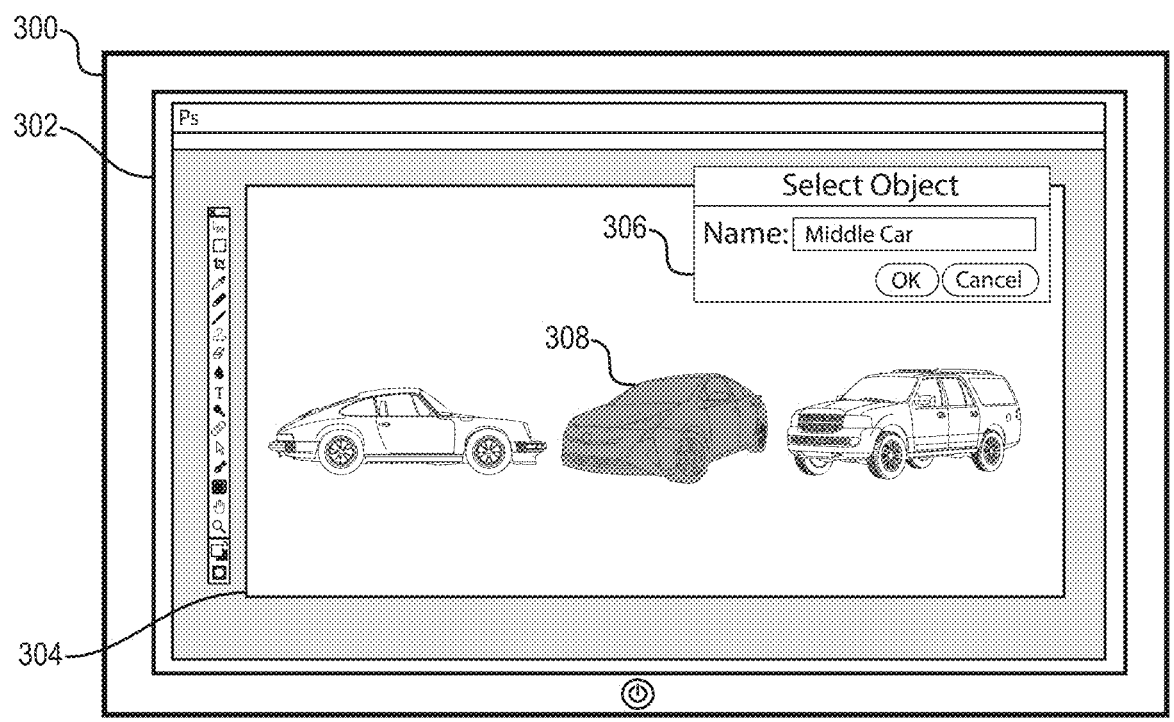

FIGS. 3A-3B illustrate a client device 300 having a graphical user interface 302 that illustrates a selected query object in an image based on an object detection request (i.e., selection request) in accordance with one or more embodiments. The client device 300 in FIGS. 3A-3B can represent the client device 102 introduced above with respect to FIG. 1. For instance, the client device 300 includes an image editing application that implements the image editing system 104 having the object selection system 106. For example, the graphical user interface 302 in FIGS. 3A-3B can be generated by the image editing application.

As shown in FIG. 3A, the graphical user interface 302 includes an image 304 within an image editing application. The image 304 can correspond to the image mentioned above in connection with FIG. 2. For ease in explanation, the image 304 is simplified to show three cars without background or other objects.

In response to a user selecting an option to have an object automatically selected, the object selection system 106 can provide an object selection interface 306. For example, the object selection system 106 provides the object selection interface 306 as a selection tool within the image editing application. As shown, the object selection interface 306 can include a text field where a user can enter a query string (i.e., "Middle Car"). The object selection interface 306 also include selectable options to confirm or cancel an object detection request. In some embodiments, the object selection interface 306 includes additional elements, such as a selectable option to capture audio input from a user dictating the query string.

Based on receiving an object detection request that includes a query string (i.e., "middle car"), the object selection system 106 can automatically detect and select the query object. In particular, the object selection system 106 can detect each instance of the query object (e.g., each of the three cars) in the image 304 as well as identify the particular instance specified in the query string (e.g., the "middle" car). To illustrate, FIG. 3B shows the result of the object selection system 106 automatically selecting the middle car 308 within the image 304 in response to the object detection request. Once selected, the image editing application can enable the user to edit, copy, cut, move and/or otherwise modify the selected object.

As shown, the object selection system 106 enables the user to provide a query string within the object selection interface 306. In some embodiments, the object selection system 106 enables a user to provide the audio or other input to indicate a query string. For example, the client device 300 can include a microphone that captures the user speaking the query string and speech-to-text processing to convert the query string to text. Moreover, as described below, in some embodiments, the object selection system 106 enables the user to provide additional input, such as a mouse or touch gesture to further assist the object selection system 106 to automatically select a particular query object.

Figure 4:
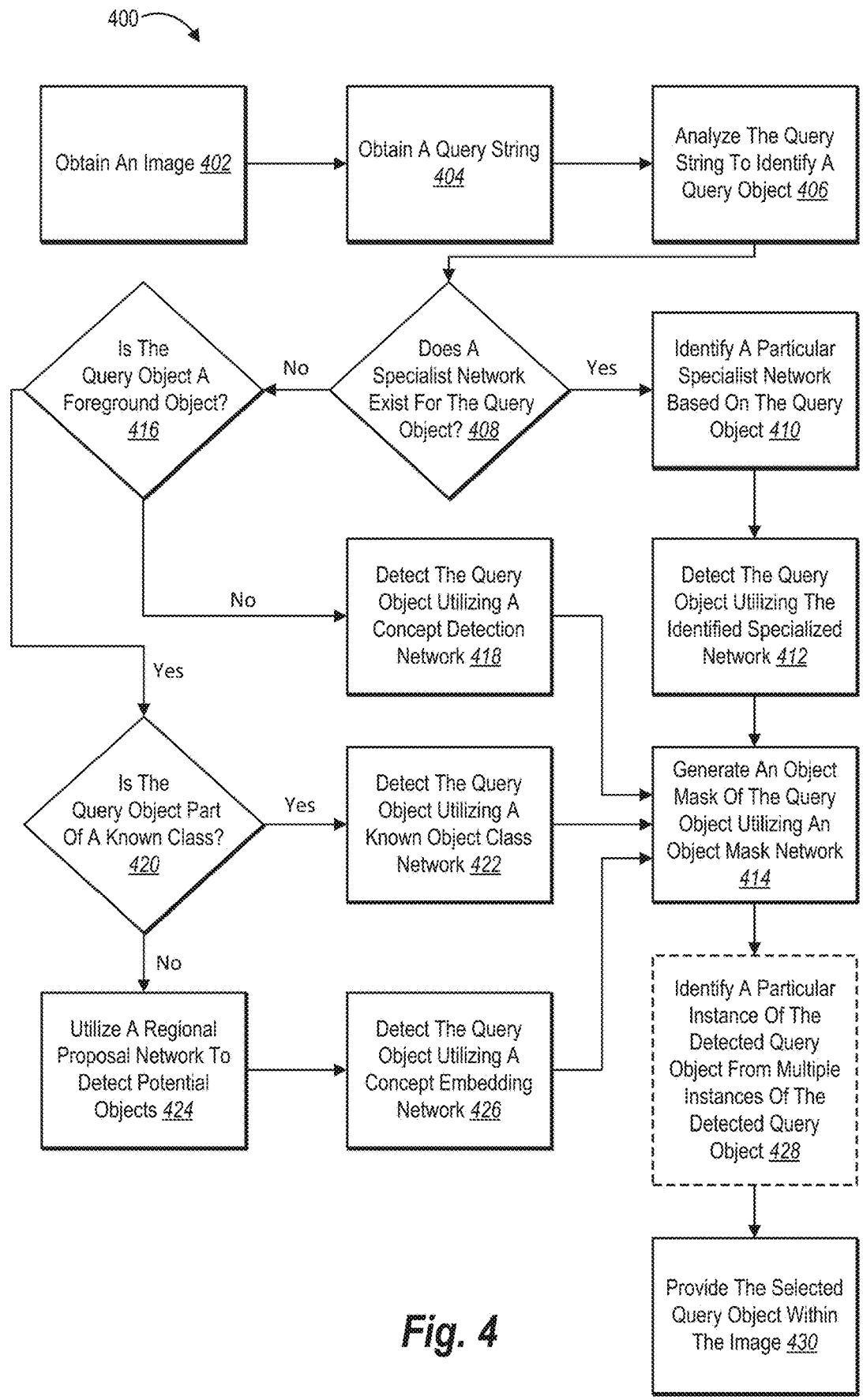
FIG. 4 illustrates a schematic diagram of an object selection pipeline in accordance with one or more embodiments.

Turning now to FIGS. 4-18, additional detail is provided regarding the object selection system 106 generating and utilizing an object selection pipeline to automatically select and accurately detect objects requested in an object detection request. In particular, FIG. 4 illustrates an example embodiment of the object selection pipeline. FIGS. 5-18 illustrate expanded portions of the object selection pipeline along with example corresponding graphical user interfaces.

As mentioned, FIG. 4 illustrates a schematic diagram of an object selection pipeline 400 in accordance with one or more embodiments. In various embodiments, the object selection system 106 performs actions included in the object selection pipeline 400. In alternative embodiments, an image editing system and/or image editing application can perform one or more of the included actions.

As shown, the object selection pipeline 400 includes an act 402 of the object selection system 106 obtaining an image (i.e., a digital image). For example, the user loads an image into an image editing application, as previously described. In general, the image includes one or more objects. For instance, the image can include background objects (i.e., scenery), foreground objects (i.e., image subjects), and/or other types of objects.

In addition, the object selection pipeline includes an act 404 of the object selection system 106 obtaining a query string. For example, the object selection system 106 provides an object selection interface (e.g., shown in FIG. 3A) where a user can enter one or more words indicating the object that they would like the object selection system to automatically select. As described above, in some embodiments, the object selection system 106 can enable alternative forms of user input, such as audio input telling the object selection system 106 to select an object in the image.

Next, the object selection pipeline 400 includes an act 406 of the object selection system 106 analyzing the query string to identify a query object. In general, the object selection system 106 can parse the query string and utilize natural language processing to identify a query object. Additional detail regarding the act 406 is provided with respect to FIG. 5 below.

As shown, the object selection pipeline 400 includes an act 408 of the object selection system 106 determining whether a specialist network exists for the query object. For instance, in one or more embodiments, the object selection system 106 can analyze the query object to identify an object type or class. Further, the object selection system 106 can compare the query object type or object class to a listing or lookup table to determine if an object detection neural network has been trained to optimally detect the query object.

If a specialty network exists for the query object, the object selection system 106 can identify a particular specialist network based on the query object, as shown in the act 410. For instance, the object selection system 106 can compare the object type or class of the query object to multiple specialist object detection neural networks to identify the specialist object detection neural network that best corresponds to the query object.

In many embodiments, the act 408 and the act 410 are combined into a single act. For instance, in determining whether a specialist object detection neural network exists for the query object (e.g., the act 408), the object selection system 106 can also identify a particular specialist network based on the query object (e.g., the act 410). For example, for the query object of "waterfall," the object selection system 106 can identify that the waterfall specialist object detection neural network is best suited to identify and select the query object.

As shown in the act 412, the object selection system 106 can detect the query object utilizing the identified specialized network. More specifically, the object selection system 106 can utilize the identified specialized object detection neural network to locate and detect the query object within the image. For instance, the object selection system 106 can utilize the specialized object detection neural network to generate a bounding box around the detected query object in the image. In some embodiments, if multiple instances of the query object are included in the image, the object selection system 106 can utilize the specialized object detection neural network to separately identify each instance of the multiple instances. Additional detail regarding the act 410 and the act 412 is provided below with respect to FIGS. 6-7B.

As shown, the object selection pipeline 400 includes the act 414 of the object selection system 106 generating an object mask of the query object utilizing an object mask neural network. For example, in various embodiments, the object selection system 106 can provide a bounding box to an object mask neural network, which generates a mask for the detected query object. If multiple bounding boxes are provided, the object selection system 106 can utilize the object mask neural network to generate multiple object masks from the multiple bounding boxes (e.g., one object mask for each instance of the detected query object).

In generating an object mask for a detected query object (or each detected query object instance), the object mask neural network can segment the pixels in the detected query object from the other pixels in the image. For example, the object mask neural network can create a separate image layer that sets the pixels corresponding to the detected query object to positive (e.g., binary 1) while setting the remaining pixels in the image to a neutral or negative (e.g., binary 0). When this object mask layer is combined with the image, only the pixels of the detected query object are visible. Indeed, the generated object mask can provide a segmentation that enables selection of the detected query object within the image.

The object mask neural network can correspond to one or more deep neural networks or models that select an object based on bounding box parameters corresponding to the object within an image. For example, in one or more embodiments, the object mask neural network utilizes the techniques and approaches found in Ning Xu et al., "Deep GrabCut for Object Selection," published Jul. 14, 2017, the entirety of which is incorporated herein by reference. For example, the object mask neural network can utilize a deep grad cut approach rather than saliency mask transfer. As another example, the object mask neural network can utilize the techniques and approaches found in U.S. Patent Application Publication No. 2019/0130229, "Deep Salient Content Neural Networks for Efficient Digital Object Segmentation," filed on Oct. 31, 2017; U.S. patent application Ser. No. 16/035,410, "Automatic Trimap Generation and Image Segmentation," filed on Jul. 13, 2018; and U.S. Pat. No. 10,192,129, "Utilizing Interactive Deep Learning To Select Objects In Digital Visual Media," filed Nov. 18, 2015, each of which are incorporated herein by reference in their entirety.

Further, with respect to embodiments where the object mask neural network performs instance level segmentation (e.g., semantic segmentation), the object mask neural network can utilize the techniques and approaches found in U.S. Patent Application Publication No. 2018/0108137, "Instance-Level Semantic Segmentation System," filed on Oct. 18, 2016. Additionally, or alternatively, the object mask neural network can utilize the techniques and approaches found in U.S. Pat. No. 9,129,191, "Semantic Object Selection," issued on Sep. 8, 2015, each of which are incorporated herein by reference in their entirety.

Returning to FIG. 4, if in the act 408, the object selection system 106 determines that the query object does not correspond to a specialist network, the object selection system 106 can make an additional determination regarding the query object. As shown, the object selection pipeline 400 includes the act 416 of determining whether the query object is a foreground object. If the object selection system 106 determines that the query object is a foreground object, the object selection system 106 can make an additional determination with respect to the query object (e.g., the act 420). Otherwise, if the query object is not a foreground object (i.e., a background object), the object selection system 106 can utilize concept-based object detection techniques to detect the query object, as described in connection with the act 418.

In various embodiments, the object selection system 106 can determine whether the query object is a foreground object (e.g., the act 416) based on correlating the query object, object type, or object class to known foreground objects, object types, and object classes. For example, the object selection system 106 can compare the object class of the query object to a list of known foreground object classes. If a match or a correlation is found, then the object selection system 106 can classify the query object as a foreground object. Indeed, if a foreground object correlation score satisfies (e.g., meets or exceeds) a foreground object correlation threshold (e.g., 80% confidence as a foreground object), then the object selection system 106 can follow the object selection pipeline 400 to the act 420.

In additional or alternative embodiments, the object selection system 106 can compare the query object to known background objects and concepts to determine whether the query object is a background object, concept-based object, or a high-level description of an objects. For example, the object selection system 106 can analyze the query object to determine if the query object correlates (e.g., matches, is synonymous, or is similar) to a known concept (e.g., clothing, person, senior, woman, holding, happy, or healthy). If the correlation of the query object (e.g., a correlation score) does not satisfy a background object threshold, then the object selection system 106 can classify the query object as a foreground object.

As mentioned above, if, in the act 416, the object selection system 106 determines that the query object is not a foreground object, the object selection system 106 can utilize a concept detection network to detect the query object. To illustrate, the act 418 includes the object selection system 106 detecting the query object utilizing a concept detection network (i.e., a concept-based object detection neural network). As described below, a concept detection network can include an object detection neural network trained to detect objects based on concepts, background scenery, and other high-level descriptions of objects. Additional detail regarding the act 418 is provided below with respect to FIGS. 8-9B.

As shown in FIG. 4, the object selection system 106 provides the query object detected by the concept detection network to the object mask neural network to generate an object mask of the detected query object (i.e., the act 414). As mentioned above, the object mask neural network can generate a segmentation of the detected query object, which the object selection system 106 utilizes to select the detected query object.

In some embodiments, there can be overlap between object concepts and foreground objects. For example, the object selection system 106 can train the concept detection network based on one or more object concepts that include foreground objects. Thus, in these embodiments, the object selection system 106 can determine that the query object may be both an object concept (i.e., background object) as well as a foreground object.

In these embodiments, the object selection system 106 can utilize either the concept detection network, an object class detection network (described below), or both. For example, the object selection system 106 can utilize both object detection neural networks and select the network that better detects the query object. Alternatively, the object selection system 106 can select the network having a stronger correspondence to the query object, and in some cases, can use the other network to verify detection of the object. In some embodiments, the object selection system 106 can utilize both networks and combine the detection results (e.g., generate a weighted aggregate).

If the object selection system 106 determines in the act 416 that the query object is a foreground object, the object selection system 106 can perform an additional determination. To illustrate, the object selection pipeline 400 includes the act 420 of the object selection system 106 of determining whether the query object is part of a known object class. For example, in various embodiments, the object selection system 106 utilizes an object detection neural network trained to detect objects belonging to a number of known object classes. Accordingly, the object selection system 106 can compare the object class of the query object to the known object classes to determine if the query object is part of the known object classes. If so, the object selection system 106 can proceed to the act 422 of the object selection pipeline 400. Otherwise, the object selection system 106 can proceed to the act 424 of the object selection pipeline 400, described further below.

As just mentioned, the object selection pipeline 400 includes the act 422 of the object selection system 106 detecting the query object utilizing a known object class network. Known object classes can include object classes tagged in training images and used to train an object detection neural network. Accordingly, based on detecting that the query object is associated with a known object class, the object selection system 106 can utilize a known object class detection neural network to optimally detect the query object. Further, the object selection system 106 can provide the detected object to the object mask neural network to generate an object mask (e.g., the act 414), as described above. Additional detail regarding the act 422 is provided below with respect to FIGS. 10-11D.

Up to this point in the object selection pipeline 400, the object selection system 106 has been able to detect query objects corresponding to known object classes. While the list of known object classes often numbers in the tens of thousands, the object selection system 106 can automatically detect a much larger number of objects. Accordingly, the object selection system 106 can further extend object recognition capabilities by detecting objects of unknown categories. Indeed, the object selection system 106 can add additional layers to the object selection pipeline 400 to facilitate the detection of unknown objects.

To illustrate, if the object selection system 106 determines in the act 420 that the query object is not part of a known object class, the object selection system 106 can detect the query object using a series of additional neural networks and models. In a number of embodiments, the series of additional neural networks and models are included within an unknown object class detection neural network. As shown, the object selection pipeline 400 includes the act 424 of the object selection system 106 utilizing a regional proposal network to detect potential objects (i.e., candidate objects) in the image. For example, the regional proposal network can detect any detectable object in the image. In particular, the region proposal network generates a bounding box around each potential object detected in the image. An example regional proposal network is S. Ren, K. He, R. Girshick, and J. Sun, *Faster r-cnn: Towards real-time object detection with region proposal networks*, NIPS, 2015, the entire contents of which are hereby incorporated by reference.

Further, the object selection pipeline 400 includes the act 426 of the object selection system 106 detecting the query object utilizing a concept embedding network. For example, in one or more embodiments, the object selection system 106 utilizes the concept embedding network to filter down the potential objects and detect the query object. Further, the object selection system 106 can provide the detected object to the object mask neural network to generate an object mask (e.g., the act 414), as described above. Additional detail regarding the act 424 and the act 426 is provided with respect to FIGS. 12-13D below.

As shown in FIG. 4, the object selection pipeline 400 includes the optional act 428 of identifying a particular instance of the detected query object from multiple instances of the detected query object. For example, as described below in connection with FIGS. 14-18, the object selection system 106 can determine a particular instance of the detected query object based on one or more object attributes of the query object indicated in the query string.

Moreover, the object selection pipeline 400 includes the act 430 of the object selection system 106 providing the detected query object within the image to the user. For instance, the object selection system 106 can provide the selected query object (or selected instance of the query object) to the client device associated with the user. For example, the object selection system 106 can automatically select the query object within the image for the user within the image editing application mentioned above.

FIG. 4 and the identified corresponding figures describe various embodiments of selecting objects in an image. Accordingly, the actions and algorithms described in connection with FIG. 4 and subsequent identified figures (e.g., FIGS. 5-18) provide example structure and architecture for performing a step for detecting a query object utilizing an object detection neural network selected from a plurality of object detection neural networks. Indeed, the flow charts described in connection with FIGS. 4, 5, 6, 8, 10, 12, 14, and 16 provides structure for one or more of the algorithms corresponding to the object selection system 106.

Figure 5:
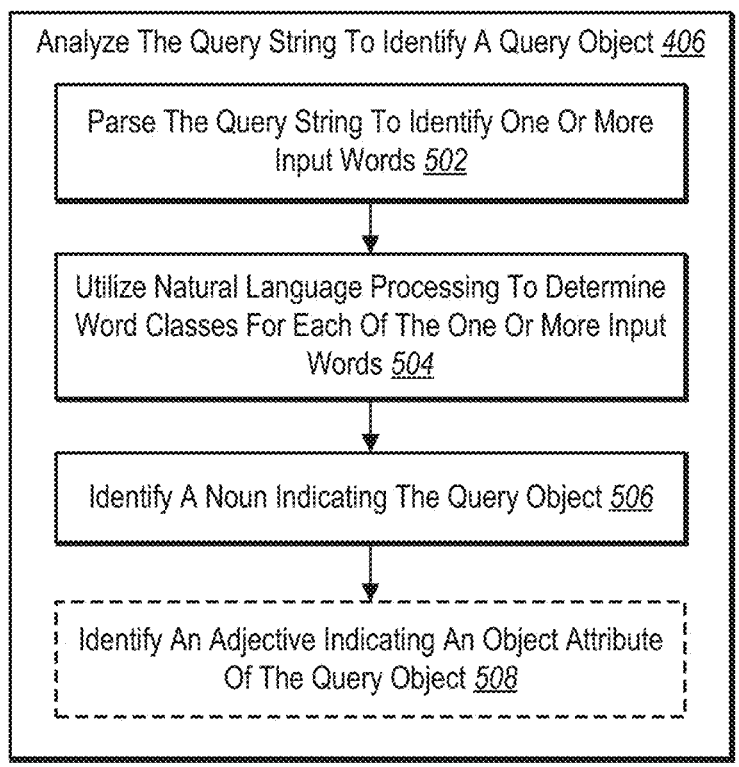
FIG. 5 illustrates a flow chart of analyzing a query string to identify a query object in accordance with one or more embodiments.

Turning now to the next figure, FIG. 5 illustrates a flow chart of analyzing a query string to identify a query object in accordance with one or more embodiments. As mentioned above, FIG. 5 corresponds to the act 406 of the object selection pipeline 400 described above in connection with FIG. 4. In particular, FIG. 5 includes various acts 502-508 that provide additional detail regarding the act 406 of the object selection pipeline 400.

As shown, the act 406 can include the act 502 of the object selection system 106 parsing the query string to identify one or more input words. For example, in various embodiments, the object selection system 106 separates the query string into individual words. For instance, the object selection system 106 assigns each word in the query string to an element of a vector that corresponds to the query string. Also, as mentioned above, in some embodiments, the query string is made up of a single word.

As also shown, the act 406 can include the act 504 of the object selection system 106 utilizing natural language processing to determine word classes for each of the one or more input words. Indeed, upon parsing out each word in the query string, the object selection system 106 can classify and assign each input word in the query string to a word classes. In various embodiments, word classes include parts of speech (e.g., nouns, proper nouns, verbs, articles, adjectives, adverbs, pronouns, prepositions, or conjunctions).

In one or more embodiments, the object selection system 106 utilizes a machine-learning model trained based on natural language processing to identify the word class of each word in the query string. For example, the object selection system 106 trains and/or utilizes a long-short-term memory (LSTM) neural network to identify the word class for each of the words in the query string. In alternative embodiments, the object selection system 106 utilizes other methods to determine the word class for input words in the query string.

As shown, the act 406 can include the act 506 of the object selection system 106 identifying a noun indicating the query object. More specifically, upon assigning word classes for each of the words, the object selection system 106 can identify a noun in the query string. Primarily, the noun in the query string corresponds to the query object. Often, when the query string includes a single word, the word is a noun corresponding to the query object.

In some instances, the query string includes multiple nouns. In these instances, the object selection system 106 can determine if the two nouns are connected to indicate a single query object (e.g., "German" and "Shepard"). In alternative embodiments, the object selection system 106 can determine whether the query string includes multiple query objects for the object selection system 106 to automatically select.

In addition, the act 406 can include the optional act 508 of the object selection system 106 identifying an adjective indicating an object attribute of the query object. Similar to identifying a noun in the query string, the object selection system 106 can also identify adjectives in the query string as object attributes. Often, a query string with multiple words will include a query object along with one or more adjectives that specify a particular attribute of the query object. As described below, an object attribute can specify a color, size, position, shape, material, location, rigidity, or expression of the query object.

In one or more embodiments, the object selection system 106 also can identify an adverb or other part of speech (i.e., word class) in the query string. In some embodiments, the object selection system 106 can assign the adverb an as object attribute of the query object. Further, in one or more embodiments, the object selection system 106 can group the adverb with a corresponding adjective (e.g., "very tall"). In alternative embodiments, the object selection system 106 can ignore words that are not nouns or adjectives.

Similarly, in one or more embodiments, the object selection system 106 can filter out words of the query string, such as articles (e.g., "the," "a," "an"). In some embodiments, the object selection system 106 can identify conjunctions, which indicate the possibility of multiple query objects being requests and/or multiple object attributes being provided. Similarly, in some embodiments, the object selection system 106 identifies negative words, such as the "not," "except," or "without," which can indicate exclusion of a particular object when selecting the query object.

Figure 6:
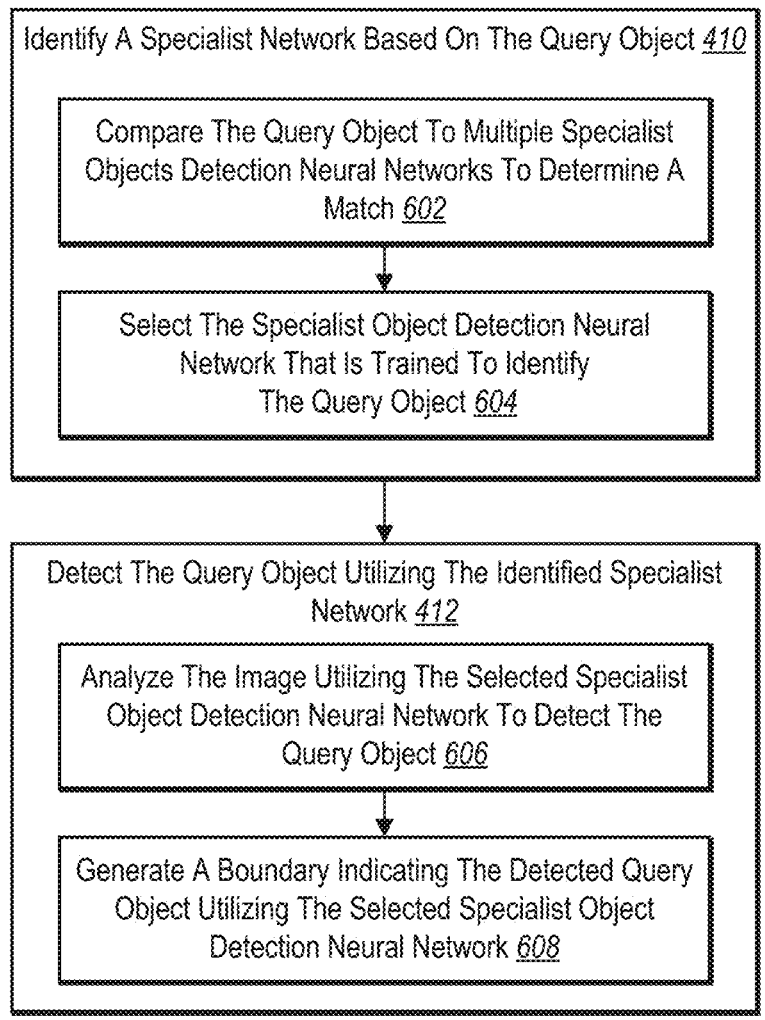
FIG. 6 illustrates a flow chart of identifying a specialist network based on a query object and detecting the query object in accordance with one or more embodiments.

Turning to FIG. 6, a flow chart of identifying a specialist network based on a query object and detecting the query object is illustrated in accordance with one or more embodiments. As mentioned above, FIG. 6 can correspond to the act 410 and the act 412 of the object selection pipeline 400 described above in connection with FIG. 4. In particular, FIG. 6 includes various acts 602-608 that provide additional detail regarding the acts 410 and 412 of the object selection pipeline 400.

As shown, the act 410 of identifying a specialist network based on the query object can include the act 602 of the object selection system 106 comparing the query object to multiple specialist object detection neural networks to determine a match. As mentioned above, a specialist object detection neural network (or simply "specialist network") can be an object detection neural network that is trained to detect a particular, and only a particular, object type or object class. Because the number of specialist networks is limited, the object selection system 106 can quickly determine whether a query object is detectable by one of the specialist networks. Examples of specialist object detection neural networks include, but are not limited to, specialist networks that detect the sky, bodies and skin, faces of people, or waterfalls.

The act 410 also can include the act 604 of the object selection system 106 selecting the specialist object detection neural network that is trained to identify the query object. In the above example, if the query object is identified as a man's face, then the object selection system 106 selects the corresponding specialist network to the query object to optimally detect faces of men within the image.

In one or more embodiments, the object selection system 106 can analyze previous query strings to determine which objects are requested most frequently. Based on this data, the object selection system 106 can create, obtain, and/or train additional specialist networks to more accurately detect frequently requested objects. As more specialist networks are trained, the object selection system 106 can add them to the object selection pipeline 400. In this manner, if a user subsequently requests selection of a query object that corresponds to a newly added specialist network, the object selection system can identify and select the specialist network without modifying, retraining, or reconfiguring the object selection pipeline 400.

FIG. 6 also can include the act 412 of detecting the query object utilizing the identified specialist network. As shown, the act 412 includes the act 606 of the object selection system 106 analyzing the image utilizing the selected specialist object detection neural network to detect the query object. For instance, the object selection system 106 provides the image to the selected specialist network. Then, utilizing the selected specialist network, the object selection system 106 analyzes the image to detect the query object within the image.

In addition, the act 412 can include the act 608 of the object selection system 106 generating an approximate boundary indicating the detected query object utilizing the selected specialist object detection neural network. For example, in one or more embodiments, upon detecting the query object, the selected specialist network generates a bounding box. In additional embodiments, the object selection system 106 also can annotate the bounding box with labels, such as the name of the detected query object, the position of the bounding box, and/or the dimension of the bounding box.

In one or more embodiments, the act 412 can include detecting multiple instances of the query object in an image. For example, while analyzing the image utilizing the selected specialist object detection neural network (e.g., the act 606), the object selection system 106 can detect more than one instance of the query object. Further, for each of the detected instances of the query object, the object selection system 106 can generate a corresponding bounding box (e.g., the act 608). In these embodiments, the object selection system 106 can provide each of the bounding boxes to the object mast network (e.g., the act 414 in FIG. 4).

As mentioned above, the object selection system 106 can utilize a specialist network to detect particular query objects within an image. As also mentioned, an example of a specialist network includes an object detection neural network trained to detect the sky within an image. For example, the object selection system 106 utilizes the techniques, approaches, and/or specialist networks described in Yi-Hsuan Tsai et al., "Sky is Not the Limit: Semantic-Aware Sky Replacement," *ACM Transactions on Graphics (SIGGRAPH)*, 2016, the entirety of which is incorporated herein by reference.

Figure 7A:
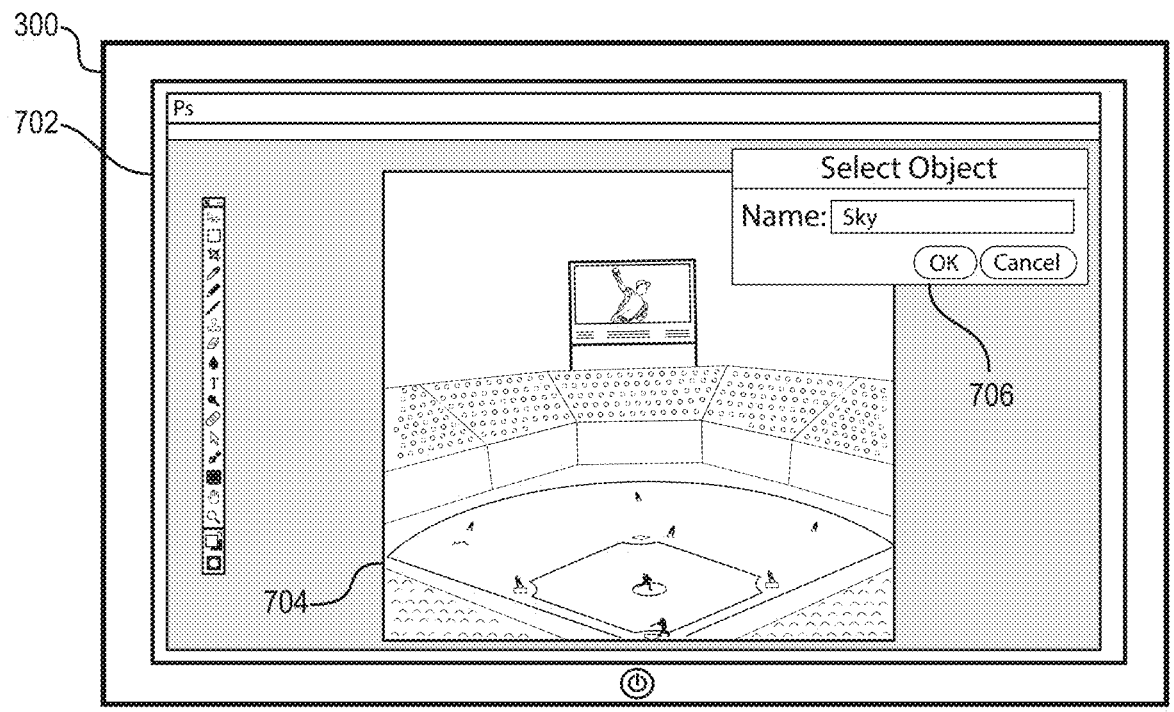
FIGS. 7A-7B illustrate a graphical user interface of utilizing a specialist network to detect the query object in accordance with one or more embodiments.
Figure 7B:
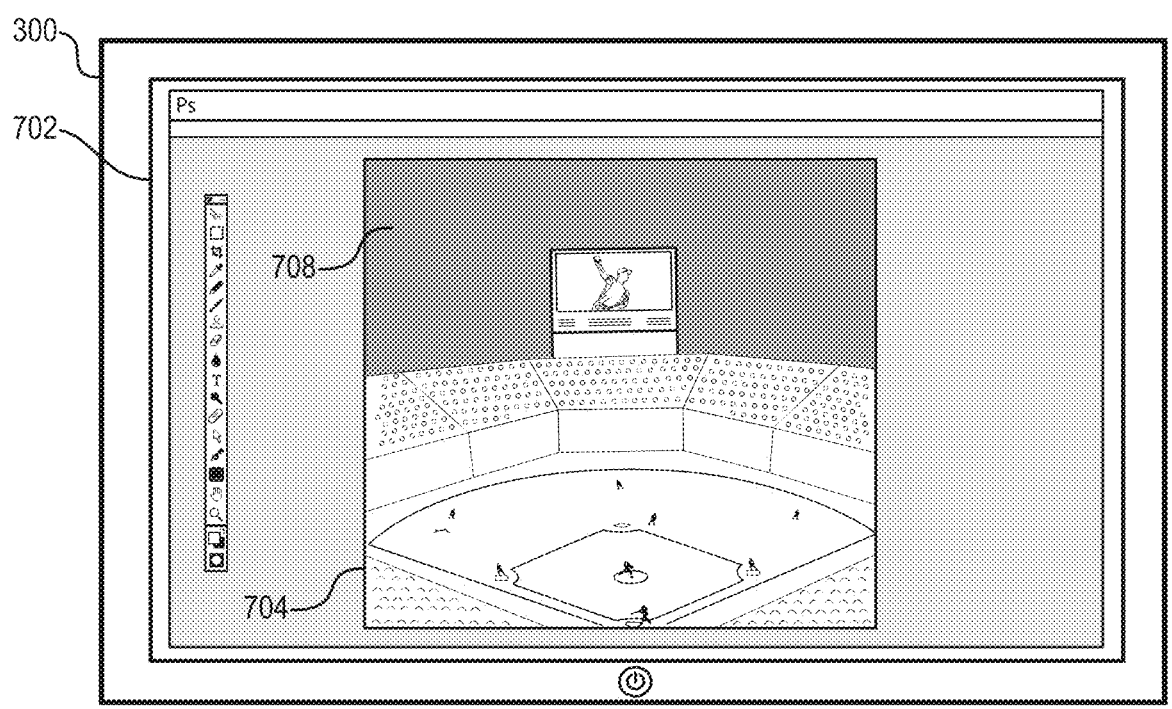

FIGS. 7A-7B illustrate a graphical user interface 702 that illustrates utilizing a specialist network to detect the query object in accordance with one or more embodiments. For ease in explanation, FIGS. 7A-7B include the client device 300 introduced above. For example, the client device 300 includes an image editing application that implements the image editing system 104 having the object selection system 106.

As shown in FIG. 7A, the graphical user interface 702 includes an image 704 within an image editing application. The image 704 shows a baseball stadium. The image editing application also includes various tools (e.g., a side toolbar) having selection options as well as other image editing options. In addition, the graphical user interface 702 includes an object selection interface 706, as described above in connection with FIG. 3A, where the user provides the query string of "sky."

Upon the user requesting automatic selection the sky (i.e., the query string) from the image 704, the object selection system 106 can utilize the object selection pipeline 400 to determine how to optimally fulfil the request. For example, the object selection system 106 can determine that the query object in the query string is "sky." Further, the object selection system 106 can determine that a sky specialist network has been trained specially to detect the query object. Accordingly, the object selection system 106 selects and utilizes the sky specialist network (e.g., a sky object detection neural network) to detect and select the sky 708 (e.g., the acts 410 and 412 of the object selection pipeline 400). As shown by FIG. 7B, the object selection system 106 can generate a mask (e.g., the darker pixels) to select the sky 708).

Figure 8:
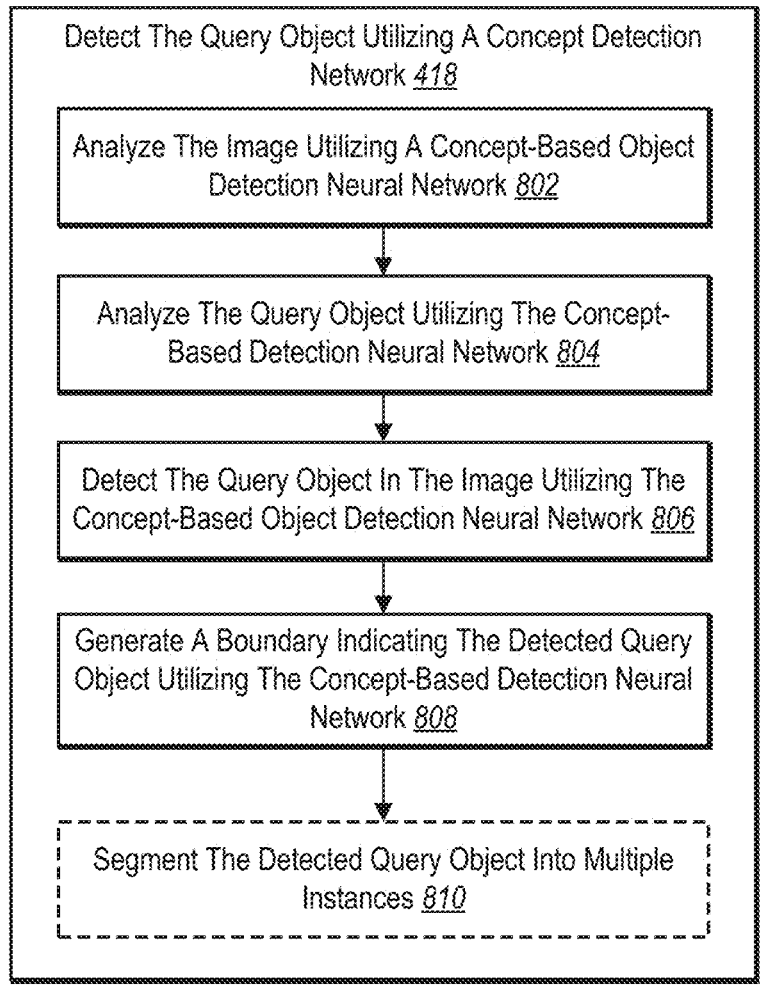
FIG. 8 illustrates a flow chart of detecting a concept-based query object utilizing a concept-based object detection network in accordance with one or more embodiments.

Turning to FIG. 8, a flow chart of detecting a concept-based query object utilizing a concept detection network is illustrated in accordance with one or more embodiments. As mentioned above, FIG. 8 corresponds to the act 418 of the object selection pipeline 400 described above in connection with FIG. 4. In particular, FIG. 8 includes various acts 802-810 that provide additional detail regarding the act 418 of the object selection pipeline 400.

As shown the act 414 of detecting a query object utilizing a concept detection neural network (e.g., a concept mask model) can include the act 802 of the object selection system 106 analyzing the image utilizing a concept-based object detection neural network (or simply "concept detection neural network"). For instance, the object selection system 106 can provide the image to a concept detection neural network trained to detect concept-based objects (e.g., concept objects). For example, the object selection system 106 can utilize a concept-based training dataset that enables the concept detection neural network to detect thousands (e.g., 18,000) of different concepts. As mentioned above, concept-based objects can include high-level class descriptions of objects often beyond general category class descriptions (background object classes). In general, concepts correspond to salient regions in an image (e.g., mountains, roads, water, sand, hills).

In addition, the act 418 can include the act 804 of the object selection system 106 analyzing the query object utilizing the concept-based object detection neural network. For instance, the object selection system 106 can provide the query string and/or the query object to the concept detection neural network to assist the concept detection neural network to detect the query object.

Further, as shown, the act 418 can include the act 806 of the object selection system 106 detecting the query object in the image utilizing the concept detection neural network. In particular, because the concept detection neural network is trained to detect concepts including the query object, the concept detection neural network can identify the query object within the image. Examples of a concept-based object detection neural network that the object selection system 106 can utilizes in one or more embodiments are further described in Yufei Wang et al., "Concept Mask: Large-Scale Segmentation from Semantic Concepts," *The European Conference on Computer Vision (ECCV)*, Aug. 18, 2018, the entirety of which is incorporated herein by reference.

As shown, the act 418 can include the act 808 of the object selection system 106 generating a boundary indicating the detected query object utilizing the concept detection neural network. For example, upon detecting the query object, the concept detection neural network generates a bounding box that encompasses the detected query object. As mentioned above, the approximate boundary (e.g., bounding box) can approximately cover the detected query object and can take the form of any shape, such as a square, rectangle, circle, oval, rough outline or the detected query object, a precise outline, or another shape. In additional embodiments, the object selection system 106 also annotates the bounding box with labels, such as the name of the background object class of the detected query object, the position of the bounding box, or the dimension of the bounding box.

In various embodiments, the object selection system 106 performs the acts 806 and 808 in a different order. For example, the object selection system 106 can utilize the concept detection neural network to first detect objects or regions in the image and generates boundary boxes for each region. Then the object selection system 106 and/or the concept detection neural network can apply boundary box suppression (described below) to narrow down the potential regions that include the query object. For example, the object selection system 106 utilizes intersection over union (IoU) scores to perform the boundary box suppression.

As described above, the object selection system 106 can provide the detected query object (e.g., the approximate boundary area indicating the detected query object) to the object mask network to generate an object mask of the detected query object (e.g., the act 414 of the object selection pipeline 400 described in FIG. 4). In alternative embodiments, the object selection system 106 utilizes the concept detection neural network itself to generate an object mask (i.e., a concept mask) of the detected query object (e.g., segment the detected query object for selection). In these embodiments, the object selection system 106 jumps to the act 428 or the act 430 of the object selection pipeline 400, as described above.

In one or more embodiments, the image includes multiple instances of a query object. For example, a concept-based query object is split by a foreground object. In these embodiments, the object selection system 106 can generate a single boundary that encompasses multiple instances of the detected query object. The object selection system 106 can provide the boundary to the object mask network as described above.

In alternative embodiments, the object selection system 106 generates separate boundaries for each detected instance of the query object. To illustrate, the act 418 can include the optional act 810 of the object selection system 106 segmenting the detected query object into multiple instances. For example, the concept detection neural network generates a separate boundary box and/or concept mask for each detected instance in the query object.

Furthermore, in some embodiments, the object selection system 106 utilizes an additional neural network or addition neural network layers in the concept detection neural network to assist with object segmentation. For example, the object selection system 106 utilizes an instance segmentation neural network to predict individual bounding boxes and/or instance object masks. Additional details regarding an instance segmentation neural network is provided above in connection with the act 414 of the object selection pipeline 400 described in connection with FIG. 4.

As mentioned above, the object selection system 106 can train the concept detection neural network to detect background object classes. In additional embodiments, object selection system 106 also trains the concept detection neural network to detect additional object classes (e.g., more specific objects), such as foreground objects and/or portions of objects. For example, the concept detection neural network can detect a person or a portion of the person (e.g., face, head, arms, legs). In some embodiments, the object selection system 106 utilizes the concept detection neural network to verify (e.g., double check) a detection of a query object detected utilizing another object detection neural network, such as a known object class detection neural network to ensure that the query object was correctly detected.

Figure 9A:
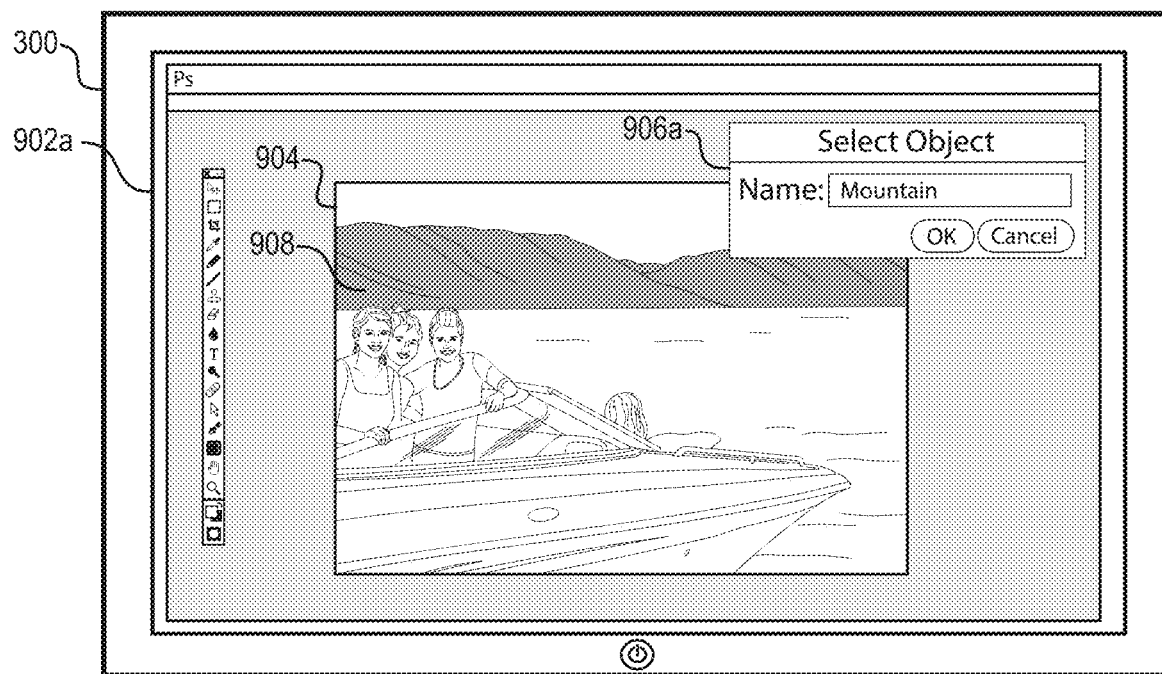
FIGS. 9A-9B illustrate a graphical user interface of utilizing a concept-based object detection network to detect the query object in accordance with one or more embodiments.
Figure 9B:
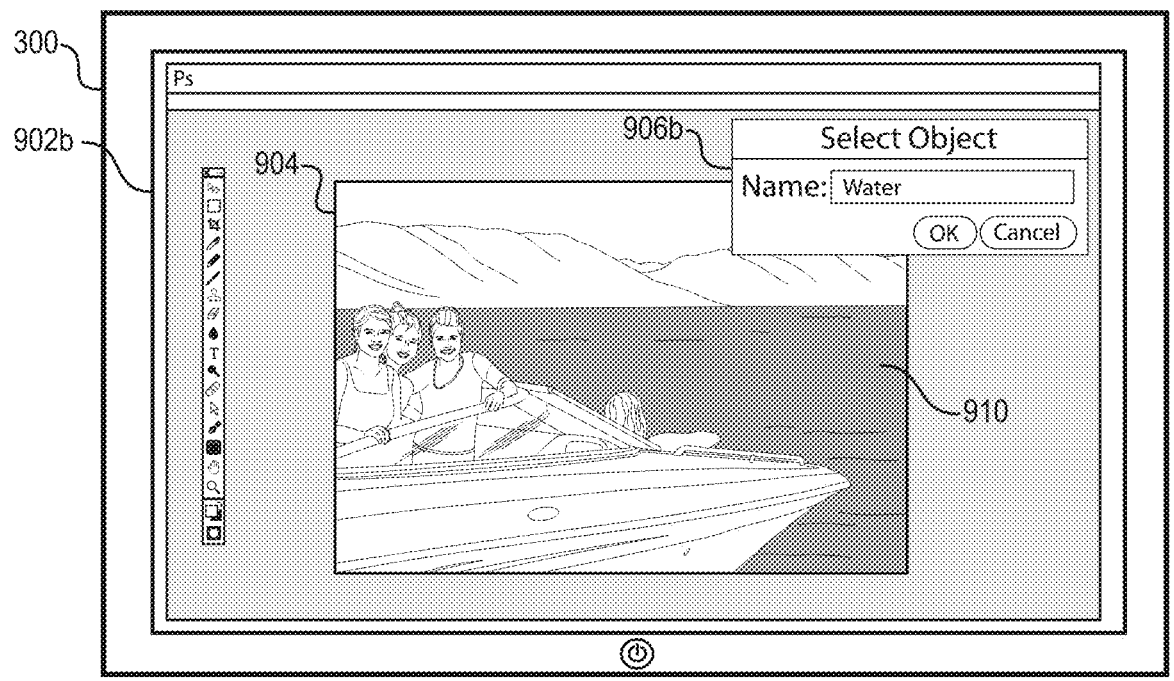

FIGS. 9A-9B illustrate two graphical user interfaces 902a, 902b that illustrates utilizing a concept-based object detection neural network to detect a concept-based query object in accordance with one or more embodiments. For ease in explanation, FIGS. 9A-9B include the client device 300 introduced above. For example, the client device 300 includes an image editing application that implements the image editing system 104 that utilizes the object selection system 106.

As shown in FIG. 9A, the graphical user interface 902a includes an image 904 within an image editing application. The image 904 shows a landscape of a boat on a lake and mountains in the background. The image editing application also includes various tools (e.g., a side toolbar) having image selection and editing options. In addition, the graphical user interface 902a includes an object selection interface 906a, as described above in connection with FIG. 3A, where the user provides the query string of "Mountain."

Upon the user providing the query string, the object selection system 106 can utilize the object selection pipeline 400 to determine how to optimally detect the requested object. For example, the object selection system 106 can determine that the query object in the query string is the "mountain." The object selection system 106 can determine that no specialist network has been trained to detect this object class. Further, the object selection system 106 can determine that a query object of "mountain" corresponds to a background object class for which a concept-based object detection neural network has been trained. Accordingly, the object selection system 106 can select and utilize the concept-based object detection neural network to detect and select the mountain 908 (e.g., the act 418 of the object selection pipeline 400).

Similarly, FIG. 4B shows the object selection system 106 automatically detecting a query object of "water" from the image 904. In particular, the object selection system 106 can perform a similar determination that the concept-based object detection neural network can best detect the query object of "water." As shown, the graphical user interface 902b includes the image 904 within the image editing application with the water automatically selected 910 (e.g., via mask) in response to a user providing the query string of "water" into the object selection interface 906b.

Figure 10:
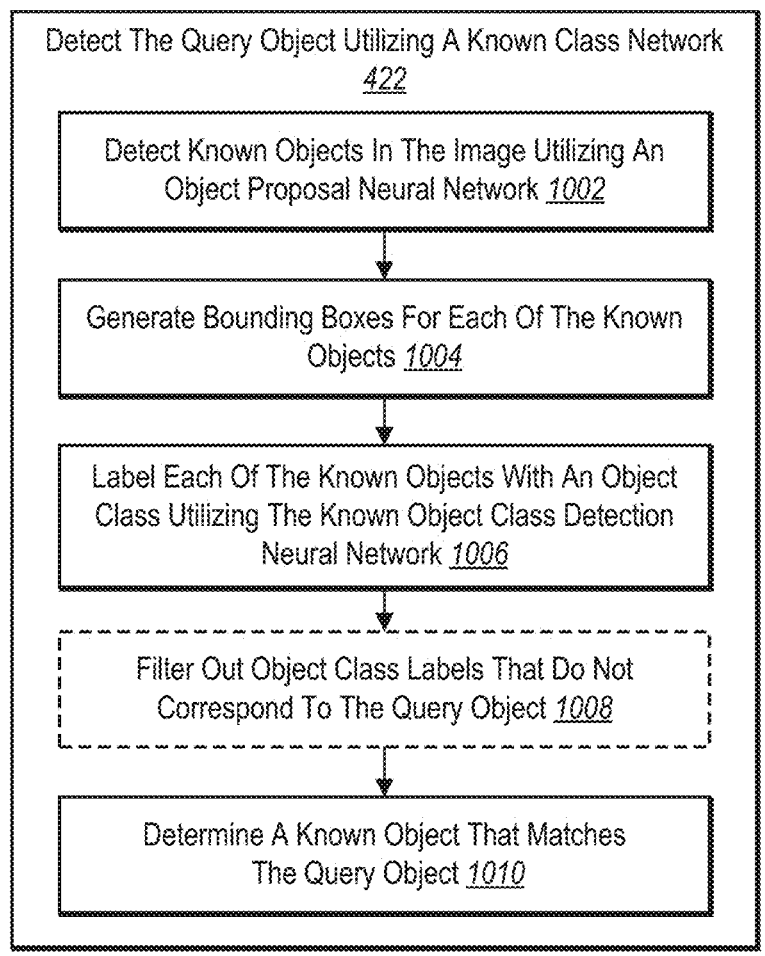
FIG. 10 illustrates a flow chart of detecting a query object utilizing a known object class detection network in accordance with one or more embodiments.

Turning to FIG. 10, a flow chart of detecting a query object utilizing a known object class detection network is illustrated in accordance with one or more embodiments. As described above, FIG. 10 corresponds to the act 422 of the object selection system 106 detecting the query object utilizing a known object class network. In particular, FIG. 10 includes various acts 1002-1010 that provide additional detail regarding the act 422 of the object selection pipeline 400.

As described above, the object selection system 106 arrives at the act 422 of utilizing a known object class detection neural network based on determining that the query object does not correspond to a specialist network nor does the query object correspond to a concept-based object network. Further, the object selection system 106 can determine that the query object is a foreground object associated with a known object class. Indeed, the object selection system 106 can determine that the query object is associated with object classes used to train a known object class detection neural network.

As shown, the act 422 includes the act 1002 of the object selection system 106 detecting known objects in the image utilizing an object proposal neural network. In various embodiments, the object proposal neural network is part of the known object class detection neural network or model. For instance, the object proposal neural network forms one or more layers of the known object class detection neural network. In alternative embodiments, the object proposal neural network is separate from the known object class detection neural network but combined with the known object class detection neural network to form a known object class detection model.

Generally, the object selection system 106 can train the object proposal neural network to detect objects of known object classes. For example, in various embodiments, the object selection system 106 trains the proposal neural network to recognize hundreds of object classes (e.g., 600 classes). Indeed, the object selection system 106 can train the object detection network to analyze an image and determine one or more known objects (e.g., proposed query objects) included in the image. In some embodiments, the object proposal neural network is a CNN (e.g., a R-CNN or a faster R-CNN).

In addition, in various embodiments, the object selection system 106 utilizes the object proposal neural network to generate bounding boxes for each of the known objects, as shown in the act 1004. For example, the object proposal neural network can create an approximate boundary around each detected known object. In some embodiments, the object proposal neural network processes mini sections of the image (e.g., sub-sections) to identify smaller objects within the image that could not be detected with whole image object detection methods. Accordingly, the object proposal neural network can generate multiple bounding boxes that each indicate an object in the image that could potentially be the query object (e.g., a candidate object).

In various embodiments, the known object class detecting neural network reduces the number of bounding boxes utilizing boundary suppression. For example, the known object class detecting neural network can apply one or more criteria or heuristics to suppress large redundant boundary boxes that include multiple smaller boxes. For instance, the known object class detecting neural network and/or the object selection system 106 can utilize intersection over union (IoU) scores to perform the boundary box suppression. As an example of boundary suppression, the known object class detecting neural network can suppress (e.g., remove) a large box around two dogs that include two smaller boundary boxes (e.g., one bounding box for each dog) as the large bounding box is redundant. In some embodiments, this reduction process avoids the object selection system 106 from generating overlapping object masks.

Further, as shown in the act 1006, the object selection system 106 can label each of the known objects with an object class utilizing the known object class detecting neural network (e.g., an object classification neural network). For instance, the object selection system 106 can tag each bounding box with a prediction of one or more known object identified within the bounding box. In some embodiments, the label includes known object detection confidence scores (e.g., prediction probability scores) for each of the object tags predicted for a boundary box. In some embodiments, the known object class detecting neural network can generate a list of detected known objects and their corresponding labels to indicate what objects have been detected in the image.

As shown in FIG. 10, the act 422 can include the optional act 1008 of the object selection system 106 filtering out object class labels that do not correspond to the query object. For example, in one or more embodiments, the object selection system 106 can eliminate any of the boundary boxes that have one or more labels with known object classes that do not match the query object. Often, this process can un-detect any objects not matching the query object.

Additionally, or in the alternative, the object selection system 106 can determine a known object that matches the query object, as shown in the act 1010. In particular, the object selection system 106 can match the labels for each of the detected known objects (pre- or post-filtering) to identify which detected known object matches the query object. In some embodiments, the object selection system 106 determines that multiple known detected objects match the query object. In other words, the image includes multiple instances of the query object, as described above.

The known object class detection neural network can correspond to one or more deep neural networks or models that detect objects of known object classes. For example, the known object class detection neural network (including the object proposal neural network) utilizes the techniques and approaches found in U.S. patent application Ser. No. 16/388,115, "Robust Training of Large-Scale Object Detectors with Noisy Data," filed on Apr. 8, 2019, which is incorporated herein by reference in their entirety. Further, the object selection system 106 can additionally or alternatively utilize other object detection models or techniques for detecting objects of known classes.

FIGS. 11A-11D illustrate a graphical user interface 1102 that illustrates the object selection system 106 utilizing a known object class detection neural network to detect the query object in accordance with one or more embodiments. For ease in explanation, FIGS. 11A-11D include the client device 300 introduced above. For example, the client device 300 includes an image editing application that implements the image editing system 104 that utilizes the object selection system 106.

Figure 11A:
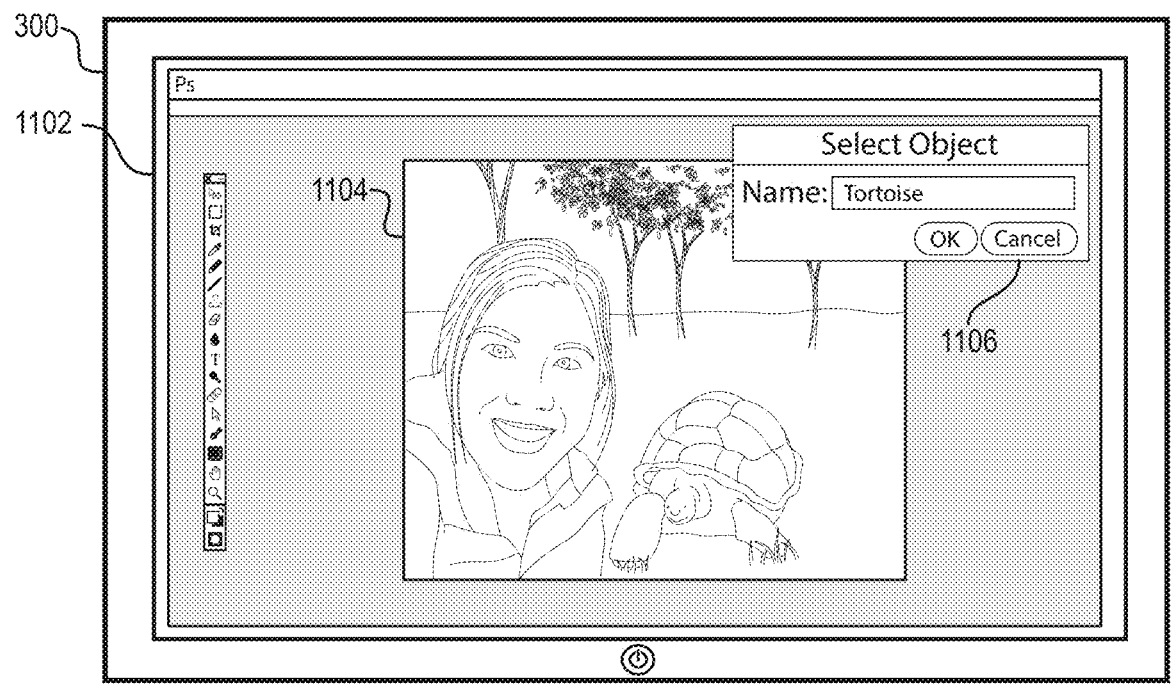
FIGS. 11A-11D illustrate a graphical user interface of utilizing a known object class detection network to detect the query object in accordance with one or more embodiments.

As shown in FIG. 11A, the graphical user interface 1102 includes an image 1104 within an image editing application. The image 1104 shows a woman with a tortoise in front of a row of trees. As also shown, the image editing application also includes various tools (e.g., a side toolbar) having image selection and editing options. In addition, the graphical user interface 1102 includes an object selection interface 1106, as described above in connection with FIG. 3A, where the user provides the query string of "Tortoise."

As explained previously, upon the user providing the query string, the object selection system 106 can utilize the object selection pipeline 400 to determine how to optimally detect the requested object. In this illustrative example, the object selection system 106 can determine that the query object in the query string is the "tortoise." First, the object selection system 106 can determine that no specialist network has been trained to detect this object class of query object. In addition, the object selection system 106 can determine that a query object of "tortoise" does not correspond to a background object class for which a concept-based object detection neural network has been trained. Further, the object selection system 106 can determine that the query object corresponds to a known object class used in training a known object class detection neural network. Accordingly, the object selection system 106 can select and utilize the known object class detection neural network (e.g., the act 422 of the object selection pipeline 400).

Figure 11B:
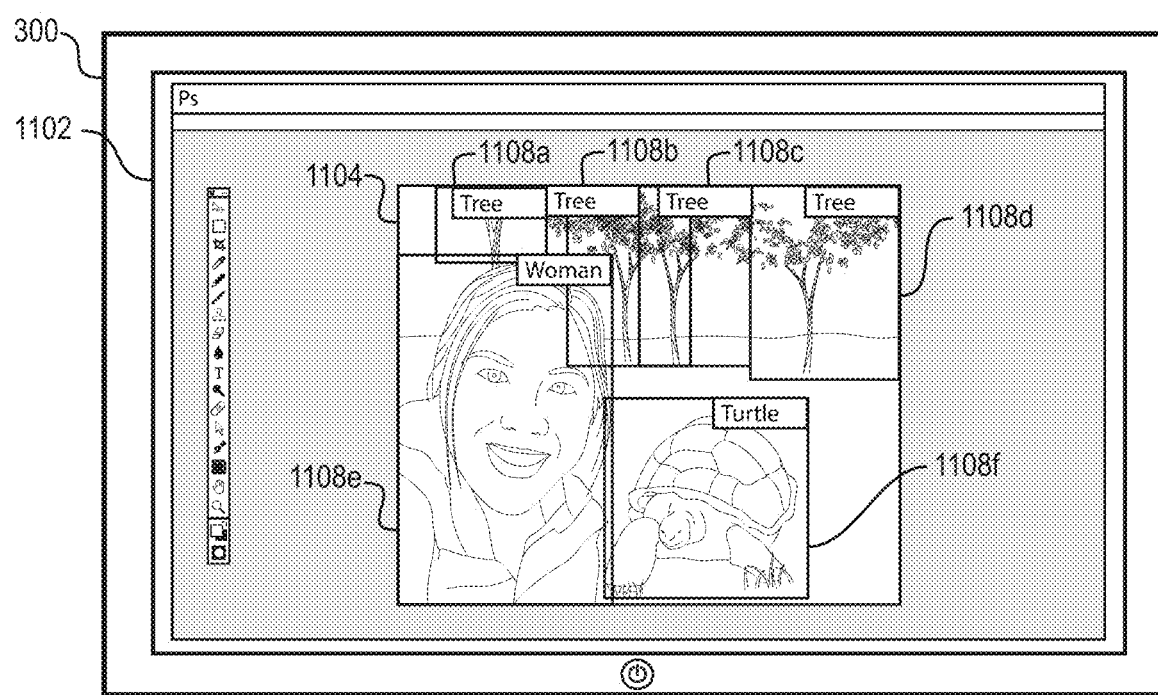

As shown in FIG. 11B, the object selection system 106 can utilize the known object class detection neural network to identify known objects 1108a-1108f within the image 1104. In particular, the known object class detection neural network detects known objects within the image 1104, generates boundary boxes around the objects, as well as tags each of the boundary boxes with labels. In some embodiments, the known object class detection neural network can include additional data associated with each detected known object, such as a confidence score and secondary known object predictions. As shown, the known object class detection neural network can detect known objects of trees 1108a-1108d, a woman 1108e, and a turtle 1108f.

As described above, in some embodiments, the known object class detection neural network can filter out detected known objects that do not match the query object. For example, the known object class detection neural network can disregard the detected known objects corresponding to the trees 1108a-1108d and the woman 1108e. Additionally, or in the alternative, the known object class detection neural network can identify the detected known object having the same object class as the query object. For instance, the known object class detection neural network determines that the detected turtle 1108f matches the object class query object of "tortoise." As shown, FIG. 11C indicates the tortoise as the detected query object 1110.

Figure 11C:
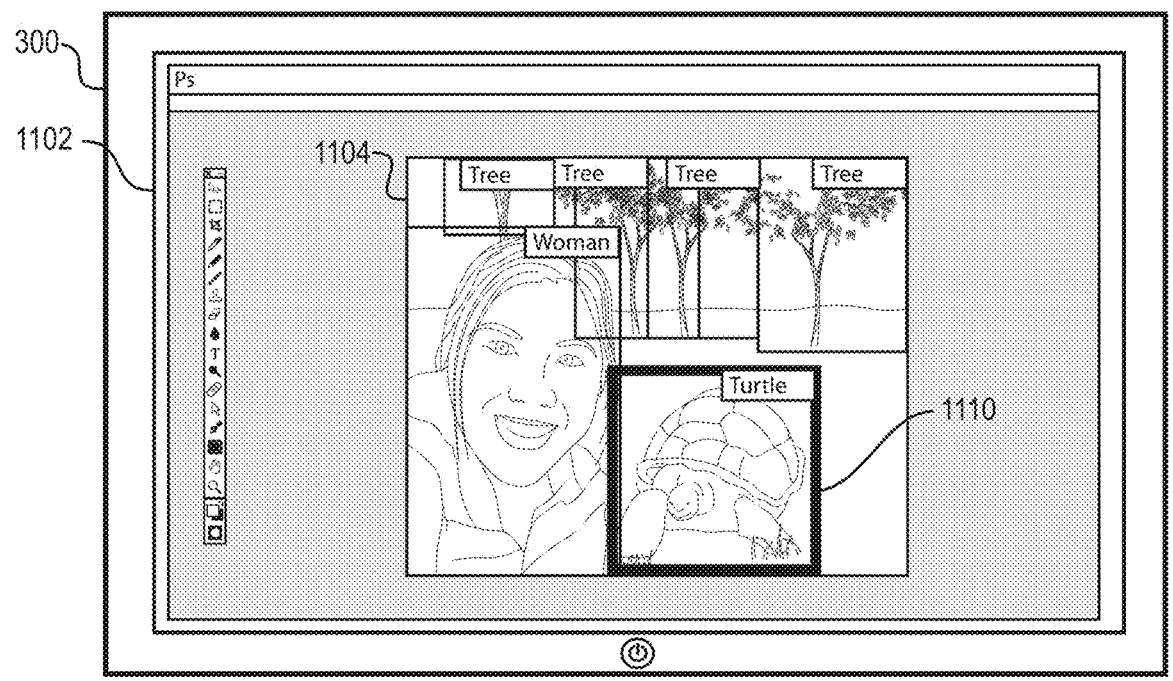
Figure 11D:
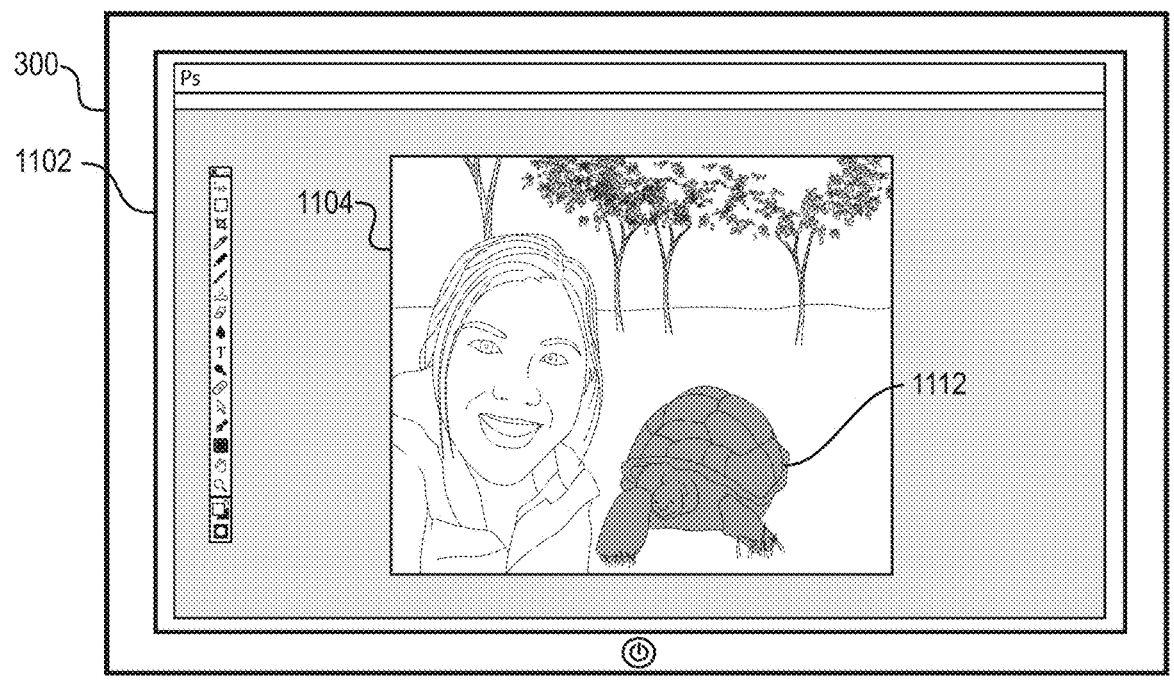

Upon identifying the detected query object 1110, the object selection system 106 can select the object for the user. To illustrate, FIG. 11D shows the object selection system 106 automatically selecting the detected known object (i.e., the tortoise). In particular, as described above, the object selection system 106 can provide the detected query object 1110 to an object mask neural network and/or generate an object mask of the detected query object 1110, resulting in a selected query object 1112.

Further, as shown in FIG. 11D, the object selection system 106 can provide the selected query object 1112 in response to the selection query (e.g., the query string). Indeed, the object selection system 106 can automatically select the tortoise for the user within the image editing application by providing a mask of the tortoise. As a note, FIGS. 11B and 11C show the object selection system 106 utilizing the known object class detection neural network detecting the query object. In many embodiments, the object selection system 106 does not display intermediary actions to the user. Rather, the object selection system 106 appears to automatically detect and accurately select the query object in response to the user's query string request. In other words, the graphical user interface 1102 jumps from FIG. 11A to FIG. 11D. In alternative embodiments, the object selection system 106 displays one or more of the intermediary actions to the user. For example, the object selection system 106 displays the boundary boxes of each detected object with labels, as shown in FIG. 11C.

Figure 12:
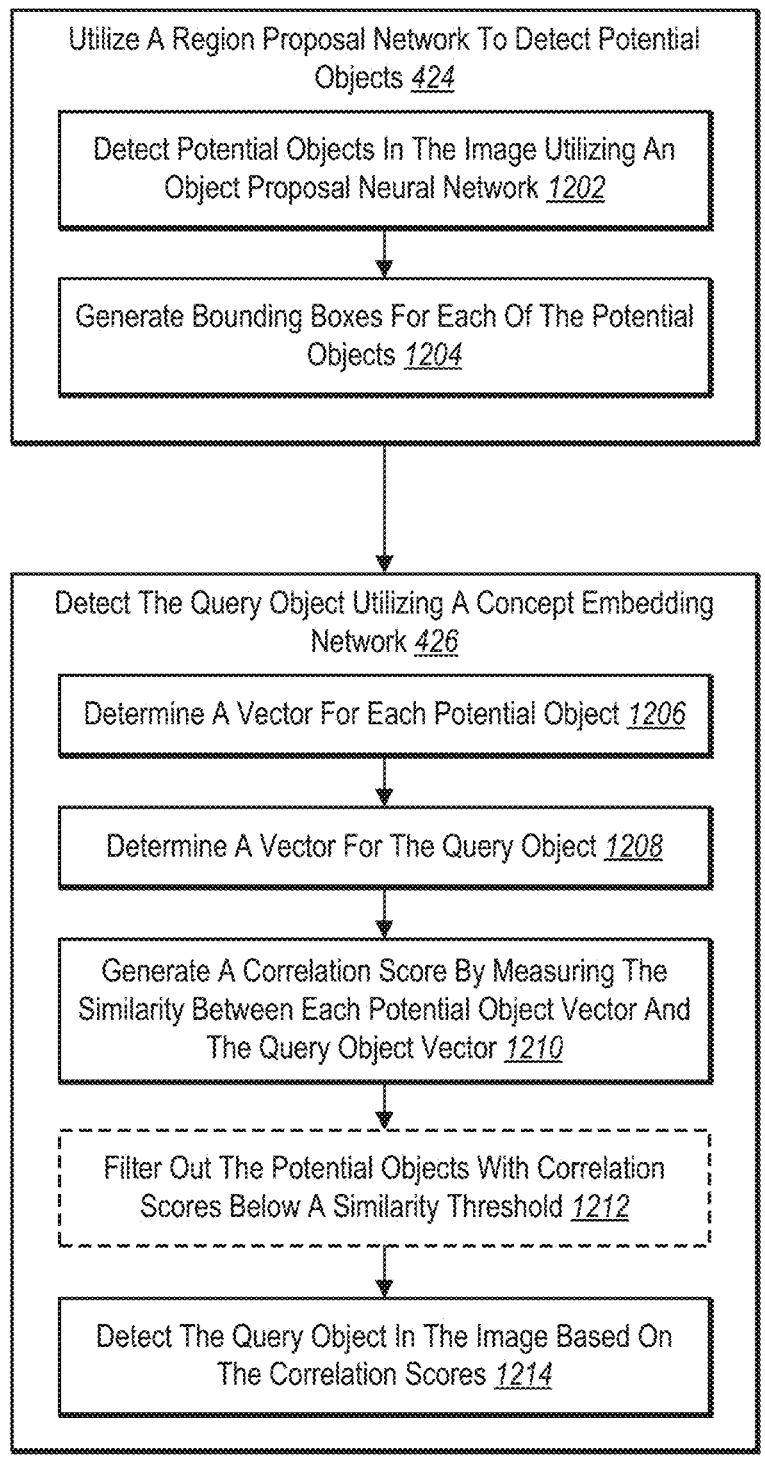
FIG. 12 illustrates a flow chart of detecting a query object corresponding to an unknown object class utilizing multiple networks in accordance with one or more embodiments.

Turning to FIG. 12, a flow chart of detecting a query object corresponding to an unknown object class utilizing multiple networks is illustrated in accordance with one or more embodiments. As mentioned above, FIG. 12 corresponds to the act 424 and the act 426 of the object selection pipeline 400 described above in connection with FIG. 4. In particular, FIG. 12 includes various acts 1202-1214 that provide additional detail regarding the acts 424 and 426 of the object selection pipeline 400. As mentioned above, in a number of embodiments, the acts 424 and 426 are part of an unknown object class detection neural network.

As shown, the act 424 of utilizing a regional proposal network to detect potential objects (i.e., candidate objects) can include the act 1202 of the object selection system 106 detecting potential objects in the image utilizing an object proposal neural network. In one or more embodiments, the object proposal neural network corresponds to the object proposal neural network described above in connection with FIG. 10 and act 1002. For example, in some instances, the object proposal neural network forms the first part of the known object class detection neural network. In other instances, the object proposal neural network is a standalone neural network utilized to identify both known and unknown object classes.

As described above in connection with the act 1002, the object proposal neural network can identify objects having a known object class. With respect to the act 1202, the object selection system 106 can utilize the object proposal neural network to identify potential objects for which no known object class is recognized. For example, the object proposal neural network can utilize similar techniques to identify potential objects within the image, but does not try to predict, identify, or label the objects.

In alternative embodiments, the object proposal neural network is separate from the object proposal neural network described above. For example, the object proposal neural network in the act 1202 is a type of regional proposal neural network that selects sub-regions of the image that encompass potential objects. Indeed, the object proposal neural network is trained to identify and indicate portions of the image (i.e., regions) that include a potential object.

Upon detecting potential objects, the object proposal neural network can generate bounding boxes (i.e., an approximate boundary) for each of the potential objects, as shown in the act 1204. Unlike the object detection neural network described in connection with the act 1002, the object proposal neural network in act 1202 may not label proposal boxes because the regional proposal neural network is detecting unknown objects. At this point, each bounding box includes a potential candidate object that could correspond to the query object.

Upon detecting potential objects within the image, the object selection system 106 can determine if any of the potential objects correspond to the query object. To illustrate, the act 426 of detecting the query object utilizing a concept embedding network can include the act 1206 of the object selection system 106 determining a vector for each potential object. For example, the object selection system 106 can utilize a concept embedding neural network to generate an image vector for each portion to the image (e.g., boundary boxes) that includes a potential object.

As also shown, the act 426 can include the act 1208 of determining a vector for the query object. In particular, the object selection system 106 can utilize the concept embedding neural network to generate a word vector for the query object from the query string. In one or more embodiments, the concept embedding neural network can generate the image vectors and the word vector in the same vector space.

As mentioned above, the object selection system 106 can train the concept embedding neural network to map images and text that represent the same object, object class, and/or object-based concept to the same location in vector space (e.g., embedded space). To illustrate, in some embodiments, the object selection system 106 can train the concept embedding neural network using training data that includes around 20,000 object classes and corresponding images samples. Through training, the concept embedding neural network can generate a shared embedding vector space as well as learns how to generate embeddings for both potential objects (e.g., images) and query objects (e.g., text) that map to the shared embedding vector space.

For each image of a potential object, the object selection system 106 can determine a correspondence with the query object. To illustrate, the act 426 can include the act 1210 of the object selection system 106 generating a correlation score by measuring the similarity between each potential object vector and the query object vector. In other words, the object selection system 106 can determine which potential object embedding vector is closest to the query object embedding vector in learned vector space. In some embodiments, the object selection system 106 can rank the potential objects based on their distance from the query object in vector space.

Further, the object selection system 106 can generate correlation scores to indicate the similarity between each potential object and the query object. In some embodiments, the correlation score for a potential object is inversely proportional to the vector space distance between the potential object and the query object. Accordingly, the smaller the vector space distance between embeddings, the larger the correlation score. In a number of embodiments, the object selection system 106 generates a correlation score between 0-100 (e.g., an absolute score or percentage) to indicate the similarity between a potential object and the query object.

As shown in FIG. 12, the act 426 can include the optional act 1212 of the object selection system 106 filtering out the potential objects with correlation scores below a similarity threshold. In some embodiments, the object selection system 106 can utilize a similarity threshold to determine which potential objects likely match the query object. For example, potential objects having less than a 75% correlation score with the query object are filtered out and ignored. In some embodiments, the object selection system 106 filters out the bottom x percent of the potential objects (e.g., disregards the bottom 90%) from consideration as the query object. In many instances, by filtering out potential objects having low confidence scores, the object selection system 106 can achieve object detection results similar to the known object class detection neural network described above.

Next, the object selection system 106 can detect the query object from the potential objects. For example, as shown in FIG. 12, the act 426 can include the act 1214 of the object selection system 106 detecting the query object in the image based on the correlation scores. In one or more embodiments, the object selection system 106 can select the potential object that has the highest correlation score as the detected query object. In some embodiments, the object selection system 106 selects the top number or percentage of potential objects as instances of the detected query object. In other embodiments, the object selection system 106 determines that each potential object remaining after filtering (e.g., the act 1212) is an instance of the detected query object, particularly if the similarity threshold is high (e.g., above 90%).

In some embodiments, the object selection system 106 can label the boundary box of a detected query object. For example, upon determining that a potential object in the image correlates with the query object, the object selection system 106 can tag the boundary box of the detected query object with a label matching the query object and/or the object class of the query object. In additional embodiments, the object selection system 106 can also tag the boundary box of the detected query object with a label indicating the determined correlation score for the potential object, which is described above.

The concept embedding neural network can correspond to one or more deep neural networks or models that map visual images and text strings to a shared embedding space. For example, the concept embedding neural network can utilize the techniques and approaches found in U.S. Pat. No. 10,216,766, "Large-Scale Image Tagging Using Image-To-Topic Embedding," filed on Mar. 20, 2017 or those in U.S. patent application Ser. No. 15/921,492, "Detecting Objects Using A Weakly Supervised Model," filed on Mar. 14, 2018, the entire contents of the foregoing patent and application are hereby incorporated by reference in their entirety.

Upon selecting one or more instances of the detected query object, the object selection system 106 can provide the one or more instances of the detected query object to the object mask network, as described above (e.g., the act 414 of the object selection pipeline 400). In addition, the object selection system 106 can further train the concept embedding neural network to generate an object mask from one or more instances of a detected query object.

FIGS. 13A-13D illustrate a graphical user interface 1302 that illustrates the object selection system 106 utilizing an unknown object class detection model to detect a query object corresponding to an unknown object class in accordance with one or more embodiments. For ease in explanation, FIGS. 13A-13D include the client device 300 introduced above. For example, the client device 300 includes an image editing application that implements the image editing system 104 that utilizes the object selection system 106.

Figure 13A:
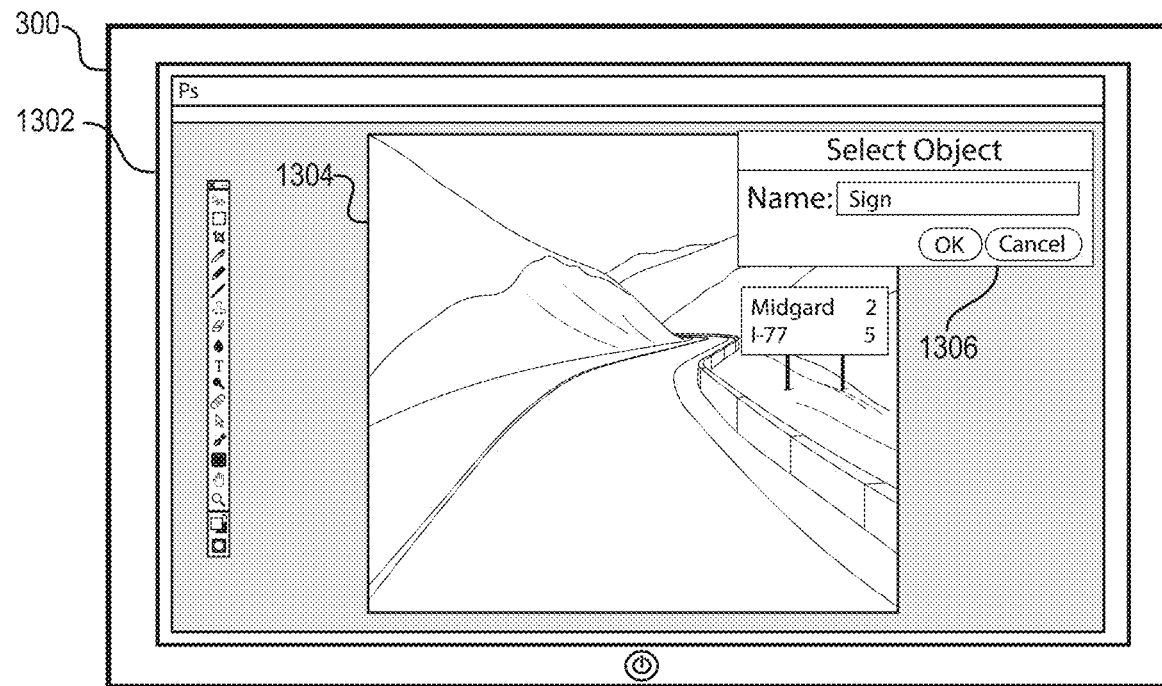
FIGS. 13A-13D illustrate a graphical user interface of utilizing multiple networks to detect the query object corresponding to an unknown object class in accordance with one or more embodiments.

As shown in FIG. 13A, the graphical user interface 1302 includes an image 1304 within an image editing application. The image 1304 shows a road disappearing through a mountain pass, where a road sign is to the right of the road. As also shown, the image editing application includes various tools (e.g., a side toolbar) having selection options as well as other image editing options. In addition, the graphical user interface 1302 includes an object selection interface 1306, as described above in connection with FIG. 3A, where the user provides the query string of "Sign."

As explained previously, upon the user providing the query string, the object selection system 106 can utilize the object selection pipeline 400 to determine how to optimally detect the requested object. In this illustrative example, the object selection system 106 can determine that the query object in the query string is "sign." For example, the object selection system 106 can determine that no specialist network has been trained to detect this object class of query object. In addition, the object selection system 106 can determine that a query object of "sign" does not correspond to a background object class for which a concept-based object detection neural network has been trained. Further, the object selection system 106 can determine that the query object does not correspond to a known object class used to train a known object class detection neural network. Accordingly, the object selection system 106 can select and utilize the unknown object class detection model to detect the query object corresponding to an unknown object class (e.g., the acts 424 and 426 of the object selection pipeline 400).

Figure 13B:
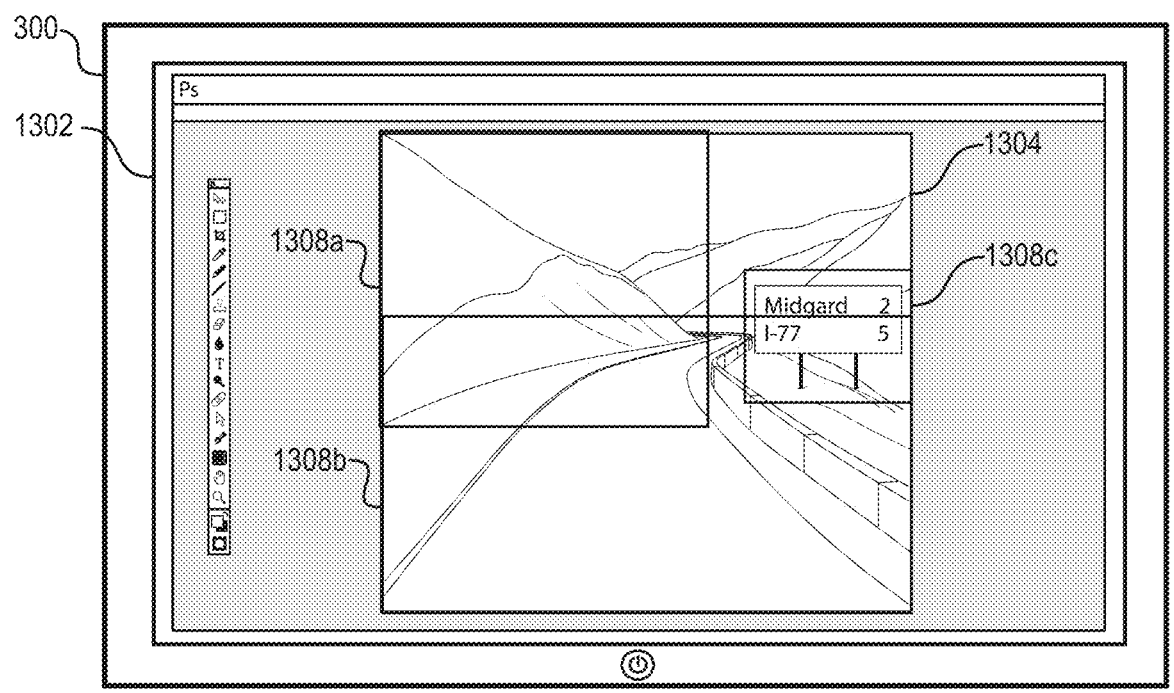

As shown in FIG. 13B, the object selection system 106 can utilize a regional proposal neural network (e.g., an object proposal neural network) to identify potential objects 1308a-1308c within the image 1304 (e.g., known objects and/or unknown objects). Upon detecting potential objects within the image 1304, the object selection system 106 can generate boundary boxes around the objects. However, the object selection system 106 does not tag or label the boundary boxes, as the contents of each box is unknown. As shown in FIG. 13B, the object selection system 106 detects three potential objects 1308a-1308c in the image 1304.

Upon determining the potential objects 1308a-1308c, the object selection system 106 can utilize a concept embedding neural network to identify correlation scores between each of the potential objects 1308a-1308c and the query object. For example, the object selection system 106 can generate an embedding for each of the potential objects 1308a-1308c, as well as an embedding for the query object utilizing the concept embedding neural network. Then, the object selection system 106 can compare each of the potential object embeddings to the query object embedding to determine correlation scores, as described above. While not shown, the object selection system 106 can determine a favorable correlation score for the third potential object 1308c of the sign and the query object of "sign."

Figure 13C:
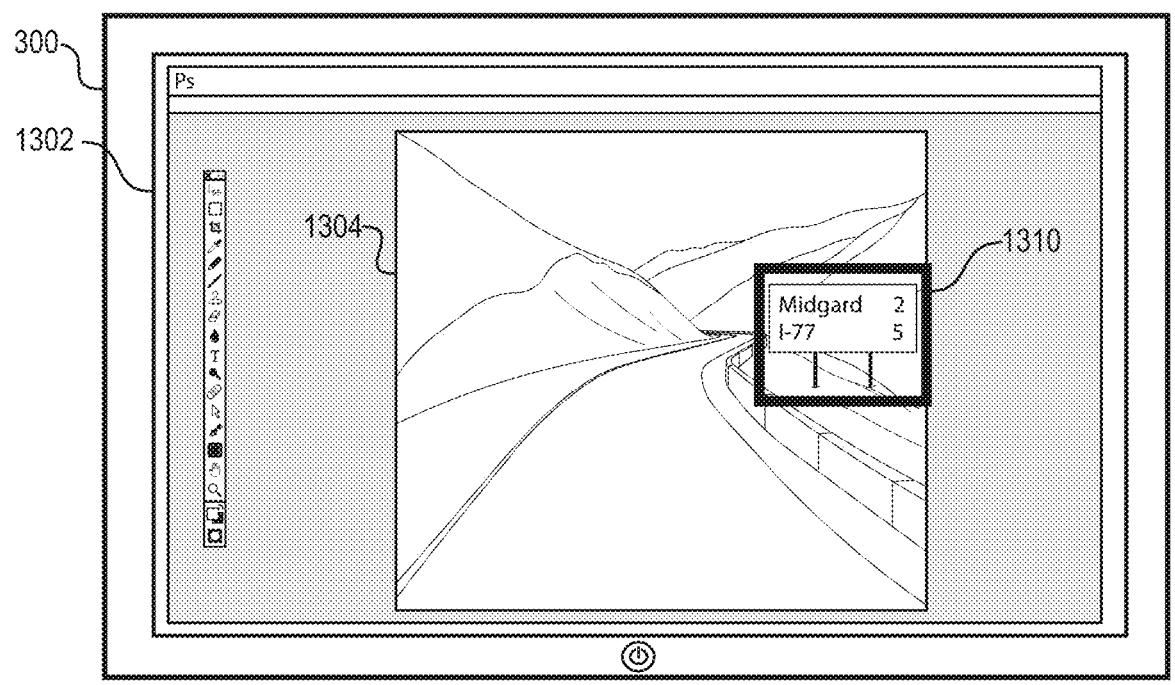

As shown in FIG. 13C, the object selection system 106 selects the third potential object 1308c as the detected query object 1310. As described above, in some embodiments, the object selection system 106 can filter out potential objects 1308a-1308c that have low correlation scores to aid in selecting the detected query object. For instance, the object selection system 106 can filter out the first potential object 1308a and the second potential object 1308b based on their correlation scores not satisfying a similarity threshold. Here, the object selection system 106 is left to select the remaining potential object—the third potential object 1308c—as the detected query object 1310. Additionally, or in the alternative, the object selection system 106 can select the third potential object 1308c as the detected query object 1310 based on the third potential object 1308c having the most favorable (e.g., highest) correlation score among the potential objects 1308a-1308c.

Figure 13D:
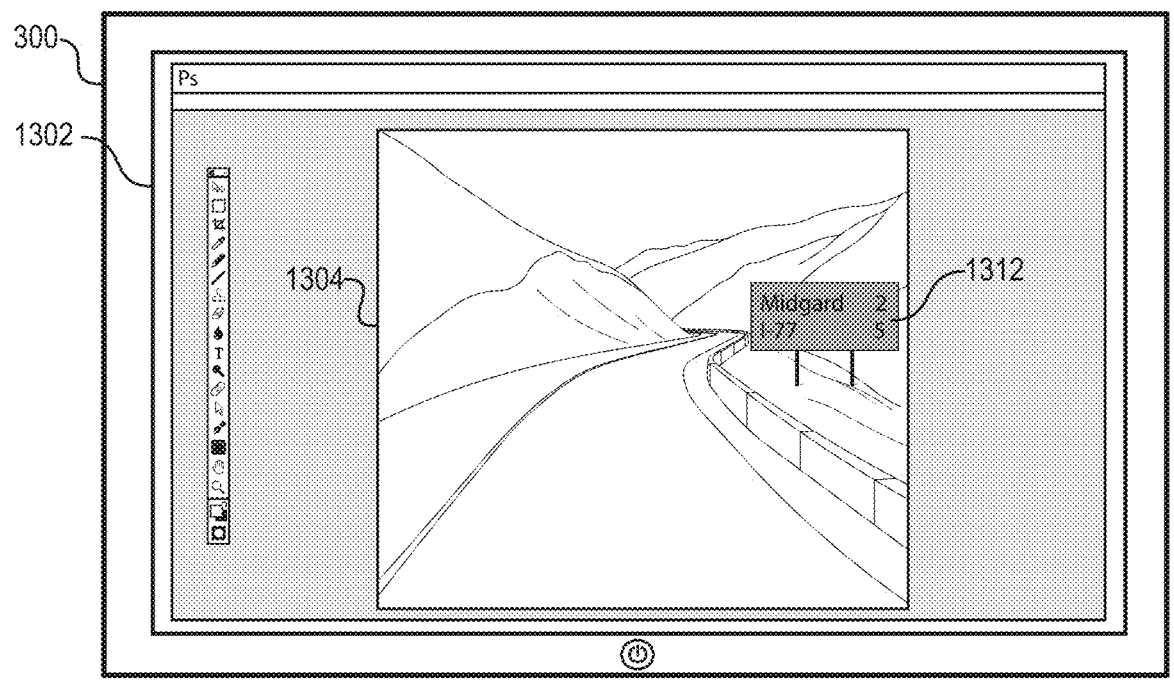

Upon identifying the query object 1310, the object selection system 106 can select the object for the user. To illustrate, FIG. 13D shows the object selection system 106 automatically selecting the detected query object 1310. In particular, as described above, the object selection system 106 can provide the detected query object 1310 to an object mask neural network and/or generate an object mask of the detected query object 1310, resulting in a selected query object 1312. Further, the object selection system 106 can provide the selected query object 1312 to a user. Indeed, as shown in FIG. 13D, the object selection system 106 automatically selects the sign for the user within the image editing application.

Notably, FIGS. 13B and 13C show the object selection system 106 utilizing the regional proposal neural network and the concept embedding neural network to detect the query object (e.g., the unknown object class detection model). In many embodiments, the object selection system 106 does not display corresponding actions to the user. Rather, the object selection system 106 appears to automatically detect and accurately select the query object in response to the user's query string request (e.g., the graphical user interface 1302 jumps from FIG. 13A to FIG. 13D).

Figure 14:
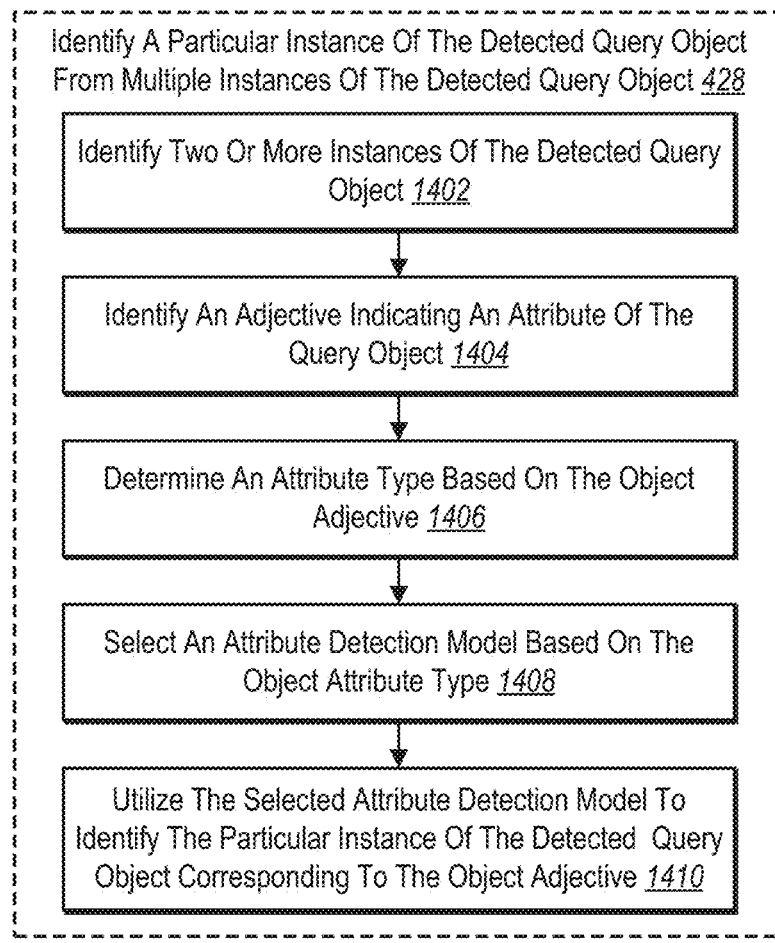
FIG. 14 illustrates a flow chart of detecting a particular instance of a query object in accordance with one or more embodiments.

Turning to FIG. 14, a flow chart of detecting a particular instance of a query object is illustrated in accordance with one or more embodiments. As mentioned above, FIG. 14 corresponds to the optional act 428 of identifying a particular instance of the detected query object from multiple instances of the detected query object included in the object selection pipeline 400, as described above in connection with FIG. 4. In particular, FIG. 14 includes various acts 1402-1410 that provide additional detail regarding the act 428 of the object selection pipeline 400.

As described above, in a number of embodiments, the object selection system 106 can detect more than one instance of a query object in an image. For example, if the object selection system 106 detects the query object of "tree" in an image of a landscape or forest, the object selection system 106 can detect multiple trees. In some embodiments, the object selection system 106 can generate a single aggregated selection of multiple instances of the detected query object within the image editing application.

In alternative embodiments, the object selection system 106 can generate and provide individual selections of each instance of the detected query object.

In one or more embodiments, the object selection system 106 can identify and select one or more, but less than all, of the instances of the detected query object. In particular, the object selection system 106 can select one or more particular instances based on the query string provided by the user (e.g., the act 428). To illustrate, the acts 1402-1410 of the act 428 in FIG. 14 describe embodiments of the object selection system 106 selecting a particular instance of a detected query object from multiple detected instances.

As shown, the act 428 can include the act 1402 of the object selection system 106 identifying two or more instances of the detected query object. As described above, the object selection system 106 can detect more than one instance of a query object in an image. For example, the object selection system 106 detects multiple instances of dogs, mountains, roads, cars, signs, or people within various images.

The act 428 also can include the act 1404 of the object selection system 106 identifying an adjective indicating an attribute of the query object (i.e., an object attribute). As explained earlier in connection with FIG. 5, in one or more embodiments, the object selection system 106 can identify one or more adjectives in the query string as object attributes. Often, a query string with multiple words will include a query object along with one or more adjectives that specify particular attributes of the query object.

As shown, the act 428 also can include the act 1406 of the object selection system 106 determining an attribute type based on the object attribute. For example, as mentioned above, an object attribute can specify a color, size, length, position, shape, pattern, material, location, depth, rigidity, prominence, body posture, or facial expression of the query object. Accordingly, the object selection system 106 can analyze each object attribute to determine if it corresponds to a known or unknown object attribute type.

In one or more embodiments, the object selection system 106 can perform a table lookup to determine if the object attribute corresponds to a particular object attribute type. For example, the lookup table can include a listing of colors by names and indicates that these object attributes are associated with colors. In addition, the object selection system 106 can include similar entries for other object attribute types, such as, shape, material, and position. In alternative embodiments, the object selection system 106 trains an object attribute type neural network to predict the object attribute type of an object attribute.

As shown, the act 428 can include the act 1408 of the object selection system 106 selecting an attribute detection model based on the object attribute type. In various embodiments, the object selection system 106 maintains a number of object attribute models corresponding to the various object attribute types. Accordingly, upon detecting a particular object attribute type, the object selection system 106 can select the corresponding object attribute model that will accurately process the object attribute in the query string to select the correct instance of the detected query object.

To illustrate, if the object attribute type is a color, the object selection system 106 can select a color attribute detection neural network to identify and select the color provided in the query string (i.e., the object attribute). Similarly, if the object attribute type is a position, the object selection system 106 can select a position attribute detection model to identify and select the instance of the detected query object having the position indicated in the query string. Additionally, the object selection system 106 can select additional specific attribute detection models and/or a general attribute detection model based on the object attribute type.

As shown in FIG. 14, the act 428 can include the act 1410 of the object selection system 106 utilizing the selected attribute detection model to identify the detected instance of the query object corresponding to the object attribute. For example, if the object attribute is a "blue" (e.g., the query string is "blue balloon"), the object selection system 106 utilizes the color attribute detection neural network to identify each detected balloon in the image that is blue. Additional detail regarding the various object attribute detection neural networks and models is provided with respect to FIGS. 16-18 below.

In a number of embodiments, the object selection system 106 can identify and select a particular instance based on the object masks (e.g., instance level pixel selections). In these embodiments, the object selection system 106 can increase the accuracy of the selection (e.g., in the case of color, material, relative position, or shape) by only considering pixels belonging to the object itself rather than to the background surrounding an instance. In alternative embodiments, the object selection system 106 can determine a particular instance from the boundaries corresponding to each instance of the detected query object (e.g., location, expression, depth, or size). Thus, depending on the object attribute type, the object selection system 106 utilizes the boundaries corresponding to each instance to select a particular instance before generating individual instances object masks, which can reduce processing and reduce selection time.

FIGS. 15A-15D illustrate a graphical user interface of utilizing an attribute detection neural network to detect a particular instance of a query object in accordance with one or more embodiments. For ease in explanation, FIGS. 15A-15D include the client device 300 introduced above. For example, the client device 300 includes an image editing application that implements the image editing system 104 that utilizes the object selection system 106.

Figure 15A:
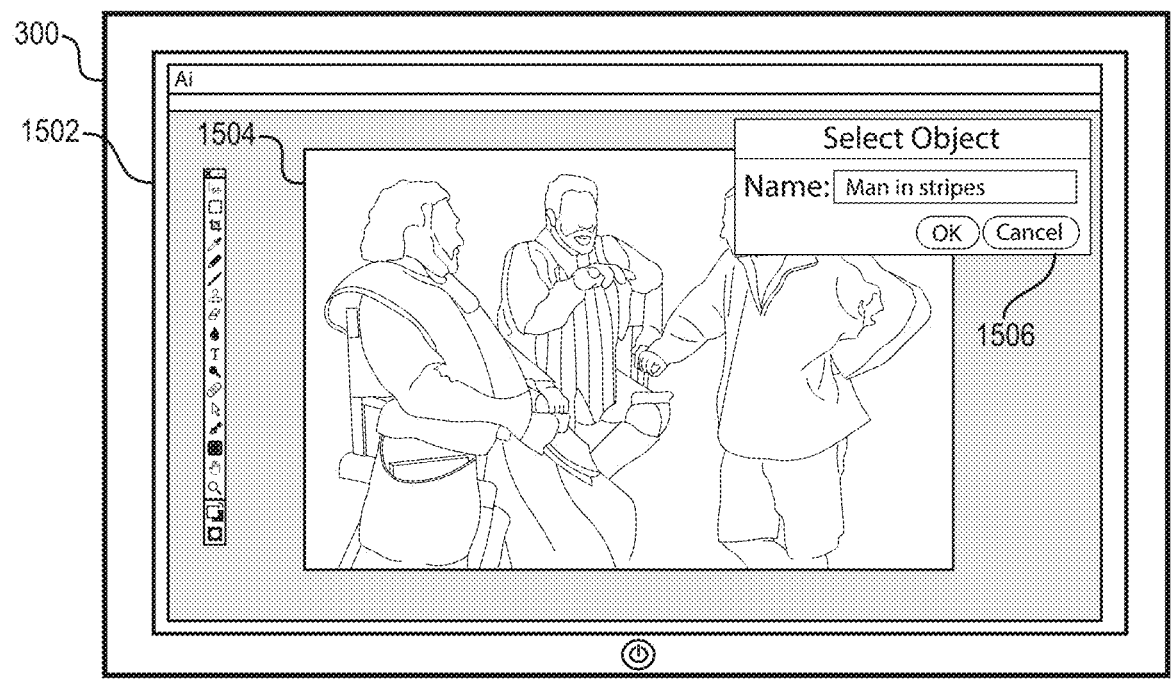
FIGS. 15A-15D illustrate a graphical user interface of utilizing an attribute detection network to detect a particular instance of a query object in accordance with one or more embodiments.

As shown in FIG. 15A, the graphical user interface 1502 includes an image 1504 within an image editing application. The image 1504 shows three men talking. As also shown, the image editing application includes various tools (e.g., a side toolbar) having image selection and editing options. In addition, the graphical user interface 1502 includes an object selection interface 1506, as described above in connection with FIG. 3A, where the user provides the query string of "Man in stripes."

Figure 15B:
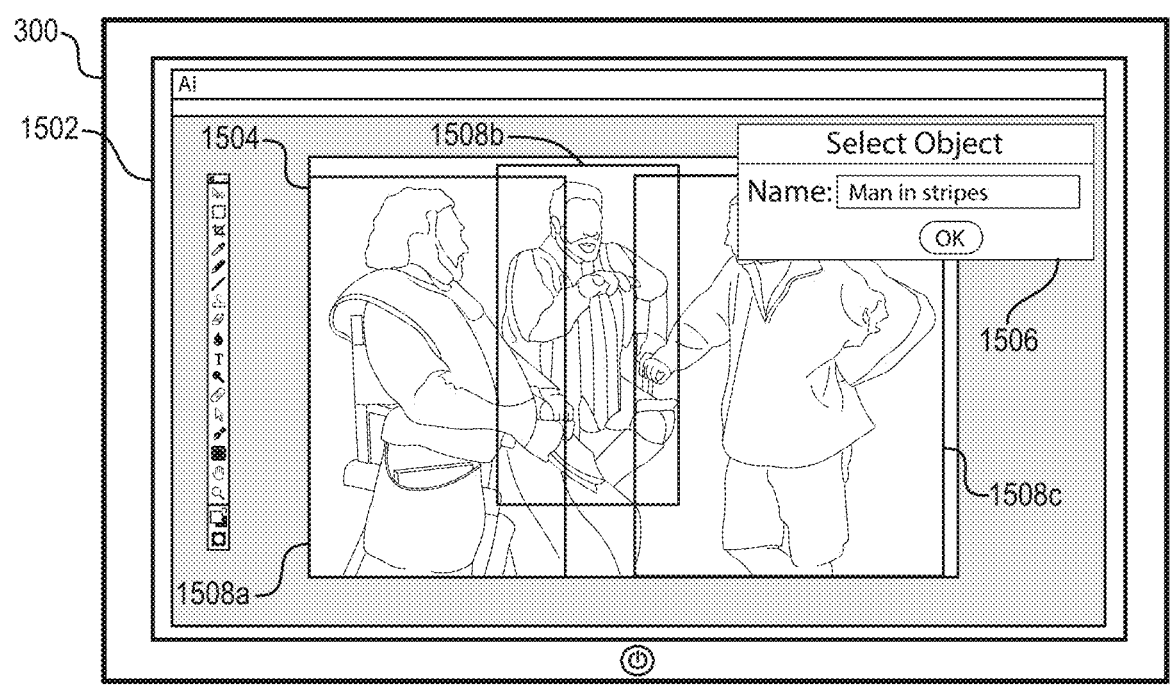

In FIG. 15B, the object selection system 106 can detect three instances of the detected query object (i.e., "man") in the image 1504 indicated by three boundary boxes 1508a-1508c. For example, upon the user receiving the query string from the object selection interface 1506, the object selection system 106 can utilize the object selection pipeline 400 to detect the multiple instances of the detected query object utilizing one or more object detection neural networks, as described above.

Figure 15C:
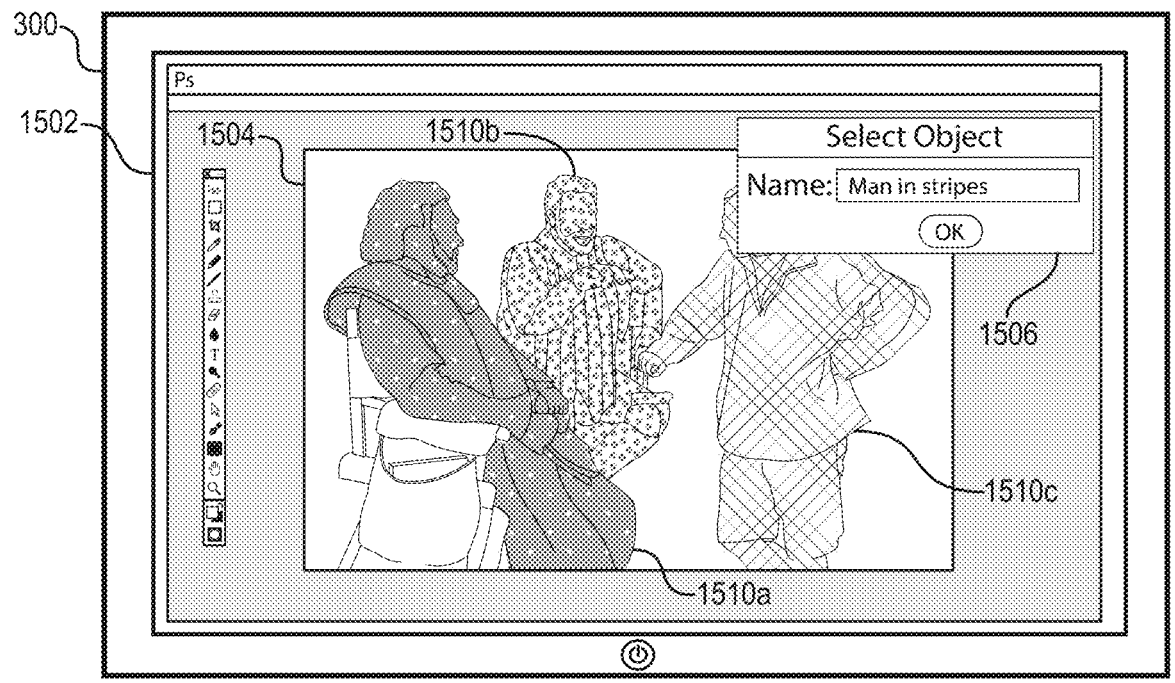

In addition, the object selection system 106 can perform instance segmentation on each of the instances of the detected query object, as illustrated in FIG. 15C. For example, the object selection system 106 utilizes an object mask neural network (e.g., the act 414 of the object selection pipeline 400 in FIG. 4) to generate separate object masks for each of the detected men in the image. As shown in FIG. 15C, the graphical user interface 1502 includes a first object mask 1510a, a second object mask 1510b, and a third object mask 1510c.

Further, the object selection system 106 can detect that the query string includes an object attribute (i.e., "stripes"). For instance, the object selection system 106 can parse the query string to determine an adjective that corresponds to an object attribute of the query object. Further, the object selection system 106 can determine an object attribute type (e.g., clothing pattern) for the object attribute.

Figure 15D:
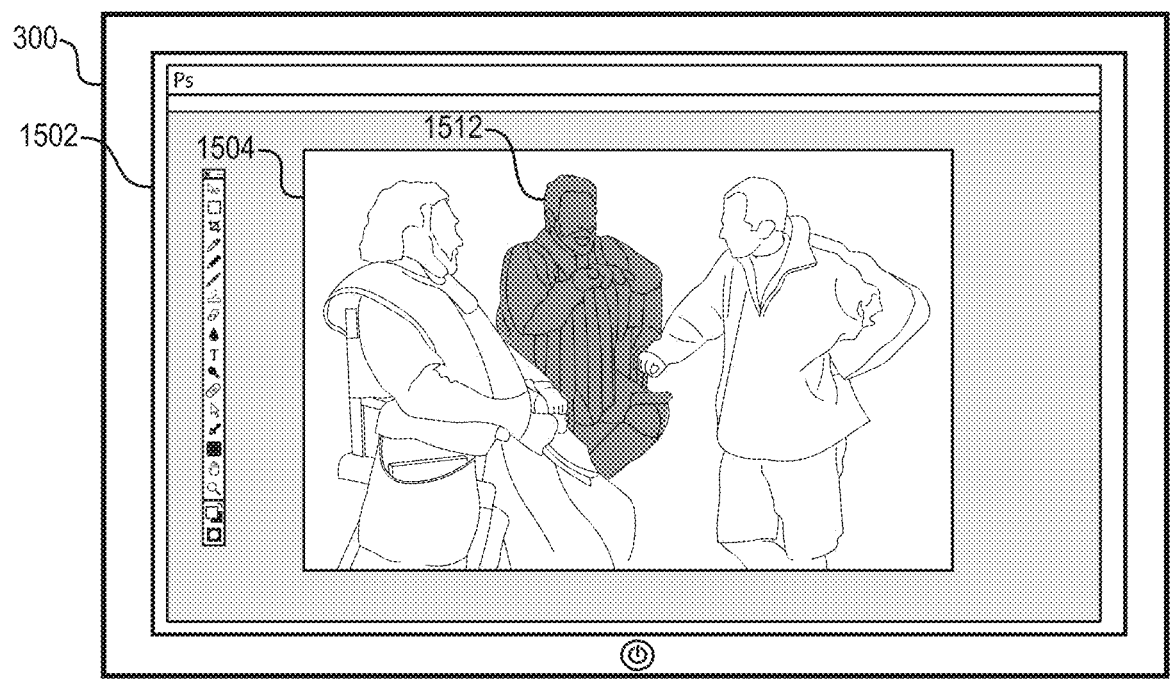

In various embodiments, based on the object attribute and/or object attribute type, the object selection system 106 can select an attribute detection neural network or model to detect the instance that best corresponds to the object attribute requested by the user. For example, the object selection system 106 can detect a pattern attribute detection neural network to identify each of the instances that is wearing stripes. As shown in FIG. 15D, the object selection system can deselect the first object mask 1510a and the third object mask 1510c as these object masks (i.e., the set of pixels included in each object mask) do not include the object attributes of stripes. Accordingly, the object selection system 106 returns the selected particular query object 1512 to the user within the image editing application.

Notably, FIGS. 15B and 15C show the object selection system 106 utilizing an attribute detection neural network to select a particular instance of the detected query object. In many embodiments, the object selection system 106 does not display corresponding actions to the user. Rather, the object selection system 106 appears to automatically detect and accurately select the particular query object in response to the user's query string request (e.g., the graphical user interface 1502 jumps from FIG. 15A to FIG. 15D). Furthermore, as described above, in some embodiments, the object selection system 106 utilizes three boundary boxes 1508a-1508c (FIG. 15B) in connection with an attribute detection neural network to select a particular instance of the detected query object. Then, upon selecting the particular instance, the object selection system 106 generates an object mask only for the selected particular query object.

Figure 16:
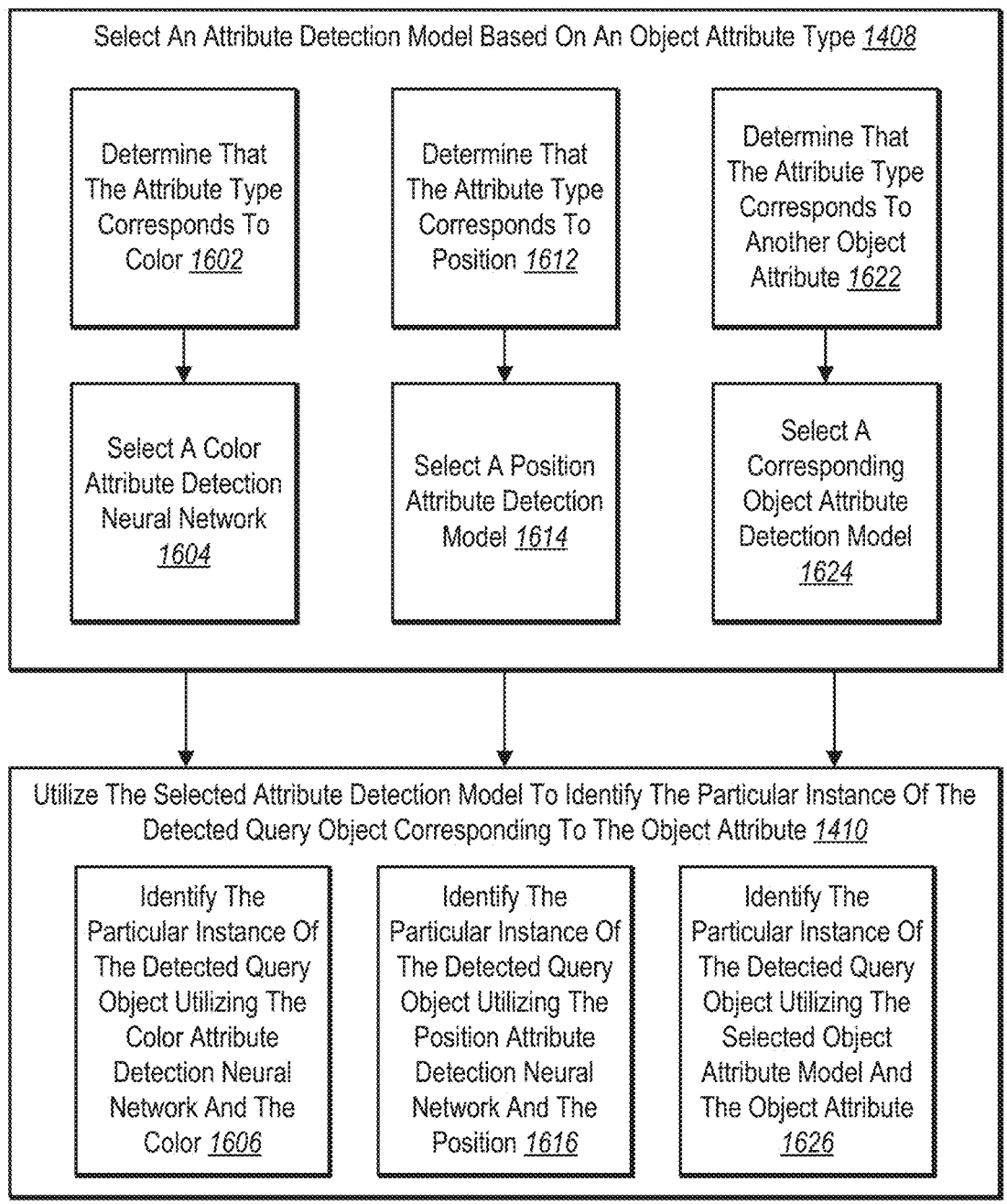
FIG. 16 illustrates a flow chart of detecting a particular instance of a query object based on an object attribute in accordance with one or more embodiments.

Turning to FIG. 16, a flow chart of detecting a particular instance of a query object based on an object attribute is illustrated in accordance with one or more embodiments. As shown and as mentioned above, FIG. 16 expands on the acts 1408 and 1410 described above with respect to FIG. 14, which itself is an expansion of the act 428 of the object selection pipeline 400. As also shown, FIG. 16 includes acts 1602-1606, 1612-1616, and 1622-1626.

More specifically, the acts 1408 and 1410 can include multiple sets of acts. Each set of acts corresponds to a different attribute detection model. For example, the acts 1602-1606 correspond to a color attribute detection neural network. The acts 1612-1616 correspond to a position attribute determination model. The acts 1622-1626 correspond to other object attribute detection models.

As described above, the act 1408 corresponds to the object selection system 106 selecting an attribute detection model based on an object attribute type. More specifically, in a number of embodiments, the object selection system 106 can detect multiple instances of a detected query object indicated in a query string. Further, the object selection system 106 determines that the query string includes one or more adjectives that specify a particular query object instance. To select the particular query object instance, the object selection system 106 can utilize one of the attribute detection model trained or created to recognize instances based on object attributes types.

To illustrate, in one or more embodiments, the act 1408 can include the act 1602 of the object selection system 106 determining that the attribute type corresponds to color. For example, the object selection system 106 analyzes the object attribute (i.e., adjective) within the query string to identify that the user is requesting selection of an instance of the detected query object having a particular color within the image. In some embodiments, the object selection system 106 determines that the object attribute is a color based on matching the object attribute to a name or description of a known color. In various embodiments, the object selection system 106 also detects that one or more object attributes further specify a hue, shade, opacity, brightness, saturation, temperature, and/or tint of a color (e.g., light brown, soft yellow, green, deep purple, hot pink, dull blue, or burnt orange).

Based on detecting that the object attribute is a color, the object selection system 106 can select the color attribute detection neural network, as shown in the act 1604. For example, the object selection system 106 selects the color attribute detection neural network from among a number of various attribute detection neural networks and models.

As shown, the act 1410 of utilizing the selected attribute detection model to identify the particular instance of the detected query object corresponding to the object attribute can include the act 1606 of the object selection system 106 identifying the particular instance of the detected query object utilizing the color attribute detection neural network and the color indicated in the query string (e.g., color object attribute). Indeed, the object selection system 106 can utilize the color attribute detection neural network to determine the particular instance from the provided color and the multiple instances of the detected query object.

More specifically, in one or more embodiments, the object selection system 106 utilizes the color attribute detection neural network to translate or map the color into a mathematical representation (e.g., a color embedding vector) such as a point or region in a color space (e.g., vector space). In addition, for pixels in a given instance of the detected query object, the color attribute detection neural network can generate similar embeddings. Further, the color attribute detection neural network can compare (i.e., measure utilizing co-sine similarity) the distance between the color object attribute and the given instance to determine which instance or instances correspond to the color object attribute.

In one or more embodiments, the color attribute detection neural network generates color embeddings for all pixels of the given instance. In some embodiments, the color attribute detection neural network generates color embeddings for a subset of pixels of the given instance. Because many adjacent pixels in an image share the same color attributes, the object selection system 106 can reduce computational costs by generating color embeddings for a selected group of pixels in the given instance.

In some instances, the object selection system 106 can determine whether pixels of the given instance are "valid" pixels. In a number of embodiments, a pixel is valid if the pixel color is close to (e.g., within a predetermined vector space distance) the query color (i.e., the color object attribute). Further, in some embodiments, the object selection system 106 can determine whether a threshold percentage, fraction, and/or number of pixels of the given instance are valid. For example, if more than half of the pixels of the given instance are invalid (e.g., do not match the query color), the object selection system 106 filters out (e.g., dismisses) the given instance from consideration as the particular instance.

Similarly, if the object selection system 106 determines that a ratio of valid pixels for the given instance is satisfied (e.g., at or above 10%), then the object selection system 106 can indicate the given instance as the particular instance. Indeed, any of the instances of the detected query object that have valid pixel ratios above a predefined threshold, the object selection system 106 can maintain selection of the instances.

As described previously, in some embodiments, the object selection system 106 can identify the particular instance based on the object attribute and the boundaries of the instances of the detected query object. In other embodiments, the object selection system 106 utilizes the masks of the instances. Largely, with respect to determining color matches, the object selection system 106 can utilize the masks of the instances instead of the less precise approximate boundary (e.g., bounding box) since the approximate boundary often approximately covers an instance and includes background pixels having colors that do not match the color object attribute.

In various embodiments, the object selection system 106 trains or otherwise obtains the color attribute detection neural network to identify instances (e.g., a defined group of pixels) that correspond to an input color. For example, the object selection system 106 generates the color vector space through iterative training as well as trains the color attribute detection neural network to accurately map pixel colors to the color vector space.

Figure 17:
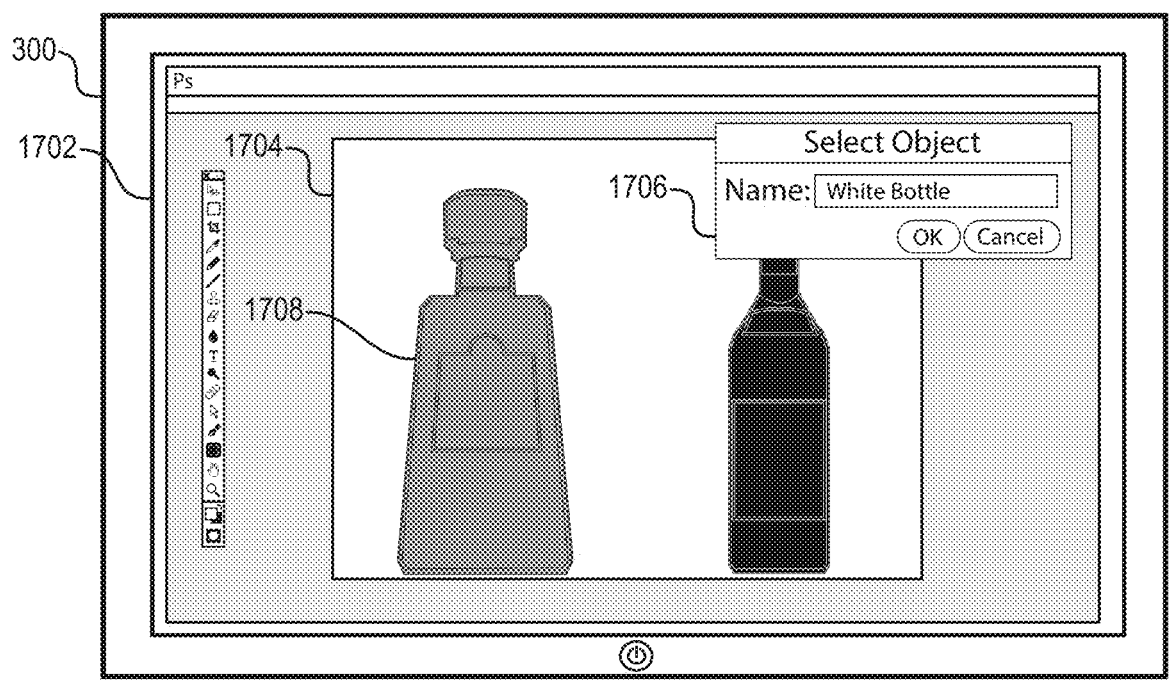
FIG. 17 illustrates a graphical user interface of selecting a query object instance based on a color object attribute in accordance with one or more embodiments.

To illustrate, FIG. 17 shows a graphical user interface of utilizing a color attribute detection neural network to detect a particular instance of a query object in accordance with one or more embodiments. FIG. 17 includes the client device 300 introduced above. For example, the client device 300 includes an image editing application that implements the image editing system 104 that utilizes the object selection system 106.

As shown in FIG. 17, the graphical user interface 1702 includes an image 1704 within an image editing application. The image 1704 shows a white bottle and a black bottle. In addition, the graphical user interface 1702 includes an object selection interface 1706, as described above in connection with FIG. 3A, where the user provides the query string of "white bottle."

As described previously, the object selection system 106 utilizes the object selection pipeline 400 to detect the two bottles based on the query object (i.e., "bottle") from the query string. Further, the object selection system 106 determines the object attribute of "white" in the query string, which corresponds to a color object attribute, as described above. Accordingly, the object selection system 106 selects and utilizes the color attribute detection neural network to identify and select the white bottle in the image (e.g., the selected particular query object 1708). Thus, as shown in FIG. 17, the object selection system 106 returns the selected particular query object 1708 to the user within the image editing application.

Returning to the act 1408 in FIG. 16, the act 1408 can include the act 1612 of the object selection system 106 determining that the attribute type corresponds to position. For example, based on analyzing the object attribute within the query string, the object selection system 106 determines that the user is requesting selection of an instance of the detected query object having a particular position within the image. In some instances, the object selection system 106 identifies the position object attribute by detecting an adjective in the query string that matches position lexicography, such as "left," "center," "right," "top," "middle," "bottom," "upper," "lower" "above," "below," "outer" "inner."

Based on detecting that the object attribute is a position, the object selection system 106 can select a position attribute detection model, as shown in the act 1614. For example, the object selection system 106 can select the position attribute detection model from among multiple attribute detection neural networks and models, as indicated above.

As shown, the act 1410 of utilizing the selected attribute detection neural network to identify the particular instance of the detected query object corresponding to the object attribute can include the act 1616 of the object selection system 106 identifying the particular instance of the detected query object utilizing the position attribute detection model and the position indicated in the query string. Indeed, the object selection system 106 can utilize the position attribute detection model to determine the particular instance from the provided position and the multiple instances of the detected query object.

To illustrate, in some embodiments, the object selection system 106 can utilize the position attribute detection model to identify the position of each instance of the detected query object within the image. In some embodiments, the position attribute detection model utilizes one or more heuristics to compare the positions of each query object instance. For example, the position attribute detection model can generate image coordinates for each query object instance (e.g., Cartesian coordinates). In addition, the position attribute detection model can add the image coordinates for each instance to a table or chart to enable the object selection system 106 to compare corresponding instance positions within the image.

In a number of embodiments, the position attribute detection model determines the position of a query object instance based on its center of mass. For example, the position attribute detection model determines the position of a query object instance as its center of mass coordinates. In some embodiments, the center of mass corresponds to the center mass of the boundary box associated with the query object instance. In alternative embodiments, the center of mass corresponds to the center mass of the object mask associated with the query object instance.

In some embodiments, the position attribute detection model determines the position of a query object instance based on an outside edge (e.g., the image coordinate of an outer side, corner, or point) of the query object instance (e.g., boundary box or object mass). In additional embodiments, the position attribute detection model selects the outside edge based on the position object attribute. For example, if the position object attribute is "left," the position attribute detection model selects the left-most edge or point of each query object instance. Similarly, if the position object attribute is "bottom right," the position attribute detection model selects the corner point on each query object instance where the lower edge and the right edge meet. Additionally, if the position object attribute is "top center," the position attribute detection model selects the middle point of the top edge of each query object instance.

Upon determining the position for each of the instances of the detected query object, the object selection system 106 (and/or position attribute detection model) can determine which query object instance satisfies the position object attribute. For example, for the position object attribute of "top," the object selection system 106 can identify the query object instance that has a relative position (e.g., based on its image coordinate) above the other query object instances in the image. As another example, for the position object attribute of "center," the object selection system 106 can identify the query object instance that has a relative position closest to the center of the image. In some instances, for the position object attribute of "middle," the object selection system 106 can identify the query object instance that has a relative position between at least two other query object instances.

In some embodiments, the object selection system 106 determines that multiple instances of the detected query object satisfy the position object attribute. For example, if the position object attribute is "upper," the object selection system 106 can select each query object instance that is above the center horizon (or another vertical coordinate).

Similarly, in various embodiments, if two query object instances have positions within a threshold tolerance of each other, the object selection system 106 can select both query object instances. To illustrate, if the position object attribute is "right," the object selection system 106 can select the query object instance that has the right-most position (e.g., based on its x-axis image coordinate) in the image. Additionally, the object selection system 106 can also select additional query object instances that have an x-axis coordinate within a threshold distance (e.g., 5% of the width or 20 pixels) of the first selected query object instance.

As indicated above, the object selection system 106 can select one or more query object instances that satisfy the position object attribute, as further described below. Indeed, the object selection system 106 can select one or more query object instances based on spatial comparisons of each query object instance within the image. In addition, in some embodiments, the object selection system 106 also filters out one or more query object instances that do not have positions that satisfy the position object attribute.

As explained earlier, depending on the position object attribute, the object selection system 106 may determine and identify the positions of each query object instance based on their boundary box before determining object masks. For example, the object selection system 106 can often perform simple spatial comparisons of the query object instances with high accuracy utilizing their corresponding boundary boxes. In this manner, the object selection system 106 can avoid computing precise object masks for instances that do not satisfy the positional attribute (i.e., position object attribute) specified by the user in the query string.

In various embodiments, the object attribute corresponding to position can include depth. In alternative embodiments, the object selection system 106 utilizes a separate depth attribution detection neural network to identify the particular instance corresponding to the specified depth. For instance, the depth attribution detection neural network can generate a depth map of the image to determine relative depths for each of the multiple instances of the detected query object. Examples of depth object attributes include "front," "back," "closer," "farther," "in front" and "behind." Add, in a similar manner as described above, the object selection system 106 can select the one or more query object instances that satisfy the depth object attribute.

Figure 18:
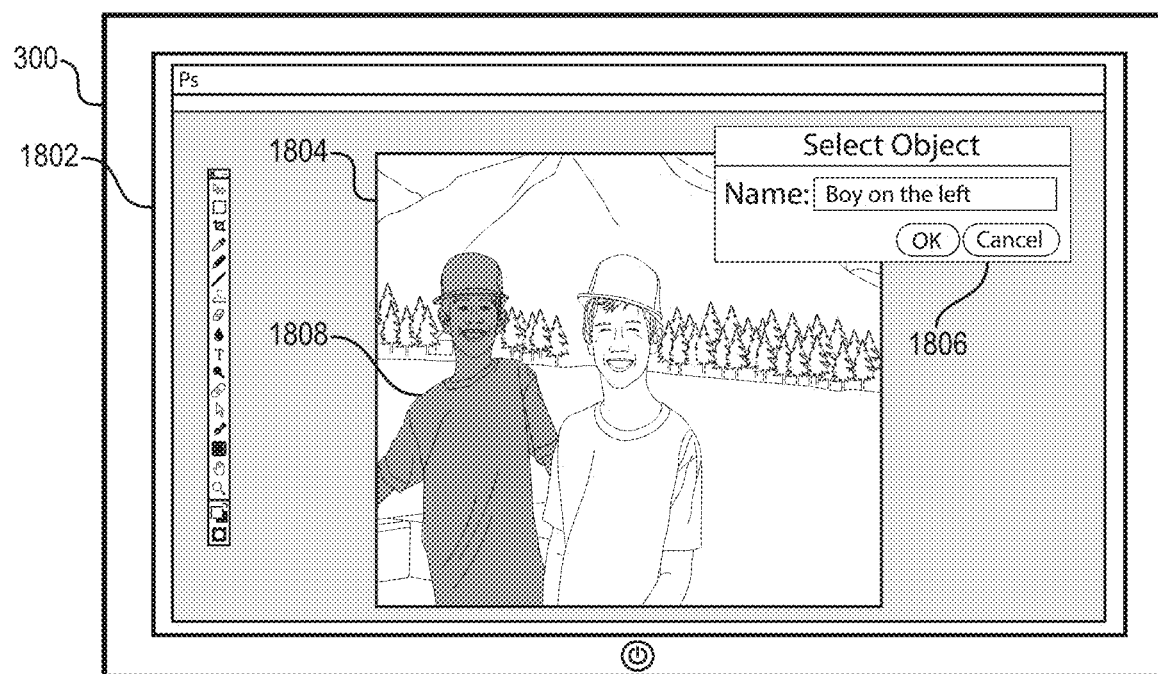
FIG. 18 illustrates a graphical user interface of selecting a query object instance based on a position object attribute in accordance with one or more embodiments.

FIG. 18 illustrates a graphical user interface of utilizing a position attribute detection neural network to detect a particular instance of a query object in accordance with one or more embodiments. FIG. 18 includes the client device 300 introduced above. For example, the client device 300 includes an image editing application that implements the image editing system 104 that utilizes the object selection system 106.

As shown in FIG. 18, the graphical user interface 1802 includes an image 1804 within an image editing application.

The image 1804 shows two boys in the foreground and trees and mountains in the background. The graphical user interface 1802 also includes an object selection interface 1806, as described above in connection with FIG. 3A, where the user provides the query string of "boy on the left."

As described previously, the object selection system 106 determines the two boys based on the query object of a "boy" in the query string utilizing the object selection pipeline 400 as explained above. Further, the object selection system 106 can determine the object attribute of "left" in the query string, which corresponds to a position object attribute, as described above. Accordingly, the object selection system 106 selects and utilizes the position attribute detection neural network to identify and select the left boy in the image (e.g., the selected particular query object 1808). Thus, as shown in FIG. 18, the object selection system 106 can return the selected particular query object 1808 to the user within the image editing application.

Returning back to FIG. 16 and to the act 1408, the act 1408 can include the act 1622 of the object selection system 106 determining that the attribute type is another object attribute (e.g., other than color or position). For example, based on analyzing the adjective in the query string as described above, the object selection system 106 can determine that the attribute is a size, length, shape, material, pattern, location, depth, rigidity/flexibility, prominence, body posture, emotion, or facial expression of the query object. Alternatively, the object selection system 106 determines that the object attribute corresponds to an object attribute type not recognized.

Based on detecting the object attribute type, the object selection system 106 can select a corresponding attribute detection model, as illustrated in the act 1624. For example, if the object attribute type is a material, the object selection system 106 selects a material attribute detection neural network that identifies materials (e.g., wood, metal, fabric, plastic, ceramic, concrete, glass, composite, or another material) associated with each query object instance. As another example, if the object attribute type is a shape, the object selection system 106 selects a shape attribute model that identifies shapes of each query object instance. In a similar manner, the object selection system 106 can select various attribute detection neural network or models based on the identified object attribute type.

Moreover, upon determining that the object attribute type is unknown or does not correspond to any of the specialized attribute detection neural networks or models, the object selection system 106 can select a generic attribute detection neural network. As described below, the generic attribute detection neural network can determine whether one or more of the query object instances correspond to the object attribute specified in the query string.

As shown, the act 1410 in FIG. 16 can include the act 1626 of the object selection system 106 identifying the particular instance of the detected query object utilizing the selected object attribute detection model and the object attribute. In the case of a specialized attribute detection neural network or model, the object selection system 106 can select the particular instance from the multiple instances of the detected query object utilizing the object attribute indicated in the query string in connection with the selected specialized attribute detection neural network or model.

As mentioned above, the object selection system 106 can utilize a generic attribute detection neural network to select the particular instance. In various embodiments, the generic attribute detection neural network can generate tags for each query object instance (e.g., utilizing automatic tagging techniques) to associate each instance with various attributes. For example, the generic attribute detection neural network is trained to predict and assign tags to a given query object instance based on one or more attributes and/or characteristics recognized from the given query object instance. Indeed, the generic attribute detection neural network can discern and extract relevant adjective tags from query object instances Upon the generic attribute detection neural network automatically tagging each of the query object instances, the object selection system 106 can compare the object attribute provided in the query string with the attribute tags generated for each of the query object instances. To illustrate, in one or more embodiments, the object selection system 106 filters out instances that have no correlation or less than a minimum correlation threshold between the attribute tags and the object attribute. Indeed, by analyzing attribute tags of a query object instance with the object attribute from the query string, the object selection system 106 can ignore the query object instances that do not match the object attribute.

In additional, or alternative, embodiments, the object selection system 106 can match attribute tags of a query object instance with the object attribute from the query string to identify which instances correspond to the object attribute. For example, if the object attribute is "happy" from a query string of "happy man," the object selection system 106 analyzes the attribute tags of each query object instance to determine if the tags include "happy" or synonyms of "happy."

Upon filtering out instances with non-corresponding tags and/or identifying instances with corresponding tags, the object selection system 106 can select the particular one or more query object instances corresponding to the object attribute. Thus, even if a specialized object attribute detection model is not available for the object attribute, in most cases, the object selection system 106 can still identify the particular query object instance from the object attribute utilizing the generic attribute detection neural network.

Figure 19:
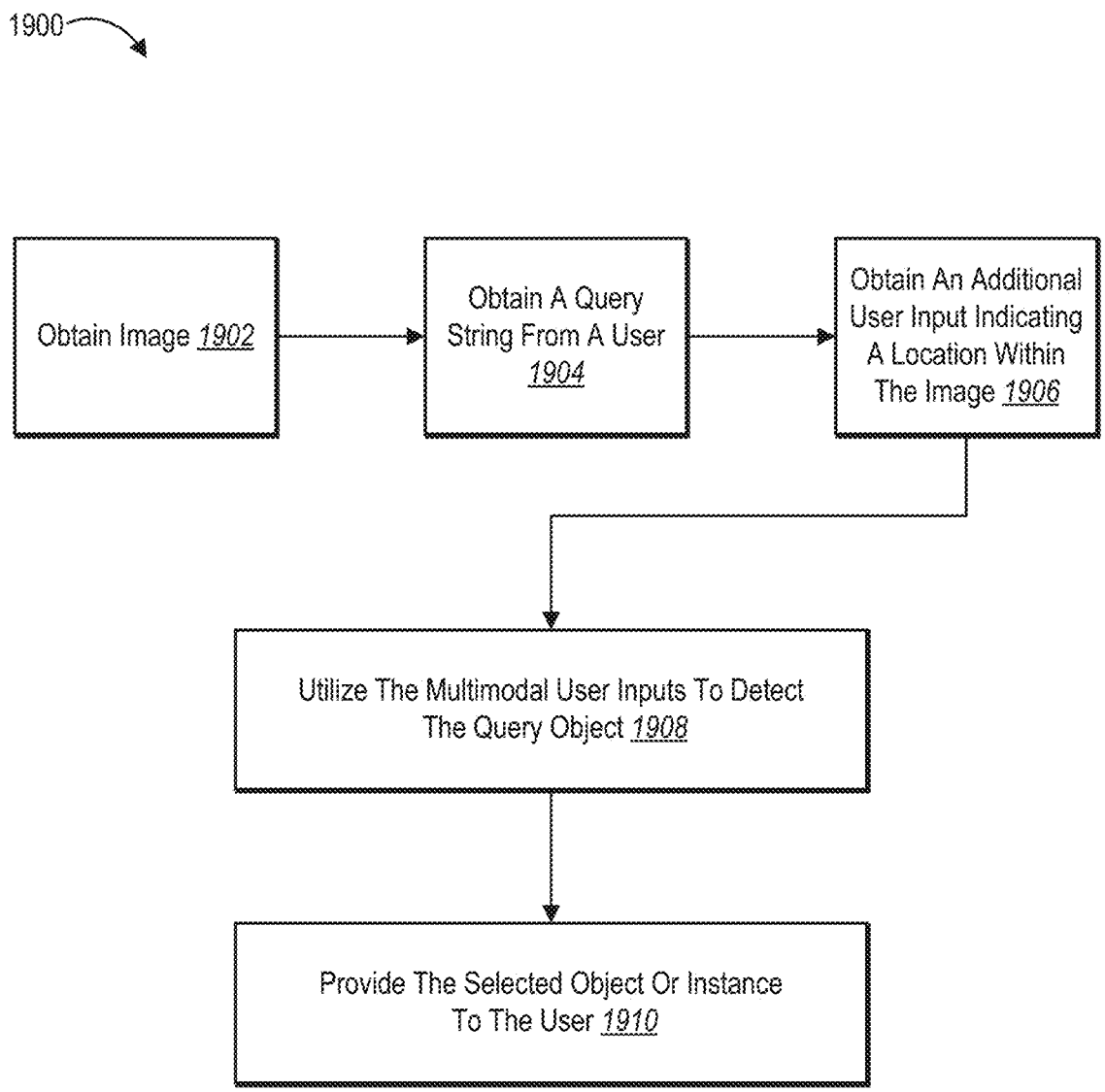
FIG. 19 illustrates a flow chart of detecting and selecting a query object in an image based on multimodal inputs in accordance with one or more embodiments.

Turning to FIG. 19, additional description is provided with respect to detecting an object within an image based on additional user input indicating a location in the image. In particular, FIG. 19 illustrates a flow chart of detecting and selecting a user query-based object in an image based on multimodal inputs in accordance with one or more embodiments. As shown, FIG. 19 includes a series of acts 1900 that the object selection system 106 can perform.

As illustrated, the series of acts 1900 can include the act 1902 of the object selection system 106 obtaining an image. For example, the user captures an image with a camera on a client device associated with the user. Further, the series of acts 1900 can include the act 1904 of the object selection system 106 obtaining a query string from the user, as described previously.

In addition, the series of acts 1900 includes the act 1906 of the object selection system 106 obtaining an additional user input indicating a location within the image. In one or more embodiments, the additional user input is a touch input selection within the image indicating a specific location. In some embodiments, the additional user input is a mouse (or equivalent) input selection within the image indicating the specific location. The location can range from a single point (e.g., pixel coordinate) to a section of the image within the image (e.g., a group of pixels). Further, examples of the additional user input includes a tap, click, swipe, hover, drag, scribble, squiggle, line, or click. Other examples of the additional user input can include a rectangular selection, lasso selection, trace selection, magnetic selection, another type of selection.

As shown, the series of acts 1900 can include the act 1908 of the object selection system 106 utilizing the multimodal user inputs to detect the query object. More particularly, the query string is a first user input and the location indication is an additional user input. Together these multiple distinct user inputs provide the object selection system 106 with the multimodal user inputs that enable the object selection system 106 to more accurately detect and select a query object.

In various embodiments, the query string signals that additional user input includes location information. For example, the object selection system identifies text in the query string such as "this" (e.g., "this car") or "here" (e.g., the "cup here") indicating that the user has provided (or will provide) location input in connection with the query string. For instance, upon the object selection system 106 can receive the request to select "this elephant," the object selection system 106 provides an additional prompt for the user to click, tap, outline, squiggle, or otherwise indicate the location of the elephant within the image.

Further, the object selection system 106 can utilize the user location input to select and/or filter out potential detected objects. The object selection system 106 detects multiple potential objects (e.g., generates boundary boxes) in an image that could correspond to the query object in the query string utilizing a selected object detection neural network, as described above. Then, utilizing the indicated location from the additional user input the object selection system 106 can filter out boundary boxes (e.g., after a region or object proposal) that do not match the indicated location or that are beyond a threshold distance from the indicated location. As another example, the object selection system 106 ranks or sorts the boundary boxes based on their distance to the indicated location, where a higher rank corresponds to a higher probability of included the query object.

In some embodiments, the object selection system 106 can utilize the user location input similar to the object attribute. For example, the object selection system 106 detects multiple instances of the detected query object. Then utilizing the user location input, the object selection system 106 selects the instance that matches or corresponds to the location indication. For instance, the object selection system 106 selects the object mask of the instance that has a center closest to the indicated location.

Further, in some embodiments, the object selection system 106 utilizes the indicated location as a starting point for object detection within the image. For example, the object selection system 106 provides the image, the query object, and the indicated location within the image to one of the object detection neural networks described above in connection with the object selection pipeline 400. Further, the object selection system 106 utilizes the indicated location to determine where to detect the query object within the image. Indeed, the indicated location signals to the selected object detection neural network that the query object is located at a particular image location.

As shown in FIG. 19, the series of acts 1900 can include the act 1910 of the object selection system 106 providing the selected query object or instance to the user. As described above, the object selection system 106 can automatically select the detected query object and/or the query object instance within the image editing application, which, in this case, is in response to the multimodal input.

In some embodiments, the object selection system 106 can automatically detect and select an object based on the user location input without identifying a query object in the query string. For example, if the full query string is "here," the object selection system 106 can attempt to select the object corresponding to the indicated location. In another example, the object selection system 106 provides a location detection tool that receives the user location input within an image and, in response, utilizes the object selection system 106 to identify an object at that location. For instance, the user clicks on a point within the image and the object selection system 106 detects the object at that location. In another instance, the user utilizes a selection tool to roughly outline an object and the object selection system 106 automatically generates an object mask and selects the object at the indicated location for the user.

Further, based on the indicated location, the object selection system 106 attempts to detect an object. In various embodiments, the object selection system 106 utilizes the object proposal neural network described above to detect an object of significance. If no candidate objects are detected, the object selection system 106 can utilize the regional proposal neural network described above to return the object detected nearest the indicated location.

Figure 20:
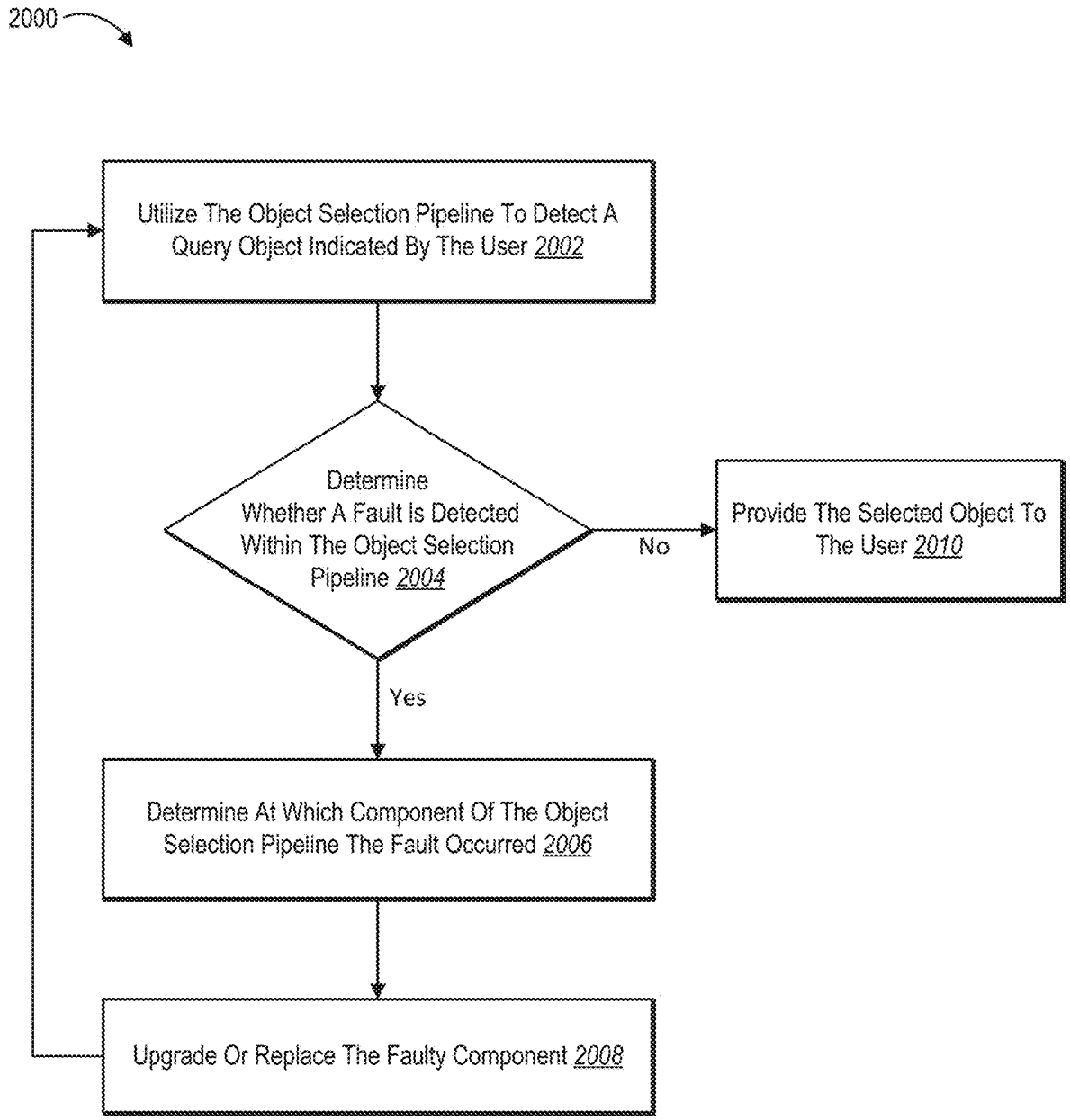
FIG. 20 illustrates a flow chart of updating the object selection pipeline in accordance with one or more embodiments.

Turning now to FIG. 20, a flow chart of updating the object selection pipeline 400 is illustrated in accordance with one or more embodiments. As shown, FIG. 20 include a series of acts 2000 that the object selection system 106 can perform with respect to the object selection pipeline 400.

As described above, the object selection pipeline 400 includes various components that the object selection system 106 utilizes to detect a query object. Additionally, many of the components are interchangeable with updated versions as well as new components. Accordingly, when faults occur, the object selection system 106 can identify and update the source of the fault. In addition, the object selection system 106 can also add further components to the object selection pipeline to improve the performance of the detected objects in images.

To illustrate, the series of acts 2000 can include the act 2002 of the object selection system 106 utilizing the object selection pipeline 400 to detect a query object indicated by the user. As described in detail above, the object selection system 106 can utilize the object selection pipeline as a framework to detect the majority of objects submitted in a query string irrespective of their object type.

In addition, the series of acts 2000 can include the act 2004 of the object selection system 106 determining whether a fault is detected within the object selection pipeline 400. In some embodiments, the object selection system 106 can determine that the object selection system 106 correctly and accurately detected the query object submitted by the user. In these embodiments, the object selection system 106 can provide the selected object to the user, as shown in the act 2010. For example, as described above, the object selection system 106 selects the query object within an image editing application.

In other embodiments, the object selection system 106 detects a fault within the object selection pipeline 400. Based on detecting a fault, the object selection system 106 can determines the component at which of the object selection pipeline the fault occurred, as shown in the act 2006. For example, in one or more embodiments, the object selection system 106 examines the output of each stage of the object selection pipeline to determine where the fault is occurring.

In some embodiments, the object selection system 106 isolates the branch of the object selection pipeline where the fault was detected to narrow down the possible components at which the fault is occurring. For example, if the query object of "sand" is not accurately selecting sand in an image, the object selection system 106 first looks at the component within the concept detection branch (e.g., the act 418 in the object selection pipeline of FIG. 4). In this manner, the object selection system 106 can determine that the fault is occurring at the concept detection network.

Upon detecting the location of the fault, the object selection system 106 can upgrade or replace the faulty component, as shown in the act 2008. For example, the object selection system 106 can replace the faulty component with an improved version. Similarly, the object selection system 106 can substitute older components with new components with newer versions as the newer versions become available. Further, the object selection system 106 can upgrade and/or replace components without needing to change, retrain, reconfigure, and/or modify other components of the object selection pipeline. Additionally, the object selection system 106 can continue to utilize the object selection pipeline (e.g., the act 2002) until another fault is detected (e.g., the act 2004).

In addition to replacing or upgrading components, in one or more embodiments, the object selection system 106 adds additional components to the object selection pipeline 400. For example, the object selection system 106 adds an additional specialist object detection neural network to detect a particular type of object class. The object selection system 106 can likewise add additional specialized attribute detection models to improve detection and selection of query object instances based on object attributes.

As described above, the object selection system 106 can detect objects within an image that a user "tells" the object selection system 106 to detect (e.g., via query string input). In some embodiments, the user requests multiple queries with respect to an image. For example, the user first requests selection of a red balloon in an image that includes balloons of various colors. In response, the object selection system 106 detects each of the balloons in the image, identifies the red balloon from object masks generated for each of the balloons, and provides the automatically selected red balloon to the user. Subsequently, if the user request selection of a blue balloon in the same image, rather than re-detect each balloon in the image as well as generate new object masks, the object selection system 106 can access and utilize the previously generated object masks to detect the blue balloon.

Indeed, in various embodiments, the object selection system 106 can store outputs of one or more components in connection with an image. For example, the object selection system 106 stores boundary boxes from one or more object selection requests. Additionally, or in the alternative, the object selection system 106 can store object masks from previous object detection. In this manner, the object selection system 106 can reduce computer processing by using stored boundary boxes and/or object masks when performing multiple object detections in an image.

Figure 21:
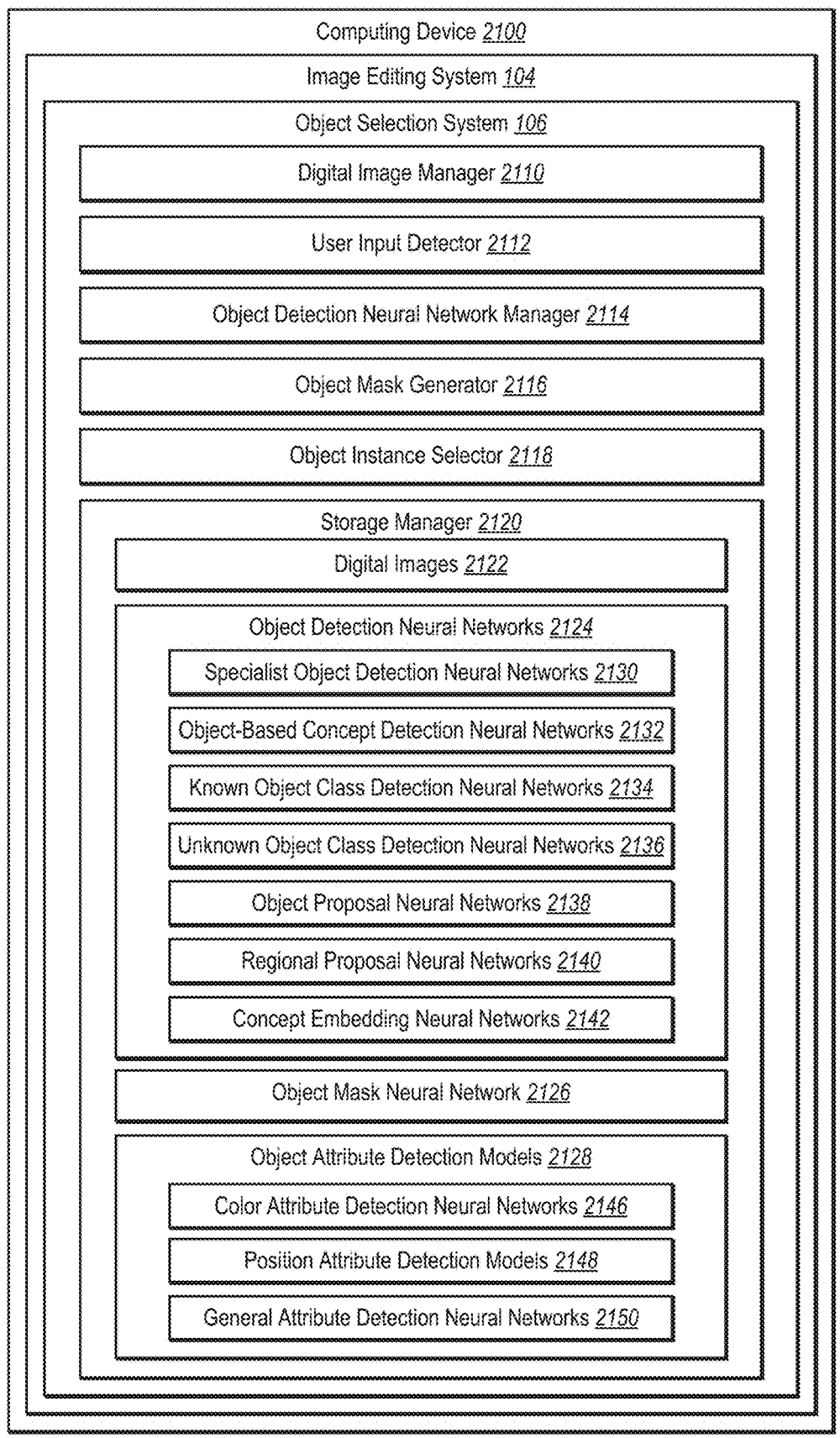
FIG. 21 illustrates a schematic diagram of the object selection system in accordance with one or more embodiments.

Referring now to FIG. 21, additional detail is provided regarding capabilities and components of the object selection system 106 in accordance with one or more embodiments. In particular, FIG. 21 shows a schematic diagram of an example architecture of the object selection system 106 implemented within the image editing system 104 and hosted on a computing device 2100. The image editing system 104 can correspond to the image editing system 104 described previously in connection with FIG. 1.

As shown, the object selection system 106 is located on a computing device 2100 within an image editing system 104. In general, the computing device 2100 may represent various types of client devices. For example, in some embodiments, the client is a mobile device, such as a laptop, a tablet, a mobile telephone, a smartphone, etc. In other embodiments, the computing device 2100 is a non-mobile device, such as a desktop or server, or another type of client device. Additional details with regard to the computing device 2100 are discussed below as well as with respect to FIG. 23.

As illustrated in FIG. 21, the object selection system 106 includes various components for performing the processes and features described herein. For example, the object selection system 106 includes a digital image manager 2110, a user input detector 2112, an object detection neural network manager 2114, an object mask generator 2116, an object instance selector 2118 and a storage manager 2120. As shown, the storage manager 2120 includes digital images 2122, object detection neural networks 2124, an object mask neural network 2126, and object attribute detection models 2128. Each of the components mentioned above is described below in turn.

As mentioned above, the object selection system 106 includes the digital image manager 2110. In general, the digital image manager 2110 facilitates identifying, accessing, receiving, obtaining, generating, importing, exporting, copying, modifying, removing, and organizing images. In one or more embodiments, the digital image manager 2110 operates in connection with an image editing system 104 (e.g., an image editing application) to access and edit images, as described previously. In some embodiments, the digital image manager 2110 communicates with the storage manager 2120 to store and retrieve the digital images 2122, for example, within a digital image database managed by the storage manager 2120.

As shown, the object selection system 106 includes the user input detector 2112. In various embodiments, the user input detector 2112 can detect, receive, and/or facilitate user input on the computing device 2100 in any suitable manner. In some instances, the user input detector 2112 detects one or more user interactions (e.g., a single interaction, or a combination of interactions) with respect to a user interface. For example, the user input detector 2112 detects a user interaction from a keyboard, mouse, touch page, touch screen, and/or any other input device in connection with the computing device 2100. For instance, the user input detector 2112 detects user input of a query string submitted from an object selection interface requesting automatic selection of an object within an image. In addition, the user input detector 2112 detects an additional user input from a mouse selection and/or a touch input to indicate an object location within the image, as described above.

As shown, the object selection system 106 includes the object detection neural network manager 2114. In various embodiments, the object detection neural network manager 2114 maintains, creates, generates, trains, updates, accesses, and/or utilizes the object detection neural networks disclosed herein. As described above, the object detection neural network manager 2114 detects one or more objects within an image (e.g., a query object) and generates a boundary (e.g., a boundary box) to indicate the detected object.

In addition, in a number of embodiments, the object detection neural network manager 2114 can communicate with the storage manager 2120 to store, access, and utilize the object detection neural networks 2124. In various embodiments, the object detection neural networks 2124 include one or more specialist object detection neural networks 2130 (e.g., sky detection neural network, face detection neural network, body detection neural network, skin detection neural network, and waterfall detection neural network), object-based concept detection neural networks 2132, known object class detection neural networks 2134, unknown object class detection neural networks 2136, object proposal neural networks 2138, regional proposal neural networks 2140, concept embedding neural networks 2142, each of which are described above in detail.

In addition, as shown, the object selection system 106 includes the object mask generator 2116. In one or more embodiments, the object mask generator 2116 produces, creates, and/or generates accurate object masks from detected objects. For example, the object detection neural network manager 2114 provides a boundary of an object (e.g., a detected query object) to the object mask generator 2116, which utilizes the object mask neural network 2126 to generate an object mask of the detected object, as described above. As also explained above, in various embodiments, the object mask generator 2116 generates multiple object masks when multiple instances of the query object are detected.

As also shown, the object selection system 106 includes the object instance selector 2118. In some embodiments, the object instance selector 2118 determines, analyzes, detects, identifies, filters, and/or selects one or more particular instances of a detected object from multiple instances of the detected object. In various embodiments, the object instance selector 2118 utilizes one or more object attribute detection models 2128 to identify a particular instance, as described above. For instance, the object instance selector 2118 utilizes an object attribute to select a particular instance for multiple instances of the detected object.

Examples of object attribute detection models 2128 include, but are not limited to, a color attribute detection neural network 2146, a position attribute detection model 2148, a general attribute detection neural network 2150, and/or other object attribute detection neural network and models (e.g., a depth attribute detection neural network, a material attribute detection neural network, a shape attribute detection model, a size attribute detection neural network, a length attribute detection neural network, a pattern attribute detection neural network, a location attribute detection model, a body posture attribute detection neural network, a prominence attribute detection neural network, a facial expression attribute detection neural network, or a quality attribute detection neural network).

Each of the components 2110-2150 of the object selection system 106 can include software, hardware, or both. For example, the components 2110-2150 can include one or more instructions stored on a computer-readable storage medium and executable by processors of one or more computing devices, such as a client device (e.g., a mobile client device) or server device. When executed by the one or more processors, the computer-executable instructions of the object selection system 106 can cause a computing device to perform the feature learning methods described herein. Alternatively, the components 2110-2150 can include hardware, such as a special-purpose processing device to perform a certain function or group of functions. In addition, the components 2110-2150 of the object selection system 106 can include a combination of computer-executable instructions and hardware.

Furthermore, the components 2110-2150 of the object selection system 106 may be implemented as one or more operating systems, as one or more stand-alone applications, as one or more modules of an application, as one or more plug-ins, as one or more library functions or functions that may be called by other applications, and/or as a cloud-computing model. Thus, the components 2110-2150 may be implemented as a stand-alone application, such as a desktop or mobile application. Additionally, the components 2110-2150 may be implemented as one or more web-based applications hosted on a remote server. The components 2110-2150 may also be implemented in a suite of mobile device applications or "apps." To illustrate, the components 2110-2150 may be implemented in an application, including but not limited to ADOBE® INDESIGN®, ADOBE ACROBAT®, ADOBE® ILLUSTRATOR®, ADOBE PHOTOSHOP®, ADOBE® CREATIVE CLOUD® software. "ADOBE," "INDESIGN" "ACROBAT," "ILLUSTRATOR," "PHOTOSHOP," and "CREATIVE CLOUD" are either registered trademarks or trademarks of Adobe Systems Incorporated in the United States and/or other countries.

FIGS. 1-21, the corresponding text, and the examples provide a number of different methods, systems, devices, and non-transitory computer-readable media of the object selection system 106. In addition to the foregoing, one or more embodiments can also be described in terms of flowcharts comprising acts for accomplishing a particular result, such as the flowcharts of acts shown in FIG. 22. Additionally, the acts described herein may be repeated or performed in parallel with one another or parallel with different instances of the same or similar acts.

Figure 22:
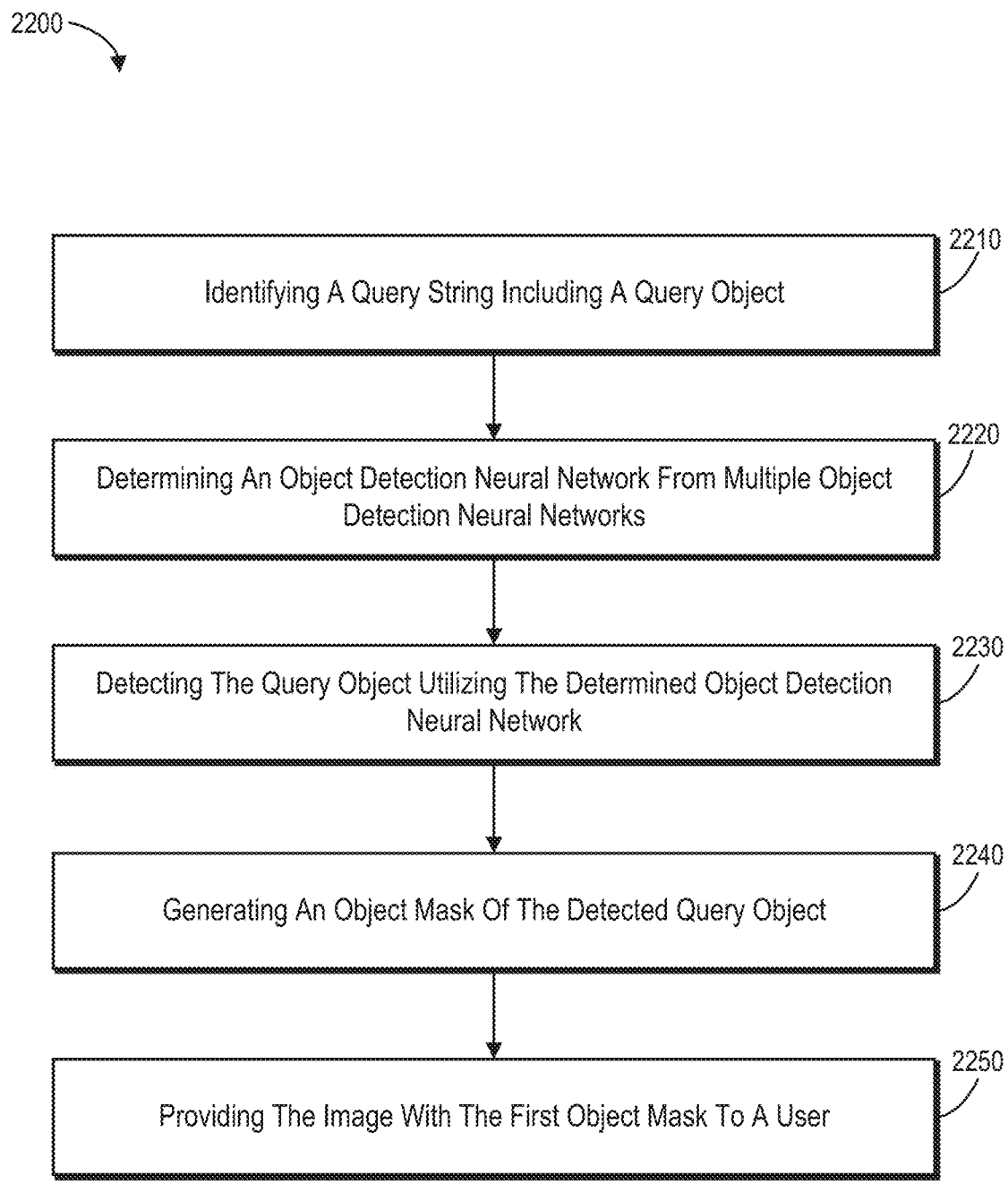
FIG. 22 illustrates a flowchart of a series of acts for utilizing one of multiple object detection neural networks to detect a query object in accordance with one or more embodiments.

As mentioned, FIG. 22 illustrates a flowchart of a series of acts 2200 for utilizing one of multiple object detection neural networks to detect a query object in accordance with one or more embodiments. While FIG. 22 illustrates acts according to one embodiment, alternative embodiments may omit, add to, reorder, and/or modify any of the acts shown in FIG. 22. The acts of FIG. 22 can be performed as part of a method. Alternatively, a non-transitory computer-readable medium can comprise instructions that, when executed by one or more processors, cause a computing device to perform the acts of FIG. 22. In some embodiments, a system can perform the acts of FIG. 22.

In one or more embodiments, the series of acts 2200 is implemented on one or more computing devices, such as the client device 102, the server device 110, the client device 300, or the computing device 2100. In addition, in some embodiments, the series of acts 2200 is implemented in a digital environment for creating or editing digital content (e.g., digital images). For example, the series of acts 2200 is implemented on a computing device having memory that includes a digital image; a plurality of object detection neural networks including a specialist object detection neural network, a known object class detection neural network, and/or an unknown object class detection model; and an object mask neural network.

The series of acts 2200 includes an act 2210 of identifying a query string including a query object. In particular, the act 2210 can involve identifying a query string that includes a query object to be selected in a digital image. In some embodiments, the act 2210 also includes analyzing the query string to identify a noun indicating the query object. In various embodiments, the act 2210 further includes analyzing the noun to determine an object class type of the query object. In example embodiments, the act 2210 includes receiving text input from the user associated with a client device and identifying the text input as the query string. In alternative embodiments, the act 2210 includes receiving audio input from the user associated with the client device, converting the audio input into text, and identifying the converted text as the query string.

As shown, the series of acts 2200 also includes an act 2220 of determining an object detection neural network from multiple object detection neural networks. In particular, the act 2220 can involve determining, based on analyzing the query object, to utilize a first object detection neural network from a plurality of object detection neural networks, the plurality of object detection neural networks including a specialist object detection neural network, a concept-based object detection neural network, a known object class detection neural network, and an unknown object class detection neural network (e.g., model comprising multiple neural networks).

In some embodiments, the unknown object class detection neural network includes a regional proposal neural network, and a concept embedding neural network. In addition, in various embodiments, the act 2220 includes determining that the noun corresponds to a first specialist object detection neural network trained to detect objects matching the noun. Further, in additional embodiments, the act 2220 includes selecting the first specialist object detection neural network. In one or more embodiments, the act 2220 includes determining that the noun corresponds to a first known object class detection neural network trained to detect a plurality of known object classes, wherein the plurality of known object classes includes the noun. In additional embodiments, the act 2220 includes selecting the first known object class detection neural network. In various embodiments, the act 2220 includes determining that the noun corresponds to a first unknown object class detection neural network trained to utilize concept embedding filtering to detect the noun. In additional embodiments, the act 2220 includes selecting the first unknown object class detection neural network.

As shown in FIG. 22, the series of acts 2200 further includes an act 2230 of detecting the query object utilizing the determined object detection neural network. In particular, the act 2230 can include detecting the query object within the image utilizing the first object detection neural network. In a number of embodiments, the act 2230 also includes generating a boundary of the detected query object (e.g., a boundary box) based on determining the query object and providing the boundary of the detected query object to the object mask neural network. In various embodiments, the act 2230 includes excluding one or more potential objects of the plurality of potential objects within the image based on the one or more potential objects not satisfying a correspondence threshold with the query object and detecting the query object from a remaining potential object of the plurality of potential objects.

As shown, the series of acts 2200 also includes an act 2240 of generating an object mask of the detected query object. In particular, the act 2240 can include generating, based on the first object detection neural network detecting the query object in the digital image, a first object mask of the detected query object utilizing an object mask neural network. In various embodiments, the object mask neural network utilizes a boundary (e.g., boundary box) to identify the detected query object as well as generate an accurate object mask for the detected query object.

As shown, the series of acts 2200 also includes an act 2250 of providing the image with the first object mask to a user. In particular, the act 2250 can involve providing the image with the first object mask to a client device associated with a user. In some embodiments, the act 2250 includes automatically selecting the detected query object within an image editing application by utilizing the first object mask.

The series of acts 2200 can also include a number of additional acts. In one or more embodiments, the series of acts 2200 includes the acts of detecting multiple instances of the query object indicated in the query string utilizing the first object detection neural network and within the digital image; and generating, based on detecting the multiple instances of the detected query object, a second object mask of a second instance of the detected query object utilizing the object mask neural network. In various embodiments, the first object mask corresponds to a first instance of the detected query object. In one or more embodiments, the second object mask is separate from the first object mask.

In various embodiments, the series of acts 2200 includes the acts of analyzing the query string to identify an object attribute associated with the query object and determining that the first instance of the detected query object has a greater correspondence to the object attribute than the second instance of the query object. In additional embodiments, the series of acts 2200 includes the acts of analyzing the query string to identify the object attribute by identifying an adjective within the query string corresponding to the query object. In some embodiments, the adjective has the greater correspondence to the first instance of the detected query object than to the second instance of the detected query object. In one or more embodiments, the object attribute is a color object attribute or a position object attribute.

In one or more embodiments, the series of acts 2200 includes the acts of adding or replacing an object detection neural network from the plurality of object detection neural networks prior to determining to utilize the first object detection neural network. In these embodiments, the added or replaced object detection neural network can be determined (e.g., selected) as the first object detection neural network utilized to detect the query object.

In some embodiments, the series of acts 2200 includes the acts of detecting additional user input indicating a location within the image and detecting the query object within the image based on the query object, the additional user input indicating the location within the image, and the first object detection neural network. In some instances, the additional user input is a mouse or touch input selection.

The term "digital environment," as used herein, generally refers to an environment implemented, for example, as a stand-alone application (e.g., a personal computer or mobile application running on a computing device), as an element of an application, as a plug-in for an application, as a library function or functions, as a computing device, and/or as a cloud-computing system. A digital medium environment allows the object selection system to create, execute, and/or modify the object selection pipeline as described herein.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., memory), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some embodiments, computer-executable instructions are executed by a general-purpose computer to turn the general-purpose computer into a special purpose computer implementing elements of the disclosure. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. As used herein, the term "cloud computing" refers to a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In addition, as used herein, the term "cloud-computing environment" refers to an environment in which cloud computing is employed.

Figure 23:
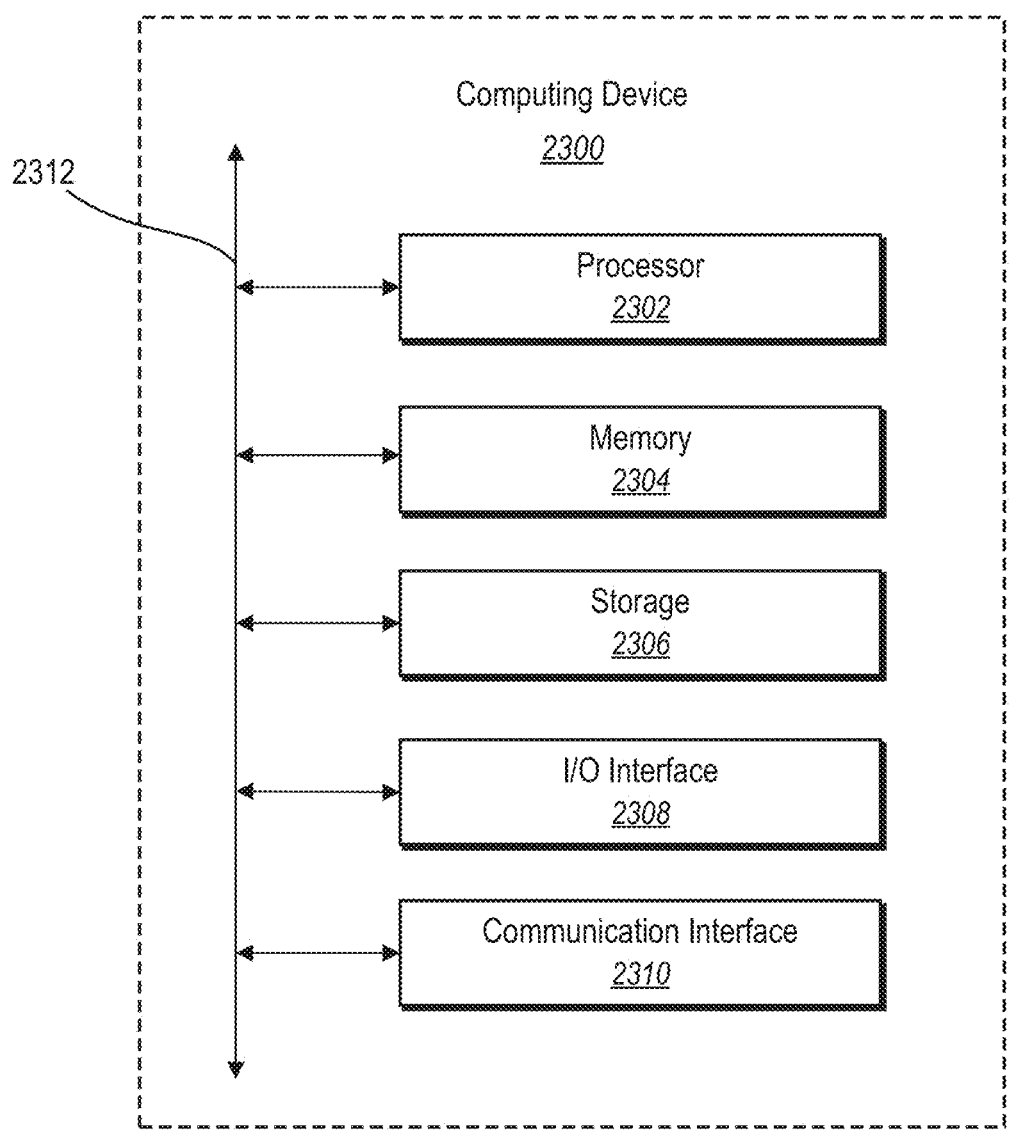
FIG. 23 illustrates a block diagram of an example computing device for implementing one or more embodiments of the present disclosure.

FIG. 23 illustrates a block diagram of an example computing device 2300 that may be configured to perform one or more of the processes described above. One will appreciate that one or more computing devices, such as the computing device 2300 may represent the computing devices described above (e.g., client device 102, the server device 110, the client device 300, or the computing device 2100). In one or more embodiments, the computing device 2300 may be a mobile device (e.g., a laptop, a tablet, a smartphone, a mobile telephone, a camera, a tracker, a watch, a wearable device, etc.). In some embodiments, the computing device 2300 may be a non-mobile device (e.g., a desktop computer, a server device, a web server, a file server, a social networking system, a program server, an application store, or a content provider). Further, the computing device 2300 may be a server device that includes cloud-based processing and storage capabilities.

As shown in FIG. 23, the computing device 2300 can include one or more processor(s) 2302, memory 2304, a storage device 2306, input/output ("I/O") interfaces 2308, and a communication interface 2310, which may be communicatively coupled by way of a communication infrastructure (e.g., bus 2312). While the computing device 2300 is shown in FIG. 23, the components illustrated in FIG. 23 are not intended to be limiting. Additional or alternative components may be used in other embodiments. Furthermore, in certain embodiments, the computing device 2300 includes fewer components than those shown in FIG. 23. Components of the computing device 2300 shown in FIG. 23 will now be described in additional detail.

In particular embodiments, the processor(s) 2302 includes hardware for executing instructions, such as those making up a computer program. As an example, and not by way of limitation, to execute instructions, the processor(s) 2302 may retrieve (or fetch) the instructions from an internal register, an internal cache, memory 2304, or a storage device 2306 and decode and execute them.

The computing device 2300 includes memory 2304, which is coupled to the processor(s) 2302. The memory 2304 may be used for storing data, metadata, and programs for execution by the processor(s). The memory 2304 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 2304 may be internal or distributed memory.

The computing device 2300 includes a storage device 2306 includes storage for storing data or instructions. As an example, and not by way of limitation, the storage device 2306 can include a non-transitory storage medium described above. The storage device 2306 may include a hard disk drive (HDD), flash memory, a Universal Serial Bus (USB) drive or a combination these or other storage devices.

As shown, the computing device 2300 includes one or more I/O interfaces 2308, which are provided to allow a user to provide input to (e.g., user strokes), receive output from, and otherwise transfer data to and from the computing device 2300. These I/O interfaces 2308 may include a mouse, keypad or a keyboard, a touch screen, camera, optical scanner, network interface, modem, other known I/O devices or a combination of these I/O interfaces 2308. The touch screen may be activated with a stylus or a finger.

The I/O interfaces 2308 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 2308 are configured to provide graphical data to a display for presentation to a user. The graphical data may be representative of one or more graphical user interfaces and/or any other graphical content as may serve a particular implementation.

The computing device 2300 can further include a communication interface 2310. The communication interface 2310 can include hardware, software, or both. The communication interface 2310 provides one or more interfaces for communication (such as, for example, packet-based communication) between the computing device and one or more other computing devices or one or more networks. As an example, and not by way of limitation, communication interface 2310 may include a network interface controller (NIC) or network adapter for communicating with an Ethernet or other wire-based network or a wireless NIC (WNIC) or wireless adapter for communicating with a wireless network, such as a WI-FI. The computing device 2300 can further include a bus 2312. The bus 2312 can include hardware, software, or both that connects components of computing device 2300 to each other.

In the foregoing specification, the invention has been described with reference to specific example embodiments thereof. Various embodiments and aspects of the invention (s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel to one another or in parallel to different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A non-transitory computer-readable medium storing instructions that, when executed by at least one processor, cause a computing device to:
   determine, from a selection query, a query object to be selected from a plurality of objects in a digital image;
   determine an object class or object type by analyzing the query object from the selection query;
   select, a first object detection neural network from a plurality of object detection neural networks to utilize to detect the query object utilizing the object class or object type to identify the first object detection neural network from the plurality of object detection neural networks, the plurality of object detection neural networks comprising a known object class detection neural network, and an unknown object class detection neural network;
   detect the query object in the digital image utilizing the first object detection neural network by generating a mask for the detected query object in the digital image; and
   provide, in response to the selection query, the digital image with the query object selected.

2. The non-transitory computer-readable medium of claim 1, further comprising instructions that cause the computing device to:
   detect the query object in the digital image by detecting first and second instances of the query object within the digital image utilizing the first object detection neural network;
   generate a first object mask of the first instance of the query object; and
   generate a second object mask of the second instance of the query object;
   wherein the second object mask is separate from the first object mask.

3. The non-transitory computer-readable medium of claim 2, further comprising instructions that cause the computing device to:
   analyze the selection query to identify an object attribute associated with the query object;
   determine a first correspondence between the object attribute and the first instance of the query object;
   determine a second correspondence between the object attribute and the second instance of the query object; and provide, in response to the selection query, the digital image with the first instance of query object selected and the second instance of the query object unselected based on the first correspondence being greater than the second correspondence.

4. The non-transitory computer-readable medium of claim 1, further comprising instructions that cause the computing device to select, based on the object class or object type of the query object, the first object detection neural network from the plurality of object detection neural networks by:
determining the object type of the query object;
determining that a first object detection neural network is trained to detect a specific object type that corresponds to the object type of the query object; and
selecting the first object detection neural network to detect the query object.

5. The non-transitory computer-readable medium of claim 1, further comprising instructions that cause the computing device to select, based on the object class or object type of the query object, the first object detection neural network from the plurality of object detection neural networks by:
determining the object class of the query object;
determining that a first object detection neural network is trained to detect a plurality of object classes that includes the object class of the query object; and
selecting the first object detection neural network to detect the query object.

6. The non-transitory computer-readable medium of claim 1, further comprising instructions that cause the computing device to select, based on the object class or object type of the query object, the first object detection neural network from the plurality of object detection neural networks by:
determining that the object class of the query object is an unknown object class;
determining that the first object detection neural network is trained to detect objects of unknown classes; and
selecting the first object detection neural network to detect the query object.

7. The non-transitory computer-readable medium of claim 1, further comprising instructions that cause the computing device to select the first object detection neural network based on the object class or object type from the plurality of object detection neural networks without selecting additional pre-trained object detection neural networks from the plurality of object detection neural networks.

8. A system for automatically selecting objects within digital images comprising:
a memory comprising:
a digital image; and
a plurality of object detection neural networks; and
at least one processor configured to cause the system to:
receive a selection query;
determine, from the selection query, a noun identifying a query object;
analyze the noun to determine an object class or object type of the query object;
identify a first object detection neural network from the plurality of object detection neural networks by correlating the object class or object type of the query object to the first object detection neural network, the plurality of object detection neural networks comprising a known object class detection neural network, and an unknown object class detection neural network;
detect the query object in the digital image and generate an approximate boundary for the query object utilizing the first object detection neural network by generating a mask for the detected query object in the digital image; and
provide the digital image with the query object selected in response to the selection query.

9. The system of claim 8, wherein the at least one processor is configured to cause the system to identify the first object detection neural network from the plurality of object detection neural networks based on correlating the object class or object type of the query object to the first object detection neural network by:
determining that the plurality of object detection neural networks comprises a specialist object detection neural network trained to detect the object type of the query object; and
selecting the specialist object detection neural network to detect the query object.

10. The system of claim 8, wherein the at least one processor is configured to cause the system to identify the first object detection neural network from the plurality of object detection neural networks based on correlating the object class or object type of the query object to the first object detection neural network by:
determining that the query object is not a foreground object; and
selecting a concept detection neural network to detect the query object based on the query object not being a foreground object.

11. The system of claim 8, wherein the at least one processor is configured to cause the system to identify the first object detection neural network from the plurality of object detection neural networks based on correlating the object class or object type of the query object to the first object detection neural network by:
determining that the query object is a foreground object; and
based on the query object being a foreground object, determining whether the object class of query object is a known object class.

12. The system of claim 11, wherein the at least one processor is configured to cause the system to:
determine that the object class of the query object is a known object class; and
select a first object detection neural network that is trained to detect a plurality of object classes that includes the object class of the query object to detect the query object.

13. The system of claim 11, wherein the at least one processor is configured to cause the system to:
determine that the object class of the query object is an unknown object class; and
select a concept embedding neural network to detect the query object.

14. The system of claim 13, wherein the at least one processor is configured to cause the system to:
utilize a regional proposal neural network to detect potential objects in the digital image; and
utilize the concept embedding neural network to detect the query object from the potential objects in the digital image.

15. In a digital medium environment for creating or editing digital images, a computer-implemented method of selecting query objects, comprising:
displaying a digital image within a graphical user interface of an image editing application;
providing an object selection interface within the graphical user interface;

receiving a query string via the object selection interface;

analyzing the query string to identify a query object and an object class or object type of the query object;

determining, based on the object class or object type of the query object, a first object detection neural network from a plurality of object detection neural networks to utilize to detect the query object in the digital image utilizing the object class or object type to the first object detection neural network from the plurality of object detection neural networks, the plurality of object detection neural networks comprising a known object class detection neural network, and an unknown object class detection neural network;

detecting any instances of the query object in the digital image utilizing the first object detection neural network by generating a mask for any instances of the query object in the digital image; and providing a selection of the query object within the digital image displayed within the graphical user interface.

16. The computer-implemented method of claim 15, wherein determining the first object detection neural network from the plurality of object detection neural networks comprises selecting a first object detection neural network from a plurality of object detection neural networks, the plurality of object detection neural networks further comprising a specialist object detection neural network and a concept-based object detection neural network.

17. The computer-implemented method of claim 15, wherein determining, based on the object class or object type of the query object, the first object detection neural network from the plurality of object detection neural networks to utilize to detect the query object in the digital image comprises:

making a determination of whether the query object is a foreground object or a background object; and determining to utilize the first object detection neural network based on the determination of whether the query object is a foreground object or background.

18. The computer-implemented method of claim 15, wherein determining, based on the object class or object type of the query object, the first object detection neural network from the plurality of object detection neural networks to utilize to detect the query object in the digital image comprises:

making a determination of whether the object class of the query object is a known object class or an unknown object class; and determining to utilize the first object detection neural network based on the determination of whether the object class of the query object is a known object class or an unknown object class.

19. The computer-implemented method of claim 15, further comprising:

identifying multiple instances of the query object in the digital image; and generating, based on detecting the multiple instances of the detected query object, an object mask for each instance of the query object utilizing an object mask neural network.

20. The computer-implemented method of claim 19, further comprising:

analyzing the query string to identify an object attribute associated with the query object;

determine that a first instance of the query object has a greater correspondence to the object attribute than a second instance of the query object; and providing the selection of the query object within the digital image by providing an object mask of the first instance of the query object on the digital image.

* * * * *